US010257151B2

(12) United States Patent
Morrison et al.

(10) Patent No.: US 10,257,151 B2
(45) Date of Patent: Apr. 9, 2019

(54) SYSTEMS AND METHODS FOR ENABLING DIALOG AMONGST DIFFERENT PARTICIPANT GROUPS WITH VARIABLE AND ASSOCIATION-BASED PRIVACY

(71) Applicant: Phanto, LLC, Scottsdale, AZ (US)

(72) Inventors: Daniel Morrison, Scottsdale, AZ (US); Martin Sielaff, Chandler, AZ (US); Todd Fletcher, Mesa, AZ (US); Tony Helvey, Chandler, AZ (US); David Holland, Phoenix, AZ (US); Chris Hooven, Mesa, AZ (US); Charles Godewyn, Phoenix, AZ (US); Albert Bori, Orem, UT (US)

( * ) Notice: Subject to any disclaimer, the term of this patent is extended or adjusted under 35 U.S.C. 154(b) by 0 days.

(21) Appl. No.: 15/681,293

(22) Filed: Aug. 18, 2017

(65) Prior Publication Data
US 2017/0353423 A1    Dec. 7, 2017

Related U.S. Application Data

(63) Continuation-in-part of application No. 15/095,638, filed on Apr. 11, 2016, now abandoned, and a
(Continued)

(51) Int. Cl.
*H04L 12/58* (2006.01)
*G06F 17/30* (2006.01)
(Continued)

(52) U.S. Cl.
CPC ............ *H04L 51/32* (2013.01); *G06F 3/0482* (2013.01); *G06F 3/04842* (2013.01);
(Continued)

(58) Field of Classification Search
CPC ........ G06Q 50/01; H04W 12/02; H04L 51/32
See application file for complete search history.

(56) References Cited

U.S. PATENT DOCUMENTS 6,515,681 B1    2/2003  Knight
6,525,747 B1    2/2003  Bezos
(Continued)

FOREIGN PATENT DOCUMENTS

DE    103 45 206 A1    6/2005
EP    2287787 A1    2/2011
(Continued)

OTHER PUBLICATIONS

Eto et al., "qwikWeb: integrating mailing list and WikiWikiWeb for group communication," WikiSym '05 (ACM 2005).
(Continued)

*Primary Examiner* — Chirag R Patel
(74) *Attorney, Agent, or Firm* — Brad Bertoglio

(57) ABSTRACT

A network-connected communication system is provided, via which individuals may engage in dialog with one or more dialog members. Differing views of the dialog may be presented to different individuals, based on the viewer's association with the dialog and/or variable privacy settings associated with the dialog. Dialogs may be initiated as private conversations, with members electing to make available views of the conversation to individuals other than the dialog members. Tools, such as redaction tools, may be provided for dialog participants to control availability of dialog content outside of dialog members. A dialog display user interface may be provided to dialog members, which includes a toggle permitting members to toggle between public and private dialog views, thereby highlighting differences in how a dialog is rendered to different audiences. Association-based and variable privacy may also be implemented in connection with online forums and restricted access communities. Such privacy-enabling systems may integrate to receive dialog content from another messaging system, and/or to disseminate privacy-conscious views of
(Continued)

dialogs to external systems such as messaging platforms, social networks and search engines.

9 Claims, 45 Drawing Sheets

Related U.S. Application Data continuation-in-part of application No. 14/848,172, filed on Sep. 8, 2015, now Pat. No. 9,473,447, which is a continuation of application No. 14/526,488, filed on Oct. 28, 2014, now Pat. No. 9,160,550, which is a continuation of application No. 14/525,169, filed on Oct. 27, 2014, now Pat. No. 9,112,931.

(60) Provisional application No. 62/508,989, filed on May 19, 2017, provisional application No. 62/468,464, filed on Mar. 8, 2017, provisional application No. 62/460,723, filed on Feb. 17, 2017, provisional application No. 62/419,878, filed on Nov. 9, 2016, provisional application No. 62/409,475, filed on Oct. 18, 2016, provisional application No. 62/376,894, filed on Aug. 18, 2016, provisional application No. 62/146,061, filed on Apr. 10, 2015.

(51) Int. Cl.
| | |
|---|---|
| *H04L 12/18* | (2006.01) |
| *H04L 29/06* | (2006.01) |
| *G06F 3/0484* | (2013.01) |
| *H04L 29/08* | (2006.01) |
| *G06F 3/0482* | (2013.01) |
| *H04W 4/08* | (2009.01) |

(52) U.S. Cl.
CPC .. *G06F 17/30864* (2013.01); *G06F 17/30867* (2013.01); *H04L 12/1813* (2013.01); *H04L 12/1818* (2013.01); *H04L 12/1822* (2013.01); *H04L 51/02* (2013.01); *H04L 51/046* (2013.01); *H04L 51/14* (2013.01); *H04L 65/403* (2013.01); *H04L 67/26* (2013.01); *H04W 4/08* (2013.01); *G06F 17/3089* (2013.01); *H04L 12/185* (2013.01); *H04L 67/306* (2013.01)

(56) References Cited

U.S. PATENT DOCUMENTS

| | | | |
|---|---|---|---|
| 6,781,607 B1 | 8/2004 | Benham | |
| 6,901,394 B2 | 5/2005 | Chauhan et al. | |
| 7,092,821 B2 | 8/2006 | Mizrahi et al. | |
| 7,130,885 B2 | 10/2006 | Chandra et al. | |
| 7,233,940 B2 | 6/2007 | Bamberger et al. | |
| 7,321,920 B2 | 1/2008 | Washburn | |
| 7,596,578 B1 | 9/2009 | Marks | |
| 7,657,571 B2 | 2/2010 | Battagin et al. | |
| 7,730,129 B2 | 6/2010 | Wang et al. | |
| 7,801,879 B2 | 9/2010 | Jones | |
| 7,848,971 B1 | 12/2010 | Mori | |
| 7,860,347 B2 | 12/2010 | Tang et al. | |
| 8,239,461 B2 | 8/2012 | Jones et al. | |
| 8,275,736 B2 | 9/2012 | Guo et al. | |
| 8,291,011 B2 | 10/2012 | Abu-Hakima et al. | |
| 8,392,360 B1 | 3/2013 | Dicker et al. | |
| 8,516,379 B2 | 8/2013 | D'Angelo et al. | |
| 8,522,152 B2 | 8/2013 | Baldwin et al. | |
| 8,539,027 B1 | 9/2013 | Chen et al. | |
| 8,539,359 B2 | 9/2013 | Rapaport et al. | |
| 8,549,412 B2 | 10/2013 | Brezina et al. | |
| 8,589,807 B2 | 11/2013 | Baldwin et al. | |
| 8,600,895 B2 | 12/2013 | Felsher | |
| 8,738,715 B2 | 5/2014 | Warren et al. | |
| 8,849,857 B2 | 9/2014 | Bray et al. | |
| 8,904,494 B2 | 12/2014 | Kindler et al. | |
| 8,935,807 B2 | 1/2015 | Sinha et al. | |
| 8,938,501 B2 | 1/2015 | Patel | |
| 9,031,598 B2 | 5/2015 | Pai et al. | |
| 9,112,931 B1 | 8/2015 | Morrison et al. | |
| 9,203,796 B2 | 12/2015 | Hsiao et al. | |
| 9,288,276 B2 | 3/2016 | Adamczyk et al. | |
| 9,342,554 B2 | 5/2016 | Klimt et al. | |
| 9,396,354 B1 | 7/2016 | Murphy et al. | |
| 9,401,886 B2 * | 7/2016 | Bastide | H04L 51/32 |
| 2004/0054737 A1 | 3/2004 | Daniell | |
| 2006/0015755 A1 | 1/2006 | Jaffe | |
| 2006/0018520 A1 | 1/2006 | Holloran | |
| 2006/0053194 A1 | 3/2006 | Schneider et al. | |
| 2007/0067405 A1 | 3/2007 | Eliovson | |
| 2007/0259325 A1 | 11/2007 | Clapper | |
| 2008/0195605 A1 | 8/2008 | Wolf-Soffer | |
| 2008/0294637 A1 | 11/2008 | Liu | |
| 2008/0307320 A1 | 12/2008 | Payne et al. | |
| 2009/0132271 A1 * | 5/2009 | Typaldos | G06Q 30/00 705/319 |
| 2010/0042511 A1 | 2/2010 | Sundaresan et al. | |
| 2010/0070554 A1 | 3/2010 | Richardson et al. | |
| 2011/0016179 A1 | 1/2011 | Bechtel | |
| 2011/0041082 A1 | 2/2011 | Nguyen | |
| 2011/0004927 A1 | 6/2011 | Zlowodzki | |
| 2011/0246910 A1 | 10/2011 | Moxley | |
| 2012/0130910 A1 | 5/2012 | Al-Alami | |
| 2012/0143972 A1 | 6/2012 | Malik et al. | |
| 2012/0167007 A1 | 6/2012 | Ross et al. | |
| 2012/0171654 A1 | 7/2012 | D'Angelo et al. | |
| 2012/0173992 A1 | 7/2012 | D'Angelo et al. | |
| 2012/0246575 A1 | 9/2012 | Baldwin et al. | |
| 2012/0250951 A1 * | 10/2012 | Chen | G06F 21/6245 382/118 |
| 2012/0252497 A1 | 10/2012 | Altscher | |
| 2012/0254774 A1 | 10/2012 | Patton | |
| 2012/0290952 A1 | 11/2012 | Paluch | |
| 2012/0303652 A1 * | 11/2012 | Tseng | G06Q 30/02 707/769 |
| 2013/0054357 A1 | 2/2013 | Mager et al. | |
| 2013/0055112 A1 | 2/2013 | Arnon et al. | |
| 2013/0171594 A1 | 7/2013 | Gorman et al. | |
| 2013/0262146 A1 * | 10/2013 | Price | G16H 10/20 705/3 |
| 2013/0311899 A1 | 11/2013 | Guiro et al. | |
| 2013/0311903 A1 | 11/2013 | Zadeh et al. | |
| 2014/0065591 A1 | 3/2014 | Tulgan et al. | |
| 2014/0280134 A1 * | 9/2014 | Horen | G06Q 50/01 707/736 |
| 2014/0282098 A1 | 9/2014 | McConnell | |
| 2015/0049912 A1 | 2/2015 | Migdal et al. | |
| 2015/0066780 A1 | 3/2015 | Cohen et al. | |
| 2015/0074020 A1 | 3/2015 | Arpat et al. | |
| 2015/0089399 A1 | 3/2015 | Megill et al. | |
| 2015/0193638 A1 | 7/2015 | Cook | |
| 2015/0261931 A1 | 9/2015 | Chiu et al. | |
| 2015/0309992 A1 | 10/2015 | Visel | |
| 2015/0331842 A1 * | 11/2015 | Costa | H04L 29/08 715/202 |
| 2015/0358266 A1 | 12/2015 | Kaplinger et al. | |
| 2016/0026855 A1 | 1/2016 | Mazumdar et al. | |
| 2016/0034132 A1 | 2/2016 | Huang et al. | |
| 2016/0036962 A1 | 2/2016 | Rand | |
| 2017/0134333 A1 * | 5/2017 | Peterson | H04L 51/32 |

FOREIGN PATENT DOCUMENTS

| | | |
|---|---|---|
| WO | 2007052285 A2 | 5/2007 |
| WO | 2013131121 A2 | 9/2013 |
| WO | 2015192239 A1 | 12/2015 |

(56) References Cited

FOREIGN PATENT DOCUMENTS

| | | |
|---|---|---|
| WO | 2016026944 A1 | 2/2016 |
| WO | 2016112468 A1 | 7/2016 |

OTHER PUBLICATIONS

Luaran, "Effective Web 2.0 Tools for the Classroom Part 2", Universiti Teknologi MARA (2012).
Constine, "Facebook Launches Pseudonymous App 'Rooms' That Lets You Create Forums About Any Topic", Techcrunch, http://techcrunch.com/2014/10/23/facebook-rooms/ (Oct. 23, 2014).
MYSMS News, "All about mysms groups: How to text with a group of friends" (Jan. 17, 2013).
Haake et al., "End-User Controlled Group Formation and Access Rights Management in a Shared Workspace System", CSCW '04, ACM (Nov. 2004).
Khare, "How to Use Secret Facebook Groups to Enhance Your Business", http://www.socialmediaexaminer.com/how-to-use-secret-facebook-groups-to-enhance-your-business/ (Oct. 6, 2011).
Ribak et al., "'Ask Before You Search' Peer Support and Community Building with ReachOut", CSCW '02, ACM (Nov. 2002).
Yang et al., "A social network-based system for supporting interactive collaboration in knowledge sharing over peer-to-peer network", Int J. Human-Computer Studies 66, 36-50 (Sep. 4, 2007).
Perez, "Goodbye Ugly Forums! Moot Is a Flexible and Modern Platform for Online Discussion (and It's Free)", Techcrunch, http://techcrunch.com/2013/04/05/goodbye-ugly-forums-moot-is-a-flexible-and-modern-platform-for-online-discussion-and-its-free/ (Apr. 5, 2013).
Ou et al., "The Impact of Instant Messaging Tools on Knowledge Management and Team Performance", http://link.springer.com/chapter/10.1007%2F978-3-642-21364-9_9 (2011).
Ngambi et al., "Collaborative Questioning: A case of Short Message Service (SMS) for knowledge sharing", Proceedings of the Sixth Int. Conf. on Advanced Learning Techs. (ICALT'06), http://ieeexplore.ieee.org/xpl/login.jsp?tp=&arnumber=1652441&url=http%3A%2F%2Fieeexplore.ieee.org%2Fiel5%2F10997%2F34637%2F01652441.pdf%3Farnumber%3D1652441 (2006).
Metze et al., "A Community-based Expert Finding System," https://www.researchgate.net/publication/236612287_A_community-based_expert_finding_system (Oct. 19, 2014).
Ingram, "Are conversations better when they are open or closed?", Gigaom, https://gigaom.com/2012/03/28/are-conversations-better-when-they-are-open-or-closed/ (Mar. 28, 2012).
Loomio, "Loomio: The Occupy Inspired App for Consensus Decision Making", http://www.shareable.net/blog/loomio-the-occupy-inspired-app-for-consensus-decision-making (Mar. 19, 2014).
Van Grove, "Yobongo Launches Location-Based Chat App for iPhone", Mashable, http://mashable.com/2011/01/24/yobongo/#fLEmlAmdWiqV (Jan. 24, 2011).
Van Grove, "Find & Start Impromptu Parties at SXSW With Hurricane Party", Mashable, http://mashable.com/2011/03/08/hurricane-party/#s91x_dxA05qh (Mar. 7, 2011).
Huang et al., "Social Learning Networks: Build Mobile Learning Networks Based on Collaborative Services", Educational Technology & Society, 13 (3), 78-92 (2010).
Hong et al., "A Classification-based Approach to Question Answering in Discussion Boards", SIGIR'09, ACM (2009).
Harper et al., "Talk Amongst Yourselves: Inviting Users to Participate in Online Conversations", ACM IUI'07 (2007).
Guo et al., "Mobile Q&A for Enhancing Online Discussion", http://dl.acm.org/citation.cfm?id=2414567&dl=ACM&coll=DL&CFID=782605152&CFTOKEN=15205625 (2012).
Feiffer-Bohnen et al., "nuKIT—An Interactive Communication Tool via Smartphone Technologies", http://www.editlib.org/noaccess/111978 (2013).
Bernard, "A Few Good Email Discussion List Tools", Idealware, http://www.idealware.org/articles/fgt_email_discussion_lists.php (Dec. 2008).
Cole, "How can I set up a private 1-1 (professorstudent) dialogue exchange in Moodle?", http://sites.miis.edu/kb/2012/08/27/how-can-i-set-up-a-private-1-1-professor-student-dialogue-exchange-in-moodle/ (Aug. 27, 2012).
Ardichvili et al., "Motivation and barriers to participation in virtual knowledge-sharing communities of practice", Journal of Knowledge Management, vol. 7 No. 1 2003, pp. 64-71.
Ackerman et al., "Answer Garden 2: Merging Organizational Memory with Collaborative Help", ACM 0-89791-765-0/96/11, 1996, Cambridge, MA USA.
Doerner et al., "Supporting Expertise Awareness: Finding Out What Others Know", CHIMIT'07, ACM 1-59593-635-6/07/0003, 2007, Cambridge, MA USA.
Ehrlich et al., "Searching for Experts in the Enterprise: Combining Text and Social Network Analysis", GROUP'07, ACM 978-1-59593-845-9/07/0011, 2007, Sanibel Island, Florida USA.
McDonald et al., "Expertise Recommender: A Flexible Recommendation System and Architecture", CSCW'00, ACM 1-58113-222-0/00/0012, 2000, Philadelphia, PA USA.
Web site for Jelly app at www.jelly.co, taken Oct. 16, 2014.
Wikipedia article for Jelly app at http://en.wikipedia.org/w/index.php?title=Jelly_(app)&oldid=603559177.
Constine, "Facebook's Josh Miller Confirms He's Built Something, But It's Not Just About Anonymity", TechCrunch (Oct. 8, 2014), http://techcrunch.com/2014/10/08/facebook-anon/ (Oct. 8, 2014).
Submission of Prior Art Under 37 CFR 1.501, in re: U.S. Pat. No. 7,801,879, submitted Nov. 17, 2010.
Web site for ChaCha Search at http://about.chacha.com/about/faqs/, taken Oct. 16, 2014.
Web site content for Venmo at http://www.venmo.com, taken Jan. 25, 2018.
Web site content for Facebook at http://www.facebook.com, taken Jan. 25, 2018.
International Search Report issued in PCT/US12/47667 (dated Dec. 22, 2017).

* cited by examiner

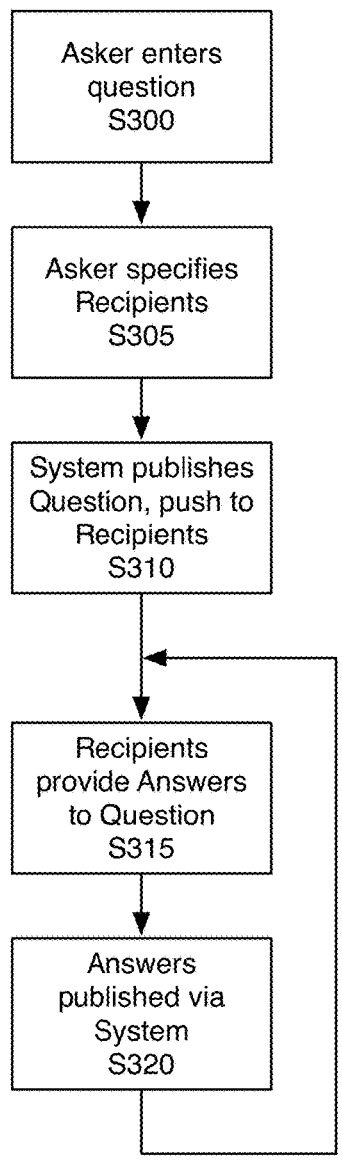
FIG. 3
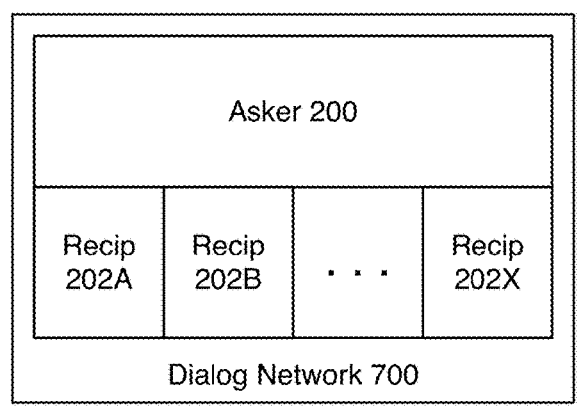
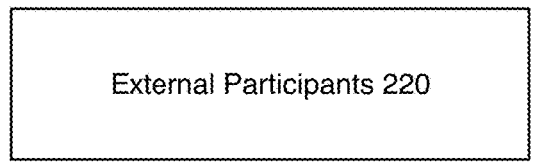
FIG. 7

000                 Rushline http://rushline.com     Google

- 600 -

Hi John! Dan asked:

Any good use for color lens filters?     - 605 -

I just found a bunch of old color lens filters laying around from my film camera days. Some of them fit my new DSLR lenses. Is there any use for these things nowadays or would you just post-process the digital files to get the same effect?

- 610 -

1 person has replied to Dan's question.
— 615

What do you think?

enter text

- 620 -

The following people are in on this conversation:

You (John.Doe@localhost.com)
Jane Smith (480-555-0100)
Bob Smartola (480-555-1212)
Dan Maker (dan@localhost.com)

635

- 625 -

☑ Withhold my identity from the public    [ Submit! ]   or Cancel

☑ Conceal my identity from everybody except Dan, who originally asked this question.    — 636

640

Replies:
Generally, no. You can use a UV filter to protect your lens. Otherwise, just the rare situation when a color filter can help even exposure in all channels (e.g. underwater to cut blue channel intensity). *Jane Smith*     Reply

SYSTEMS AND METHODS FOR ENABLING DIALOG AMONGST DIFFERENT PARTICIPANT GROUPS WITH VARIABLE AND ASSOCIATION-BASED PRIVACY

CROSS-REFERENCE TO RELATED APPLICATIONS

The present application claims the benefit of U.S. provisional patent application 62/508,989, filed May 19, 2017; and U.S. provisional patent application 62/468,464, filed Mar. 8, 2017; and U.S. provisional patent application 62/460,723, filed Feb. 17, 2017; and U.S. provisional patent application 62/419,878, filed Nov. 9, 2016; and U.S. provisional patent application 62/409,475, filed Oct. 18, 2016; and U.S. provisional patent application 62/376,894, filed Aug. 18, 2016. The present application is also a continuation-in-part of pending U.S. nonprovisional patent application Ser. No. 15/095,638, filed Apr. 11, 2016, which claims the benefit of provisional U.S. patent application No. 62/146,061, filed on Apr. 10, 2015; and which is also a continuation-in-part of U.S. nonprovisional patent application Ser. No. 14/848,172, filed Sep. 8, 2015 and issued as U.S. Pat. No. 9,473,447 B1 on Oct. 18, 2016; which is a continuation of U.S. patent application Ser. No. 14/526,488, filed Oct. 28, 2014 and issued as U.S. Pat. No. 9,160,555 on Oct. 13, 2015; which is a continuation of U.S. patent application Ser. No. 14/525,169, filed Oct. 27, 2014 and issued as U.S. Pat. No. 9,122,931 on Aug. 18, 2015.

TECHNICAL FIELD

The present disclosure relates in general to data processing techniques, and in particular to systems and methods for network-based communication amongst individuals, with variable and/or association-based privacy.

BACKGROUND

Electronic communication is a method for exchanging digital messages and information amongst multiple individuals. Electronic communication may operate across the Internet or other electronic communication networks. Examples of electronic communication include email, mobile and computer applications ("apps"), Short Messaging Service (SMS) communication, Multimedia Messaging Service (MMS) communications and web-based applications facilitating conveyance of information using a web browser.

Electronic communications have become a primary method by which people communicate information. One form of electronic communication that has become particularly popular is online question-and-answer services. In general, a question-and-answer service is a service that allows its end users to engage in dialog by posting questions or other opening content, posting responses to such content, and/or viewing content including responses to questions that others have posted. In some systems, ongoing dialog can occur amongst multiple participants and users contribute content and respond to content contributed by others. Thus, Q&A services primarily act to store, organize and facilitate the distribution of user-generated content.

In many existing question-and-answer services, users ask questions to a predefined community of users registered with the service. Often, questions are organized within predefined topics in order to aggregate users having a common interest in the subject matter. After a question is submitted, the asker waits for a qualified member to see the question, and hopefully, respond with a relevant, informative and accurate response.

Existing Q&A models typically rely on attracting audiences of primarily strangers around specific topics, with the hope that human nature and shared interests will lead users to help one another. The self-selecting nature of these communities, and the fact that users typically do not know each other outside of the community, can lead to a wide variety of responder backgrounds and qualification levels. Many responders may be unqualified from the subjective viewpoint of the asker, resulting in unwanted and low quality answers for both the asker and future readers of the dialog. Existing solutions to this challenge, such as point systems or cumbersome biographical information collection, raise the hurdle to participation and often discourage qualified contributors.

Some systems attempt to provide question-and-answer functionality with open-ended subject matter and no inherent system of organization. However, in such systems a wide diversity of subject matters may inhibit the formation of an active user community within any given topic, which may in turn yield significant delays between the time a question is asked and the time a meaningful answer is received.

Other prior question-and-answer systems implement subject matter specialization in order to promote development of an active community providing timely and high quality answers. However, such systems may require a large user base in order to ensure that a sufficient number of users with relevant knowledge and motivation to respond are regularly viewing questions to provide answers in a timely manner. Attracting and maintaining a sufficient user base that is ready, willing, and capable of engaging in timely, productive dialog, can be challenging and elusive for any site operator.

Privacy issues may also be important in maximizing the effectiveness of online communications. It is human nature to trust certain people or groups of people, and go to them for insights and discourse. Yet the most valuable responses might have come from people outside these trusted groups, including people we don't know. It is often privacy concerns that stop us from going beyond our trusted groups for insights and discourse.

Some systems allow users to participate anonymously. However, such systems may be subject to trolling, abusive content and low-quality discourse. Other systems require publishing real-names from users to provide accountability and avoid such problems. However, many users may be hesitant to share information publicly under their own names, even if the information is of relatively high quality. To address these privacy concerns, we avoid opening our conversations to others, foregoing access to what might have been the most useful responses.

SUMMARY

The present disclosure describes systems and methods for electronic communications amongst individuals, providing mechanisms for variable and/or association-based privacy. The system can be implemented on one or more network-connected servers communicating with a plurality of user devices via one or more digital communication networks, such as the Internet and cellular networks. Dialog content can be presented via, e.g., web site, a user-installed application, or directly within notifications.

In accordance with one aspect, an individual's view of a dialog varies based on their association with the dialog, in order to limit access to individually-identifying information regarding dialog participants. For example, one or more network-connected servers implement a communications platform providing multiple views of a dialog, of which a subset of individuals are members. The dialog includes one or more content contributions, authored by members of the dialog. A first view is displayed to dialog members, such as via a web browser or mobile application in communication with the servers via a data network. The first view includes content contributions from dialog members, rendered proximate indicia identifying each content contribution's author. The identifying indicia may include, for example, a content contributor's real name, the content contributor's picture, and/or information from a content contributor's individually-configured profile. The second view is displayed to one or more individuals that are not dialog members. The second view includes dialog member content contributions, rendered without indicia identifying each content contribution's author. In various embodiments, the individuals to whom the second view is presented may be (other than dialog members) all public Internet users, registered users of a particular network-connected computing platform (for which registration may or may not be publicly available), various subsets of registered users of a particular network-connected computing platform, or members of a restricted access community.

Some embodiments may enable a dialog participant to take a dialog, or portion thereof, that was initially private, and make available more broadly views of the dialog incorporating variable and/or association-based privacy. Such a system may initially facilitate private dialog amongst dialog members, such as by implementing a private or group platform for messaging or chat. A request to make public at least a portion of the private dialog may be received from a dialog member, in response to which the above-described first and second views of the dialog can be made available. In some embodiments, only a dialog opening member may make available public views of a dialog. In some embodiments, any dialog member may make available public views of a dialog. Publication consent may be solicited from other dialog members prior to making available a second view. Some embodiments automatically make second views available to individuals other than dialog members based on predefined system rules. In some embodiments, second views may be published to third party systems. Some embodiments may enable dialog members to redact content from the second view of the dialog, thereby providing dialog participants with a mechanism to, e.g., avoid disclosure outside the dialog membership of private or personally-identifiable information within the body of a content contribution.

Individuals may become members of a dialog, and therefore be provided with a dialog view inclusive of content contributor identification, via various mechanisms. For example, an individual may become a dialog member by an opening user explicitly identifying them as a dialog member. An individual may become a dialog member via invitation from another dialog member. An individual may become a dialog member by submitting a subscription request for the dialog, which request may require approval by another individual, such as the dialog opening member or another dialog member. In some embodiments, variable privacy mechanisms may be based on not only membership within a dialog network, but also social connections established and maintained between individuals.

In some embodiments, dialog network members may be provided with a dialog display user interface that includes a dialog display region and a view toggle indicium. A first portion of the view toggle indicium may be selected to render a private view of a dialog within the dialog display region. The private view renders the dialog as it is made available to other dialog network members, e.g. inclusive of private information such as indicia identifying dialog content contributors. A second portion of the view toggle indicium may be selected to render a public view of a dialog within the dialog display region. The public view renders the dialog as it is made available to individuals other than dialog network members, e.g. excluding private information such as indicia identifying dialog content contributors. The view toggle indicium can thereby be used to readily toggle between views, thereby highlighting to a user differences in content presented to differing audiences.

In accordance with some embodiments, variable and/or association-based privacy mechanisms may be implemented in the context of an online discussion forum. Forum members may be provided with a view of dialog content that includes indicia identifying content contributors, while individuals who are not members of a forum may be provided with views of forum dialog content that excludes identification of content contributors. In some embodiments, individuals may become members of such a forum by opting in, or joining the forum. In some embodiments, forum membership may be restricted, such as by invitation from a forum administrator or another forum member.

In some communication platforms implementing association-based and/or variable privacy mechanisms, a privacy-enabling system may integrate with external communication systems. The original source of a dialog may be a communication platform that is separate and independent from the privacy enabling system. Additionally or alternatively, a dialog view generated by the privacy-enabling system may be displayed to other individuals via one or more other external communication platforms.

Variable privacy mechanisms may be provided to modify dialog content rendering based on pertinent variable privacy criteria, such as the status of a viewing user as a dialog network member or dialog guest. Such variable privacy mechanisms may include automated or manual redaction, or pseudonymous substitutions for personally-identifiable content. Users may configure privacy words within user-associated profiles that are subject to variable privacy mechanisms, such as name, nick names, family members, employers, addresses, email addresses, or other privacy words that a user believes to be personally identifiable. Some privacy words may be replaced, in some views, by references descriptive of the nature of the replaced content, such as "Friend n", "Company n", or "Email Address n". Other privacy words may be replaced by standard redaction indicators. Dialog content may be displayed with visual cues to alert users to the variable privacy treatment accorded to such content. Visual cues may include highlighting in a contrasting tone, and/or message boxes with explanations of how content is rendered to various viewers.

Some embodiments may be utilized to implement pre-scheduled, group dialogs, such as Ask Me Anything ("AMA") events. A web-based user interface may be provided via which individuals can pre-register as AMA participants. Additionally or alternatively, an AMA host and/or other participant may invite individuals as participants. A dialog may be initiated for the event. Participants may be permitted to submit questions in advance of a scheduled event, which questions may be queued for review by the AMA host or other administrator. During the event, a first view of the dialog may be provided to the AMA host and registered participants, in which the dialog contributions are presented with their contributors' individually-identifiable information. A second view of the dialog may be provided to others, excluding individually-identifiable information associated with the dialog participants, and optionally the AMA host.

Some embodiments may be utilized to seamlessly integrate content from a variable privacy system with a third party social media platform. Content contributions to the variable privacy platform may be posted to a social media platform as a URL. The URL may be scraped by the social media platform, in response to which the variable privacy platform presents an untrusted content item view. The scraped, untrusted view may be delivered directly into social media platform user feeds. Social media platform users may then select the URL within their feeds to directly query the variable privacy platform for the content item, in response to which the variable privacy platform may authenticate the user for eligibility to receive a trusted view of the content item. In yet other embodiments, the variable privacy system may provide an API that permitting a social media platform to submit viewer-specific queries for content items, such that a trusted or untrusted view can be delivered directly to a viewer's social media feed based on the viewer's trust relationship with the content item being queried.

Various other objects, features, aspects, and advantages of the present invention and embodiments will become more apparent from the following detailed description of preferred embodiments, along with the accompanying drawings in which like numerals represent like components.

BRIEF DESCRIPTION OF THE FIGURES

FIG. 3 is a process for Q&A communications.

FIG. 6 is a user interface for answering a question, in accordance with one embodiment.

FIG. 7 is a dialog network block diagram.

DETAILED DESCRIPTION

Figure 1:
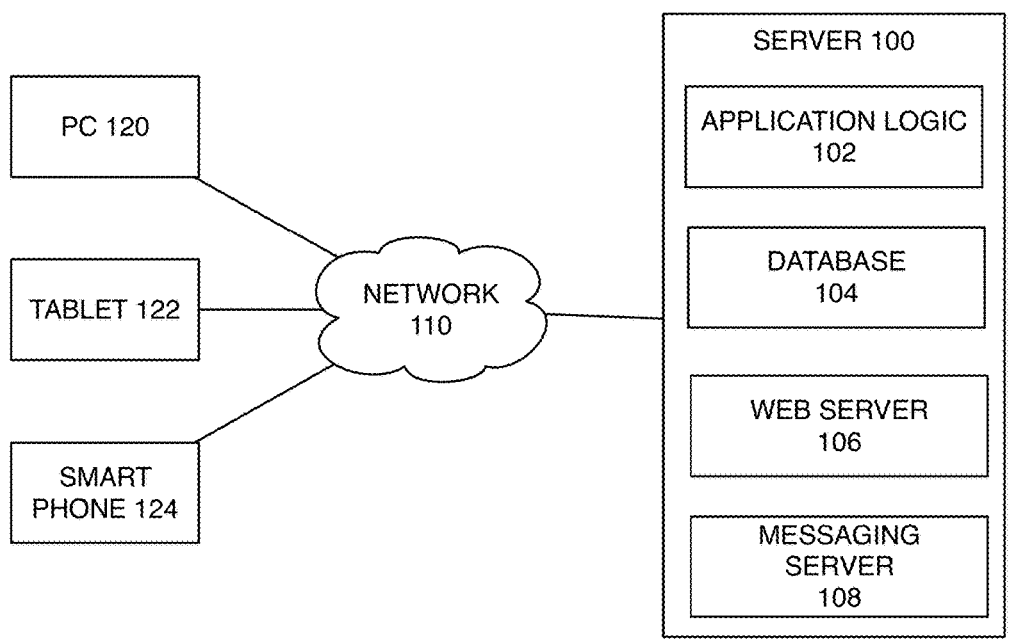
FIG. 1 is a schematic block diagram of a question-and-answer system, in accordance with a first embodiment.

While this invention is susceptible to embodiment in many different forms, there are shown in the drawings and will be described in detail herein several specific embodiments, with the understanding that the present disclosure is to be considered as an exemplification of the principles of the invention to enable any person skilled in the art to make and use the invention, and is not intended to limit the invention to the embodiments illustrated.

From the perspective of its end users, the value of a question-and-answer service depends significantly on multiple factors. Such factors may include: how convenient it is to post a question; the extent to which users receive accurate, insightful and meaningful answers to their questions; the timeliness in which users receive answers to their questions; the ease with which users can contribute answers to the system; the extent to which spam and unhelpful content contributions can be minimized; the extent to which users may avoid reputation risk and undesired or inadvertent sacrificing of user privacy; and the extent to which users can easily locate and view previous useful conversations other people have had on the topic of their questions.

FIG. 1 is a schematic block diagram of an embodiment of a question-and-answer communications system. Server 100 communicates, inter alia, via computer network 110, which may include the Internet, with user devices such as personal computer 120, tablet computer 122 and smart phone 124. Server 100 implements application logic 102, and operates to store information within, and retrieve information from, database 104. The term "database" is used herein broadly to refer to an indexed store of data, whether structured or not, including without limitation relational databases and document databases. Web server 106 hosts one or more Internet web sites enabling outside user interaction with, amongst other things, application logic 102 and database 104. Messaging server 108 enables messaging, such as mobile network messaging service (e.g. SMS or MMS), email, or application notifications, between server 100 and user devices 120, 122 and/or 124.

While depicted in the schematic block diagram of FIG. 1 as a block element with limited sub elements, as known in the art of modern web applications and network services, server 100 may be implemented in a variety of ways, including via distributed hardware and software resources and using any of multiple different software stacks. Server 100 may include a variety of physical, functional and/or logical components such as one or more each of web servers, application servers, database servers, email servers, SMS or other messaging servers, and the like. That said, the implementation of server 100 will include at some level one or more physical servers, at least one of the physical servers having one or more microprocessors and digital memory for, inter alia, storing instructions which, when executed by the processor, cause the server to perform methods and operations described herein. While a server based architecture is depicted, it is understood other network configurations could be used to implement methods described herein, such as e.g. peer to peer network configurations.

Figure 2:
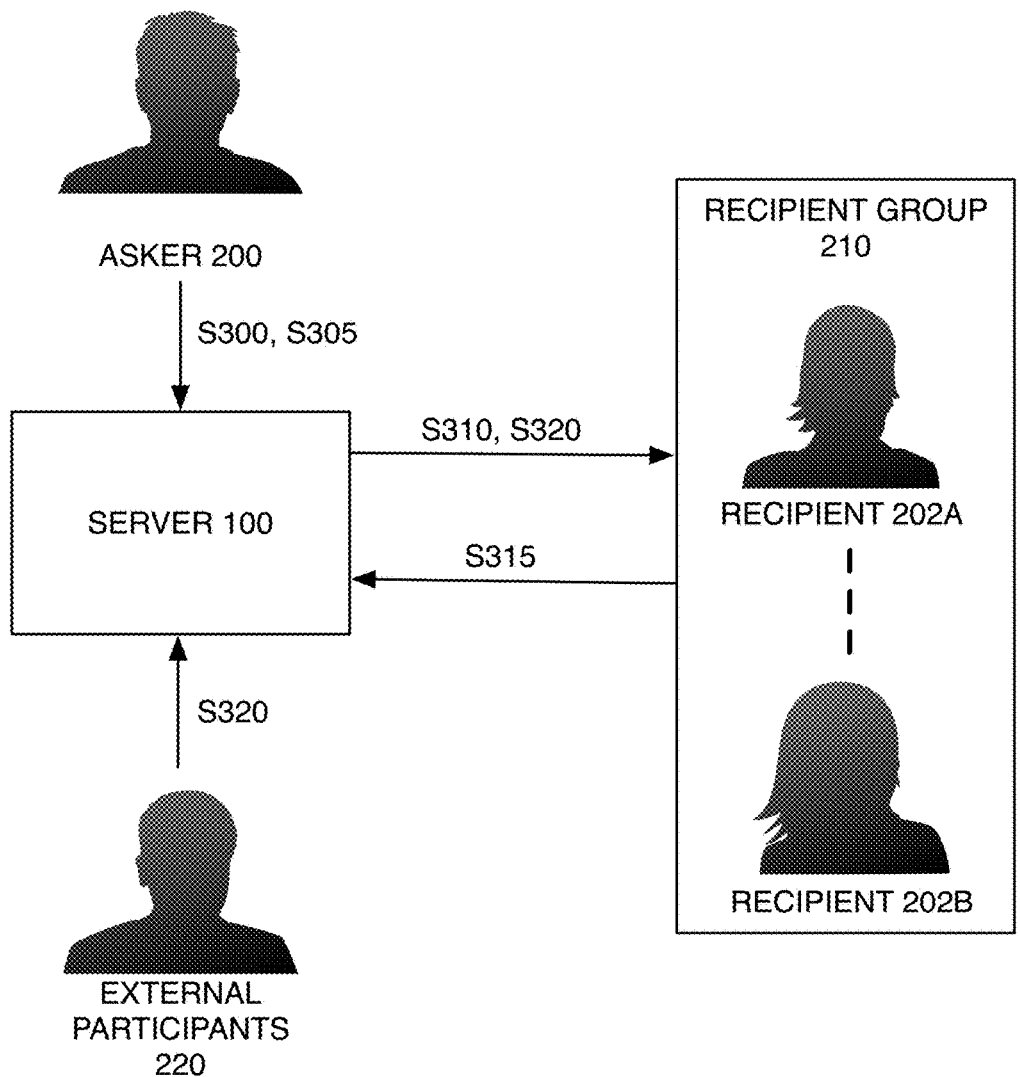
FIG. 2 is a schematic block diagram of participants in a Q&A dialog.

The communication system of FIG. 1, executing application logic 102, can be utilized to implement question-and-answer communication services amongst the individuals illustrated in FIG. 2. Such individuals include asker 200, recipient group 210 which includes one or more recipients 202, and one or more external participants 220. Asker 200 and recipient group 210 can be collectively referred to as dialog network members. Individuals other than asker 200 and recipient group 210, whether previously registered with servers 100 or not, fall within the group of external participants 220.

Figure 3B:
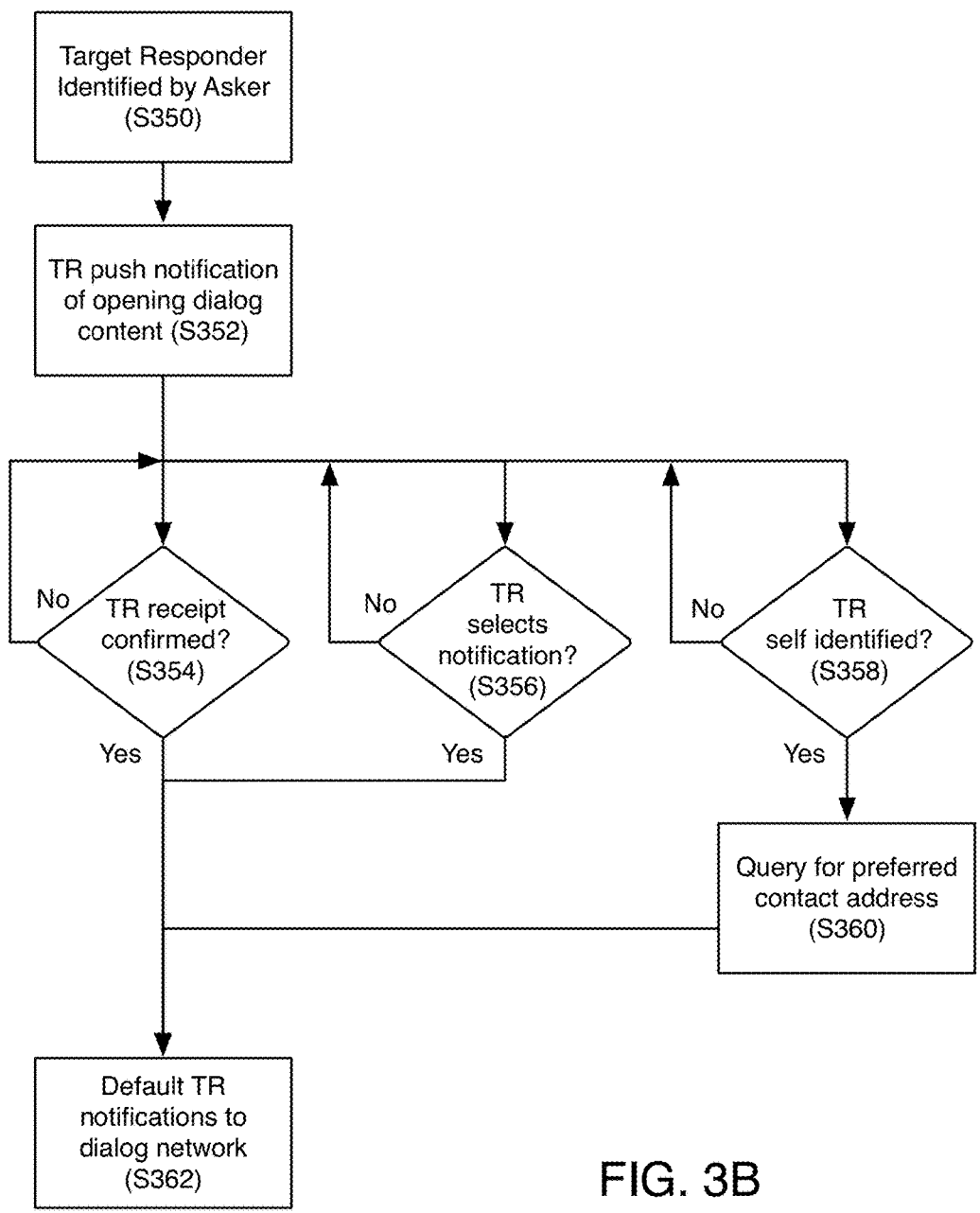
FIG. 3B is a process for controlling default push notifications of dialog content.

FIG. 3 is a flowchart illustrating an exemplary process by which the individuals depicted in FIG. 2 utilize the communications system of FIG. 1. In step S300, asker 200 communicates a question to server 100, and accordingly application logic 102. The question can be conveyed via any of several communication methods, including, without limitation: entry into a web page rendered in web browser software on a device such as PC 120, tablet 122 or smartphone 124 in communication with web server 106; entry into a mobile app installed locally on tablet 122 or smartphone 124 and communicating with server 100; or transmission via SMS or MMS messaging from smart phone 124 to messaging server 108. It is contemplated and understood that different embodiments may utilize one or more such mechanisms for conveying questions, in varying combinations, depending upon the desired characteristics of the system implemented.

Figure 4:
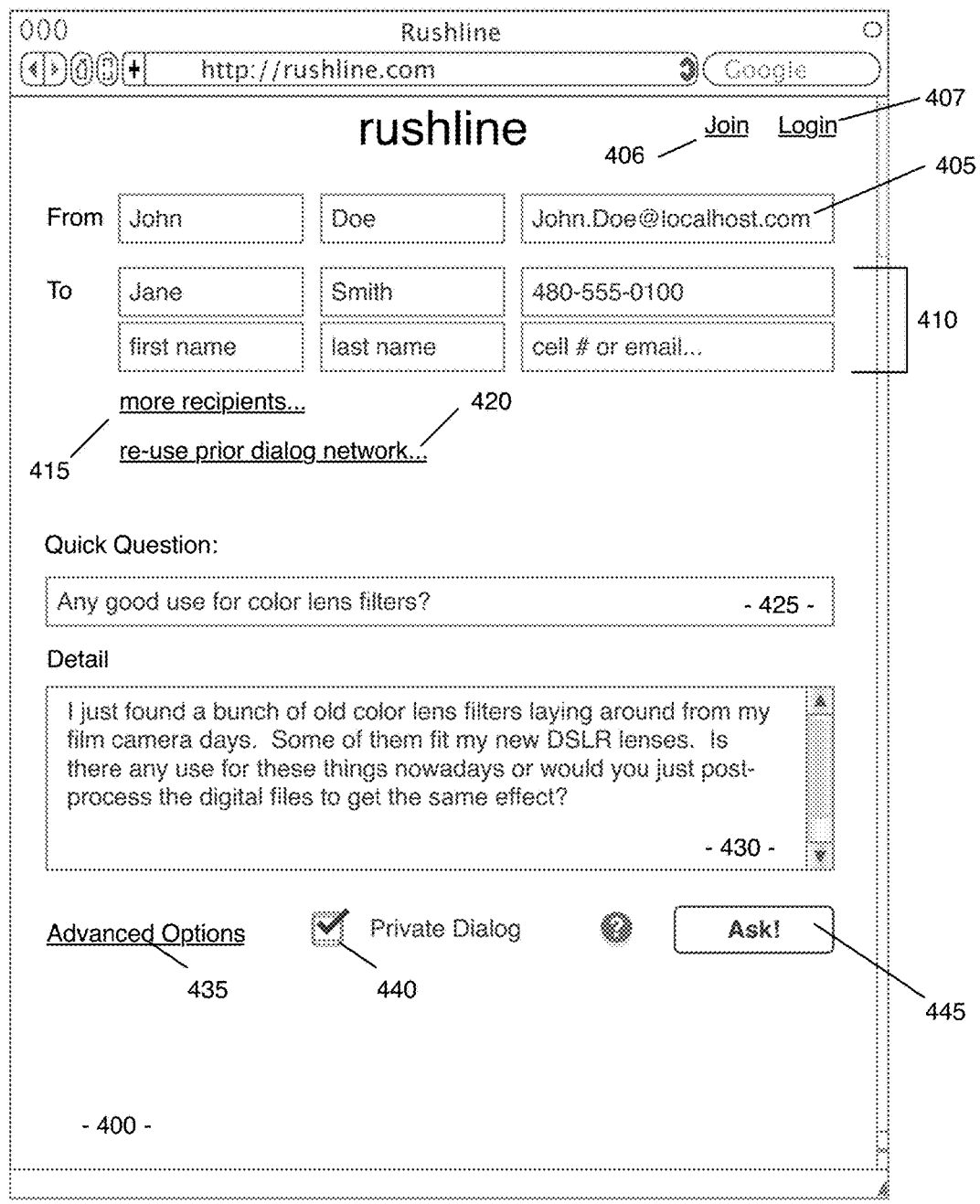
FIG. 4 is a user interface for submission of a question.

FIG. 4 illustrates an exemplary user interface for communication of a question to server 100. Web page 400 is rendered on a user device via communication between the user device and web server 106. Text entry fields 405 are provided for asker 200 to enter their contact information, in the event that asker 200 has not already joined the service and created a user account using link 406, or logged in to a preexisting user account using link 407. Asker 200 can enter opening dialog content, such a question, using text entry field 425 for a question summary, and text entry field 430 for question detail.

In step S305, asker 200 specifies recipients 202 within recipient group 210. For example, in some embodiments, asker 200 may be required to directly enter some form of electronic contact address (such as email address, mobile phone number for SMS/MMS messaging, username for messaging applications such as Skype or Apple Messages) for each recipient 202 within recipient group 210. In the user interface of FIG. 4, fields 410 are provided for asker 200 to manually enter question recipient information. Link 415 is provided to allow asker 200 to specify additional users by entering additional recipients manually, selecting from a user-specific address book (if logged in), or selecting from previously-configured dialog networks (explained further below).

Preferably, askers are prompted by the system to enter first and last names for each recipient, as reflected in FIG. 4 and fields 410. The opener and the listed individuals will become members of a dialog network and as such, may have special privileges that non-members do not have. One such special privilege that can then be provided is to always see the first and last name of the asker and each recipient included in the dialog network. In some embodiments, dialog network member information is revealed to other dialog network members regardless of whether the recipient may have configured their first and last name in the system. This is a courtesy to everyone in the dialog network, so that they know whom they are conversing with since the dialog network members may be able to see each other's posts and associated personally identifiable information. Non-members of the dialog network will preferably never see the list of first and last names as entered by the asker. If a recipient chooses to respond while publicly sharing their first and last name, then that personally identifiable information will be available to users outside the dialog network, but otherwise it will not.

Preferably, recipients 202 are (a) selected from amongst a group of people that asker 200 already knows and trusts, (b) irrespective of whether the recipients have ever used the question-and-answer service, and (c) with no need for the recipients to be part of any online network or any other predefined group. While these characteristics of question recipients are believed to be beneficial, it is understood that other embodiments may be implemented without requiring all or any of these attributes for targeted recipients.

A communications system in which users direct questions to a dialog network, with specific recipients that an asker knows and trusts, may solve numerous problems that can arise in systems where questions are posted generally to system members. For example, a pre-existing relationship between the asker and recipient may increase the likelihood that the recipient will (a) expend the time and effort to respond to the question, and (b) respond in a timely manner. Asking questions to recipients that an asker knows and trusts may also improve the quality of answers, compared to other systems in which questions are available generally for response by any member of the community. Theoretically, recipients may be selected based on the asker's understanding that the recipient has some level of expertise relating to the question, thereby avoiding situations in which content quality is diluted by unqualified or unknowledgeable individuals providing answers.

Implementing a Q&A system enabling participants to communicate directly with people they already know may result in a paradigmatically different quality dynamic for several reasons. For one, the asker is likely to select participants qualified to provide input on the topic at hand; otherwise, the asker likely would not risk bothering or wasting the time of a known colleague by directing a question to an unqualified or uninterested source. Additionally, the fact that people are engaging with other people they already know may lead them to be increasingly thoughtful and honest in their responses to minimize their real life reputation risk within their respected personal networks. Ideally, the asker and the selected group of recipients will collectively form a Minimum Viable Dialog Unit for each question asked, the Minimum Viable Dialog Unit being a group of individuals collectively having sufficient knowledge and expertise to provide helpful answers to the question asked without turning to additional resources. Combining a Minimum Viable Dialog Unit with trusted relationships and a supporting electronic communications platform, as described herein, can enable individuals to obtain fast and accurate responses to a wide variety of questions.

Implementing a system in which an asker can direct a question to a recipient without regard for whether the recipient has ever used the system may also provide benefits, as compared to systems in which questions are directed to an existing community user base. This characteristic can operate to increase the pool of individuals providing valuable information to the system, and reduce friction in obtaining responses from qualified individuals (some of which may be hesitant to register with or sign up for a new service). Similarly, enabling a recipient to receive a question without requiring their participation in any particular online network, online system or other predefined group, also operates to maximize the pool of prospective recipients that can provide valuable information, and reduce friction in obtaining responses from qualified individuals.

Figure 5:
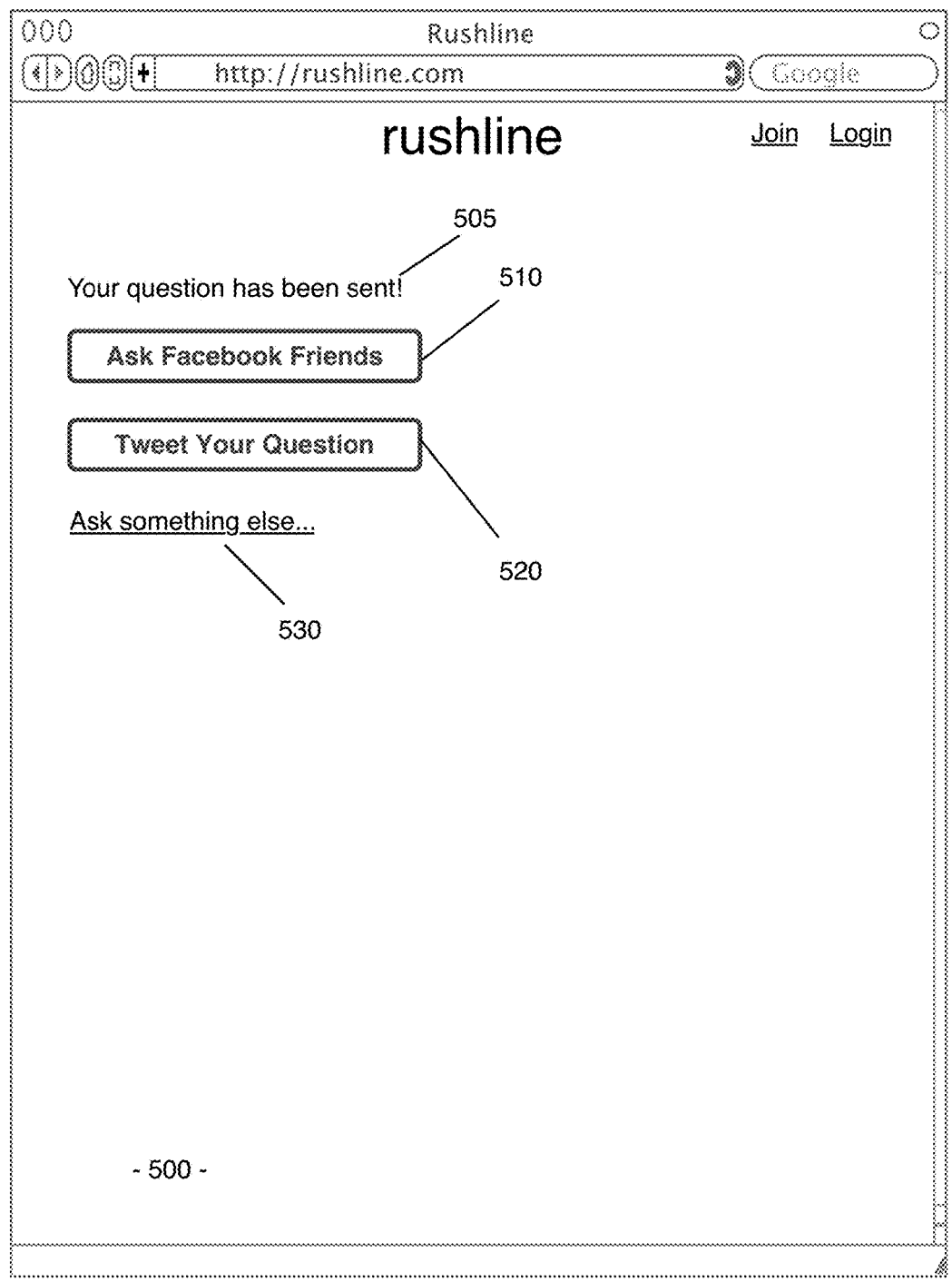
FIG. 5 is a user interface for question submission confirmation.

Once asker 200 specifies a question and recipients, asker 200 can select Ask! button 445 to submit the question information to server 100. FIG. 5 is an exemplary web browser user interface presented to asker 200 after selection of Ask! button 445. Message 505 provides confirmation that the question has been submitted. Buttons 510 and 520 enable a user to publish notification of a question via other communication platforms, such as social networking platforms. Link 530 allows a user to immediately enter another question.

Server 100 then manages ensuing publications, notifications, dialog and answers. In step S310, server 100 operates to publish the question (e.g. by making it available via a web site), and push notifications of a question asked to recipient group 210. Notifications are pushed to recipient group 210 using the contact information provided by asker 200 in step S305 and associated digital communication protocols. For example, if asker 200 provides an email address for a recipient 202, in step S310 server 100 may operate to transmit an email via network 110 and email servers, which email can be received by the corresponding recipient using email application software implemented on the recipient's computing device(s), such as a smartphone, PC or tablet. Email notifications will typically include a hyperlink URL that, if selected by the recipient, launches a local web browser application and initiates communications between the user's device and web server 106 implemented within server 100.

Preferably, hyperlinks included within a notification are uniquely associated with the notification, such that corresponding resource calls to server 100 can be used to identify the recipient and the question to which the recipient is responding, using information within the hyperlink. Hyperlinks can be uniquely associated with the notification by embedding special identifiers unique to that notification within the URL, such as a user identifier or embedding an authorization ID that provides the user with special authority that some other users may not have, such as performing functions normally reserved to registered members of the dialog or the overall system. In other embodiments, a URL can act as a dialog identifier, providing a unique association between a notification and a particular dialog. Additionally or alternatively, a unique identifier can be included within the body text of the email; in which case the user may be queried by servers 100 to authenticate by manually entering the identifier for identification. While numerous embodiments can be implemented, preferably one or more identifiers (whether URL, UID, cookies, or other) provide correlation with one or more of the user or user device, the dialog and/or the particular notification.

If asker 200 provides a mobile telephone number for a recipient 202, in step S310 server 100 may operate to transmit a SMS or MMS message via messaging server 108 and network 110 to that user's mobile phone, optionally also including a hyperlink to redirect further interactions to a web application hosted by web server 106.

If a designated recipient has downloaded and installed a dedicated app on the recipient's mobile device, in step S310 notification may be provided via an app notification protocol. In an exemplary embodiment, notifications to users of a mobile app will further receive some or all of the question contents directly within the notification.

Because question notifications in step S310 are directed to specific individuals, by another individual typically known to the recipient, to the recipient it may appear that they were directly contacted by someone they know seeking their help. Furthermore, that contact will often take place using whatever contact method that asker might ordinarily use to contact the recipient for any other reason. By providing a personal communication amongst known associates, it is expected that simplicity of communications and timeliness of responses will be improved compared to other question-and-answer systems, while barriers to participation will be reduced. Barriers to participation can also be reduced to the extent that recipients need not be members and need not become members to learn a question has been asked, to answer such questions, or to start their own dialogs (e.g. as a result of responding to pre-validated notifications).

In step S315, any of recipients 202 can submit answers to the question. The term "answer" is used herein to refer to communications responsive to an initial "question" communication. It is contemplated and understood that the term "answers" may include any type of communication responsive to a "question." Further, it is contemplated and understood that the term "question" may include any number of types of opening communications intended to lead to an exchange of thoughts or opinions between multiple users. For example, a "question" could include a request for clarification or additional information by the asker, or an invitation to comment on a document, news article or other topic. In this way, communication system embodiments described herein can be utilized broadly as dialog engines, facilitating the exchange of communications, such as ideas or opinions on a particular issue, between two or more people. The asker can also be referred to more broadly as an opening user, to the extent that the asker's communication opens the dialog with other users.

One or more means of communication can be utilized to submit an answer in step S315. FIG. 6 illustrates an exemplary user interface for submission of an answer by a recipient 202. Web page 600 is rendered on a user device via communication between the user device and web server 106 implemented within server 100, in response to selection of a URL within a question notification in step S310. Fields 605 and 610 state the question to which a response is being provided. Field 615 notifies the user of the number of replies to date, and provides a link to view those replies, which are also displayed lower on the page in region 645. Text entry field 620 enables a user to enter their response. Field 625 provides the respondent with an indication of the individuals within the dialog network, who will be notified of responses to the question and who will see a list of other people in the dialog network even if the dialog has been marked "private" by the asker (see more below). While the embodiment of FIG. 6 shows both names and contact addresses within field 625, it is contemplated and understood that in other embodiments, it may be desirable to provide names without contact addresses in field 625, in order to provide greater confidentiality to participants. When the user has finished entering an answer into field 620, selection of button 640 advances the process of FIG. 3 to step S320.

In step S320, answers provided in step S315 are published. Preferably, the publication in step S320 includes making answer content publicly available via request to networked database 104. Making answer content available via request to a networked database 104 can be achieved in a number of ways, some or all of which may be provided simultaneously. One such way is via an Internet web site implemented by web server 106, communicating with database 104. Another means of making answer content available is via request from a locally-installed application executed on user device 120 and interacting with networked database 104, potentially through an API or application server within server 100. Another is via request from a mobile device application executed locally on user devices 122 and 124 and interacting with networked database 104, again likely through an API or application server within server 100.

Preferably, the electronic communication service will be configurable to provide selective push notification of new content. Asker 200, recipients 202 and external participants 220 can be configured via application logic 102 and messaging servers, to receive direct communication of new content contributed to dialogs with which they have interacted or have some relationship. For example, notifications can be controlled based on, amongst other things, the prospective notification recipient's relationship to the dialog (e.g. role as asker, target recipient, external user). In some embodiments, a question asker may by default receive push notifications of all dialog contributions, whether from target responders or external users. In other embodiments, a question asker may by default receive push notifications of dialog contributions from target responders only, unless the asker expressly opts into receiving notifications of content contributions from external users as well. Target responders may also by default receive push notifications based on their relationship to the dialog as a target responder, with the default scope of notifications including contributions from dialog network members or from all users, depending on system design preferences.

Push notification of new content may also be triggered by a user's interaction with the system and/or a particular dialog. For example, in some embodiments, a target responder may by default receive push notification of all contributions from dialog network members. In other embodiments, a target responder may by default receive push notification of the asker's opening dialog content only, at which point interaction with the communication system by the target responder can change the default push notification setting to opt into notifications of content contributions from dialog network members and/or external users. Interactions controlling default push notification behavior may include receipt by servers 100 of a response from the notification recipient. Such responses include, without limitation: transmission by the recipient user device of an email "read receipt"; transmission by the recipient user device of a messaging delivery confirmation; selection by a recipient user device of a URL included within a notification of dialog content; selection of user interface elements rendered on a user device web browser interacting with servers 100; and selection of user interface elements rendered on a user device locally installed application interacting with servers 100.

Asker 200 may also receive a direct notification via a predetermined form of communication (e.g. email, SMS, app notification), immediately upon receipt by server 100 of an answer from a member of the dialog network by server 100 in step S315. Optionally, asker 200 can configure notifications to further include notifications of answers by external users 220.

Server 100 can also be configured to promptly transmit digital communications containing notification of, and optionally content from, an answer communication of step S315, to one or more members of recipient group 210. FIG.

3B illustrates an exemplary process for managing push notifications to recipient group members in an electronic communication system of the nature described herein. In order to avoid the appearance of "spamming" or undesirably high messaging volume on topics not of interest to the recipient, preferably, answers will only be automatically communicated to a member of recipient group 210 after that member has acknowledged receipt of the original question in some way and has not opted out of further communications regarding the question.

Specifically, in step S350, the asker identifies the target responder. In step S352, servers 100 transmit a push notification to target responders, notifying them of the opening dialog content. Steps S354, S356 and S358 operate in parallel, through which servers 100 await confirmation of notification receipt by the target responder (S354, e.g. email read receipt or messaging platform delivery confirmation); target responder selection or activation of the notification (S356, such as selection of a URL within the notification); or self-identification by the target responder (S358, such as the target responder logging into a web site hosted by servers 100 and entering an identifier or contact address associated with that target responder). If the target responder self-identifies in step S358, the target responder is further queried in step S360 to confirm or self-specify their preferred contact address, which may be different than the contact address specified by the asker in step S350. In any event, upon interaction by the target responder in steps S354, S356 or S358, servers 100 default to providing the target responder with push notification of contributions by the dialog network (step S362).

In addition to facilitating prompt exchange of valuable information amongst users, the communication system described herein also enables a new mechanism for organizing system content. Traditionally, many question-and-answer systems organize their information by topical communities that are predefined and categorized by an intended scope of subject matter. Participants typically self-select membership (e.g. by finding such community, forum, blog, or thread while browsing or searching, then choosing to subscribe to it) based on how close of a fit they can find for their specific interests. Users can then configure their associations and notifications based on their interest level. For example, for topical communities of high interest level for a user, the user may configure the system to receive immediate publication of questions and answers via email. For topical communities of less interest level, the user may receive "daily digest" emails summarizing the day's communications. For topical communities of low interest level, the user may receive "weekly digest" emails summarizing communications that took place during the course of a given week. For communities of even lower interest level, the user may receive no notification of new questions and answers, and instead may elect to only view communications when the user logs into a web site for the system or utilizes a mobile app dedicated to the system. As a result, in such conventional question-and-answer systems, a user asking a question or submitting a response in a question-and-answer dialogue may not be able to determine or control if and when any other particular user is notified of the communication, thereby potentially inhibiting effectiveness of such systems as a rapid or reliable platform for question-and-answer communications.

Additionally, to the extent that users self-select into topical subcommunities, topic or forum membership varies over time, users inherently come to and leave from communities as their interests fluctuate. As a result, communities that provide rich interaction on a topic during one question-and-answer exchange, may provide a less valuable interaction during a closely-related exchange taking place at a later time if, e.g., high-value participants in the prior exchange have ceased their participation in the community or subcommunity since the prior exchange, or reduced the frequency of notifications related to that community or subcommunity.

FIG. 7 is a schematic block diagram of an alternative means of organizing communications in a question-and-answer system, in accordance with another aspect of the system illustrated herein. Rather than (or in addition to) providing predefined topical communities into which users self-select, question-and-answer communications are organized via dynamically-created dialog networks. A dialog network is a group of specific individuals invited by a question submitter, who will be notified of a question, and preferably notified of any ensuing dialog in response to that question unless a member opts out of notification. Thus, dialog network 700 typically includes asker 200 and recipients 202 within recipient group 210. External participants 220 may or may not have access to some or all of the information within a dialog, and they may elect to "follow" a dialog, receive notifications just as members of dialog network 700 do, or even post a response, but they are preferably not members of dialog network 700. Dialog network 700 thus becomes a self-contained mini topical discussion group around a particular dialog, until that dialog is complete.

By incorporating dialog networks, system participants can quickly reuse communication groups that have proven valuable in prior communications. Since originators specify a unique audience for each question they ask, each question (or dialog) represents a group of people that the asker may wish to ask other questions to in the future, such as questions that are on the same topic. Similarly, since the audience was selected based on a belief by the originator that each recipient had an inherent interest in the topic, the recipients may also wish to post to that same group again on a similar topic. Therefore, each dialog that a user has started also preferably represents a network that can be reused at any time in the future, without being subject to unknown fluctuations in community membership. Further, a dialog contact group can be customized, added to, combined or removed from for future dialogs to provide an asker with maximum convenience and flexibility.

For example, when an asker specifies recipients in step S305, server 100 may act to store within database 104 a dialog network record that includes the electronic contact addresses associated with the recipients to whom an outbound question message is directed. During subsequent uses of the system, when an asker specifies recipients in step S305, a user interface may be provided such as that of FIG. 4. In addition to manual entry fields 410 and "more recipients" link 415 for specifying question recipients, the asker can select "re-use prior dialog network" link 420 to be presented with a list of recent dialog networks from dialogs in which the user has previously participated. One or more such dialog networks can be selected via user interface elements displayed on a user computing device. Preferably, asker 200 can elect to reuse a prior dialog network as-is in step S305, or modify a prior dialog network by adding or removing recipients from that network. In addition to dialog networks created by a user being available for reuse by that user, preferably recipients will also be able to reuse dialog networks in which they were identified as a recipient, such that those recipients can select a dialog network for reuse in later system use cases in which a former recipient takes on an asker role.

Figure 8:
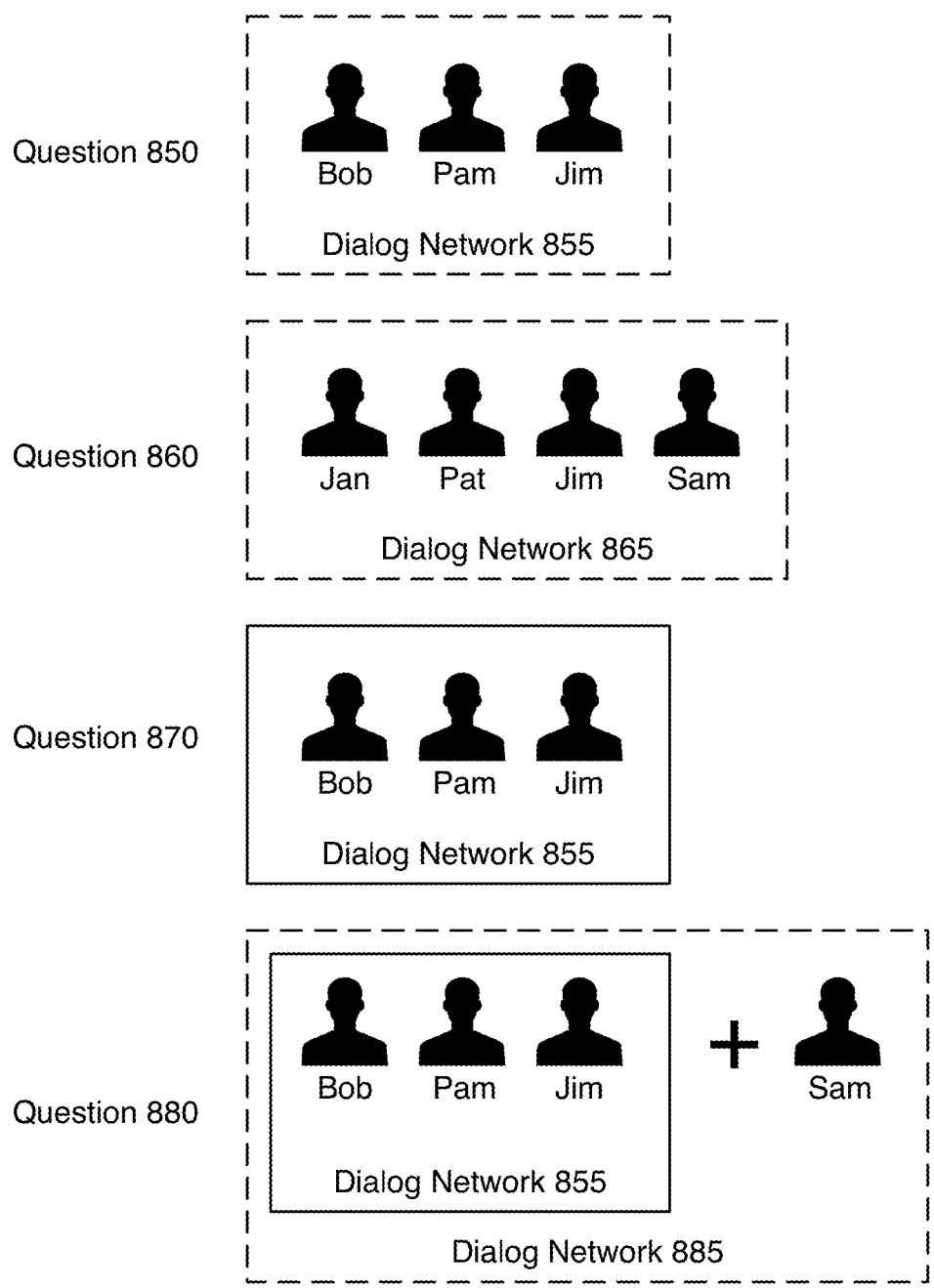
FIG. 8 is a block diagram illustrating dialog network reuse.

FIG. 8 illustrates dialog networks available for re-use by a user. When submitting question 850, the asker manually specifies recipients Bob, Pam and Jim, thereby creating new dialog network 855 that includes those recipients. Later, when submitting question 860, the asker manually specifies recipients Jan, Pat, Jim and Sam, thereby creating new dialog network 865. When submitting question 870, the subject matter of which is similar to that of question 850, the asker can select to re-use prior dialog network 855. When submitting question 880, the asker reuses dialog network 855, but decides to add Sam as a recipient, thereby creating new dialog network 885. In this way, users can quickly engage in new dialogs with existing groups of contacts.

Another way in which embodiments described herein can facilitate participation is by eliminating or minimizing user registration requirements, particularly amongst question recipients. Early Internet discussion forums often allowed any user to post without subscribing. However, this typically led to a large quantity of posts that were often low quality, off topic or spam, sometimes overtaking a community and essentially killing it. As a result, most online forums now require registration prior to posting. The subscription process sometimes even forces users to build networks, choose topics of interest, and configure profiles prior to posting. These high hurdles exclude many people from participating at all, or limits the communities in which a user actively participates.

By contrast, since embodiments described herein enable people to communicate directly with people they already know and simply use the system as a notification and organization mechanism, the system may be implemented without explicit registration by recipients. Authenticity of communications can be confirmed via the source of communications, e.g., from a user that came to the question via a URL within a notification they received containing a unique code, or through a sender's address associated with an email received by server 100 or a mobile phone number associated with an SMS or MMS message. Question recipients need not set up a profile, learn how a community is organized, build a network or take any other activity before meaningfully contributing to the system.

Figure 9:
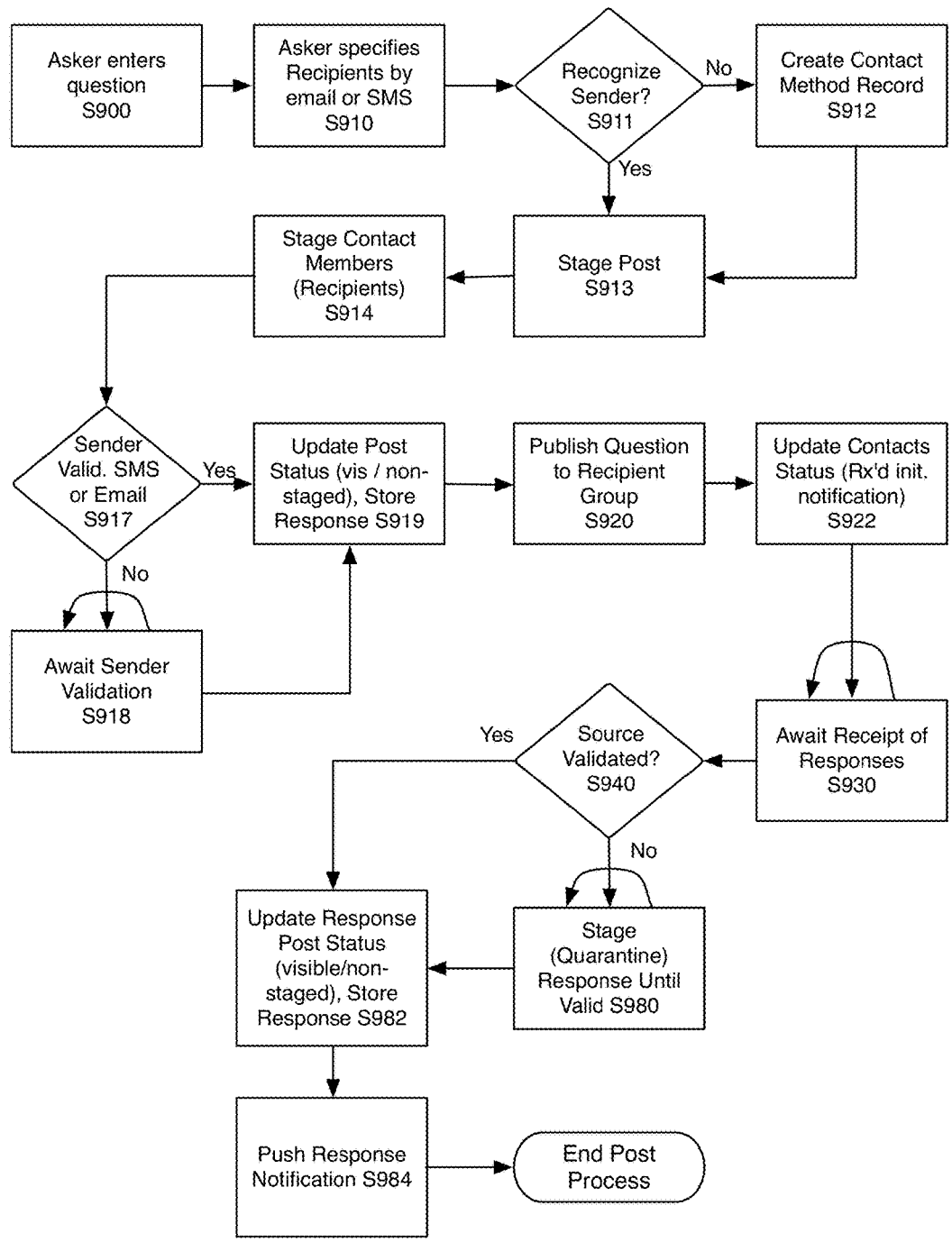
FIG. 9 is a process for Q&A communications, in accordance with another embodiment.

FIG. 9 illustrates an exemplary process by which recipients can participate without prior registration. In step S900, an asker enters a question, analogous to step S300 in FIG. 3. In step S910, the asker specifies a recipient group, each member of the recipient group being identified by an email address or mobile telephone number. In step S911, the system (in this case, server 100) then determines whether the asker is recognized (e.g., via having previously logged into the system or having accessed the system via an authenticated communication method such as mobile app or unique http link). If the asker is recognized, the post is staged within database 104 but flagged as "not visible" such that it does not yet appear within user views (step S913) and the designated recipients are staged (step S914). If the asker is not recognized, a contact method record is first created within database 104 corresponding to the asker (step S912).

In step S917, the system checks to see if the asker communication channel is valid. Validation may be accomplished via any number of ways. If the specified communication channel is a mobile telephone number, a mobile communications network message (such as SMS or MMS) can be sent to the asker's mobile phone with a unique validation code, entry of which is required via a web site user interface prior to validation of the mobile phone number. For validation of an email address, an email can be sent to the specified email address with a unique hyperlink, selection of which is detected by server 100 to validate the email address. Validation of the asker's communication channel helps prevent individuals who do not own an email address or mobile phone number from using the system to send notifications to others.

In some embodiments, it may be desirable to require validation of the contact channel for each dialog. In other embodiments, a contact channel may require validation once, during its first use, after which servers 100 may store confirmation of validation during future communications via that channel. Optionally, validation may expire after a predetermined length of time, after which re-validation of the communication channel is required in step S917. Alternatively, for questions and answers submitted via a web site channel, validation may be achieved by requiring the user to log in to the web site. Known means of authenticating web site users can be implemented in step S917.

If the asker contact channel has not yet been validated, the system awaits validation (step S918). Once the asker communication channel has been validated, in step S919, the post status is updated to "visible, non-staged". In step S920, the system pushes a communication to each recipient in the recipient group via a communication mechanism corresponding to the identification provided by the asker in step S910. E.g. if an asker specifies an email address for a recipient in step S910, an email is transmitted to that recipient in step S920. If an asker specifies a mobile telephone number for a recipient in step S910, a mobile communication network message (such as SMS or MIMS) is transmitted to that recipient in step S920. In step 922, the recipient's contact record status is updated within database 104 to reflect receipt of an initial notification for this specific question.

The actual content of the push notifications will vary based on system implementation, and could include some or all of the following: the name of the asker, the subject of the question, all or some portion of the question content, the names of others in the recipient group, and a URL (preferably including a UID) facilitating direct linking to the corresponding dialog content on a web site implemented by web server 106. In some embodiments, it may be desirable to vary the push notification content based on the communication channel via which the notification is transmitted. For example, a SMS notification may include brief content (e.g. "Dan has asked you and 3 others a question. Click the following to see it: http://rl.cc/PvmS8S"). However, an email notification may include more content, such as the asker's name, the list of people in the recipient group, the entire text of the question, and a URL hyperlink to provide an answer or view others' answers.

In step S930, the system awaits receipt of further communications from the asker or any member of the recipient group. If and when an inbound communication is received, the system authenticates the source in step S940.

Source authentication in step S940 can be achieved in a number of ways. In a preferred embodiment, each outbound notification includes a URL with a unique code that the system uses to associate individual dialog network members with a specific dialog. The URL directs the user device (via web browser or locally installed application) to a web server. Preferably, the code is perishable, with an expiration date and time associated with each code. If a user comes to a dialog by way of a URL hyperlink containing a code known to the system, and the code has not yet expired, the system will identify the incoming user as the user previously associated with the code, and determine that the source is authenticated in step S940 without additional user interaction. If a user comes to a dialog by way of a URL hyperlink containing a code known to the system, but the expiration date and time associated with the code has passed, the system will identify the incoming user as the user previously associated with the code, but will query the user to validate their contact address before publishing any subsequent posts or other content contributions. If the user comes to a dialog via a link that did not contain a unique code at all, the system will query the user to enter a contact address, and transmit a communication channel validation communication to which the user must respond; with the communication channel considered validated in step S940 as coming from a dialog network member only if it matches one of the recipient addresses after address validation.

If the inbound communication is not authenticated, in step S980, the response is staged as Quarantined, preferably until the recipient communication channel is validated. In other words, in step S980, the message is handled differently as a result of its being provided by an unauthenticated source. Depending on a particular desired implementation, the outcome of a message being quarantined in step S980 may include, for instance: deletion or discarding of the message; display of the message separately from other, authenticated responses; failure to publish the message via push notification to the asker or recipient group; or publication of the message only to the asker for manual validation by the asker prior to push publication to the recipient group. Preferably, the system provides the submitting recipient with a responsive communication (e.g. a reply email or reply SMS) including an alert that the sender's communication was not accepted due to mismatch between the message source and the recipient contact information. The recipient may further be provided with an opportunity to authenticate their new communication channel. For example, server 100 may transmit an authentication code to the communication source, which must be returned via the contact method originally associated with that recipient by the asker in step S910. If the new communication method is authenticated, the process continues to step S982.

In step S982, the recipient response is stored within database 104 with post status updated to visible/non-staged, such that the response becomes visible within search results and user views of the dialog(s) with which the post is associated. In step S984, notification of the new recipient response is pushed to asker 200 and some or all other members of recipient group 210, as explained in more detail above, e.g., in connection with FIG. 3B.

Variable Privacy and Association-Based Anonymity

Another aspect of Q&A systems that may impact user behavior is user identification. Some prior systems allow users to post anonymously, without providing any user-identifiable information. While anonymous posting can reduce barriers to participation, users often feel little or no accountability for the content they publish, which can lead to high volumes of inaccurate, low-value, or spam postings. That, in turn, can drive legitimate users away and lead to a downward spiral in system content quality. As a result, other online communities require the use of a real name and/or personal attributes. While this may lead to higher quality posts, it can sometimes deter people from posting information if they do not want to risk their personal reputation, even if they may otherwise be willing and able to provide a high quality answer.

In accordance with another aspect of embodiments described herein, online Q&A systems and/or other computer-implemented, network-based communication platforms can provide association-based anonymity for content contributors. Association-based anonymity provides varying levels of personally identifiable information about a content contributor based on the contributor's relationship to the person viewing the contribution. Types of contributor/viewer relationships that may influence the presence and amount of personally identifiable information published to a viewer include, without limitation: whether the viewer is a member of the dialog network for the content being viewed; whether the contributor is a member of the dialog network for the content being viewed; whether the viewer and contributor have known social network relationships; user-level privacy preferences configured by the contributor; and whether the contributor has affirmatively requested to limit disclosure of personally identifiable information on a system-wide or dialog level.

In an exemplary embodiment, some amount of a contributor's personally-identifiable information, such as first and last name, will always be visible to all members of a dialog network for which they are part of, and that information will be visible to other members of the dialog network with each post they make to that question, thereby providing a level of accountability to the contributor. Other personally identifiable information that can be made available in connection with a contributor's content contribution includes email or other electronic contact address, system username, and/or a hyperlink to a biographical profile of the author. However, contributors can choose (via a default setting and/or on a post-by-post basis) to withhold personally identifiable information from content viewers that are not a part of the dialog network (i.e. not an asker or targeted recipient). In other embodiments the system may make such secondary views available by default. This enables contributors to speak freely to a known audience (the dialog network), while still making their valuable user-generated content available to a broader audience, anonymously.

Embodiments also enable authors to specify a private dialog (or anonymous dialog) mode when posting their question. Private dialog mode overrides any profile or post-level anonymity settings of the asker and all recipients to ensure that all contributions to a dialog from those users are maintained anonymously to viewers outside the dialog network (i.e. individuals other than the asker and targeted recipients). Private dialog mode may be desirable to minimize any risk of unintentional identification of content authors through known personal associations. In this way, Private Dialogs introduce a new form of pseudo-privacy, or public privacy, where the asker and recipients are free to engage amongst each other with full knowledge of who they are communicating with, perhaps even appearing to them as if they are in a private room amongst only one another and free to speak accordingly, while the rest of the world can look in on that conversation but have no knowledge of who is having it. To the extent the asker or recipients have their view restricted to only see posts from other members of that dialog network (default view), it will further appear to them as if they are having a private group conversation. However, the knowledge and opinions that are generated are available for the rest of the world to access and even contribute to.

In some circumstances, it may further be desirable to enable a private dialog mode in which respondent identities are withheld from everybody except the original asker, including being withheld from other dialog network members. This functionality may be particularly valuable in circumstances where, e.g., question recipients are each knowledgeable but knowingly hold differing viewpoints, and the potential for conflict amongst individuals known to have differing viewpoints could inhibit open communications by potential contributors who seek to avoid conflict. Meanwhile, the availability of personal attribution to at least the question asker still provides a level of accountability, relative to completely anonymous communication forums.

Figure 10:
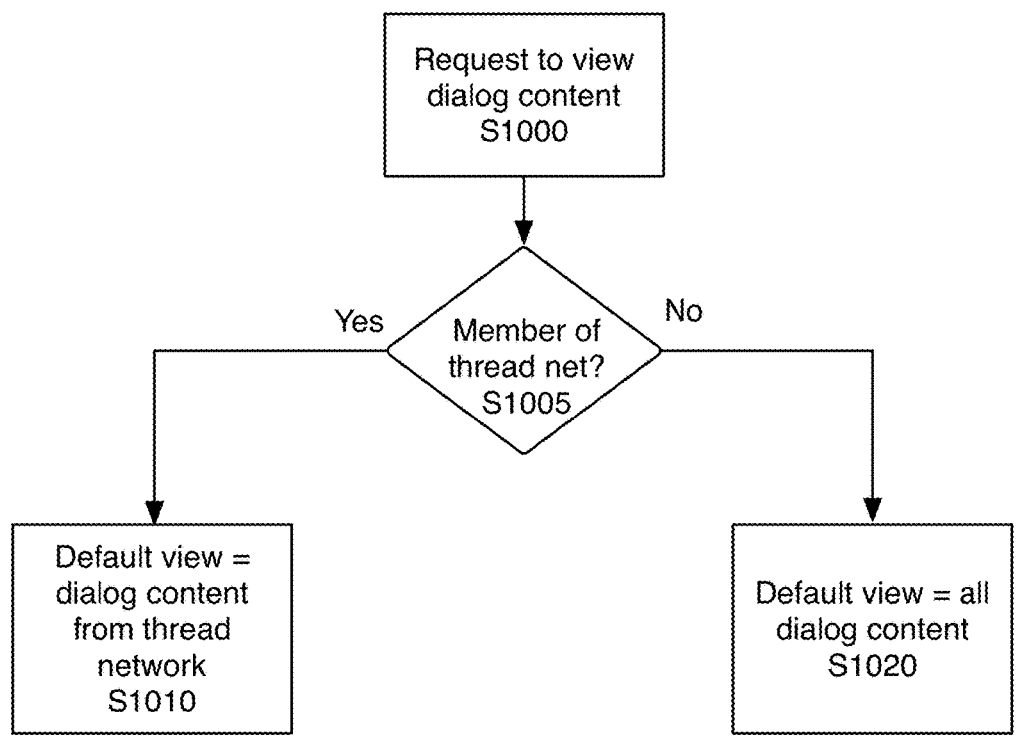
FIG. 10 is a process for determining visibility of content contributor information.

FIG. 10 is a flow chart illustrating a process for determining dialog content included in a user's default view, based on their association with the dialog being viewed. In step S1000, a request to view dialog content (i.e. a query for dialog content) is received by network-connected database 104 within server 100, such as selection of a result from a keyword search of existing dialogs performed via a Q&A system web site implemented by web server 106. In step S1005, a determination is made as to whether the query originator is a member of the dialog network associated with the requested content, e.g., the dialog asker or a member of the asker-specified recipient list associated with the dialog. If so, by default, content returned in response to the query includes dialog content contributed by members of the dialog network (i.e. asker 200 or recipients 202) (step S1010). If not, by default, content returned in response to the query includes dialog content contributed by any user (i.e. asker 200, recipients 202 or external participants 220) (step S1020). Preferably, users can configure broader or narrower views so that, e.g., dialog network members can opt to view content contributed by external participants, or external participants can limit their view to content contributed by dialog network members.

Figure 11:
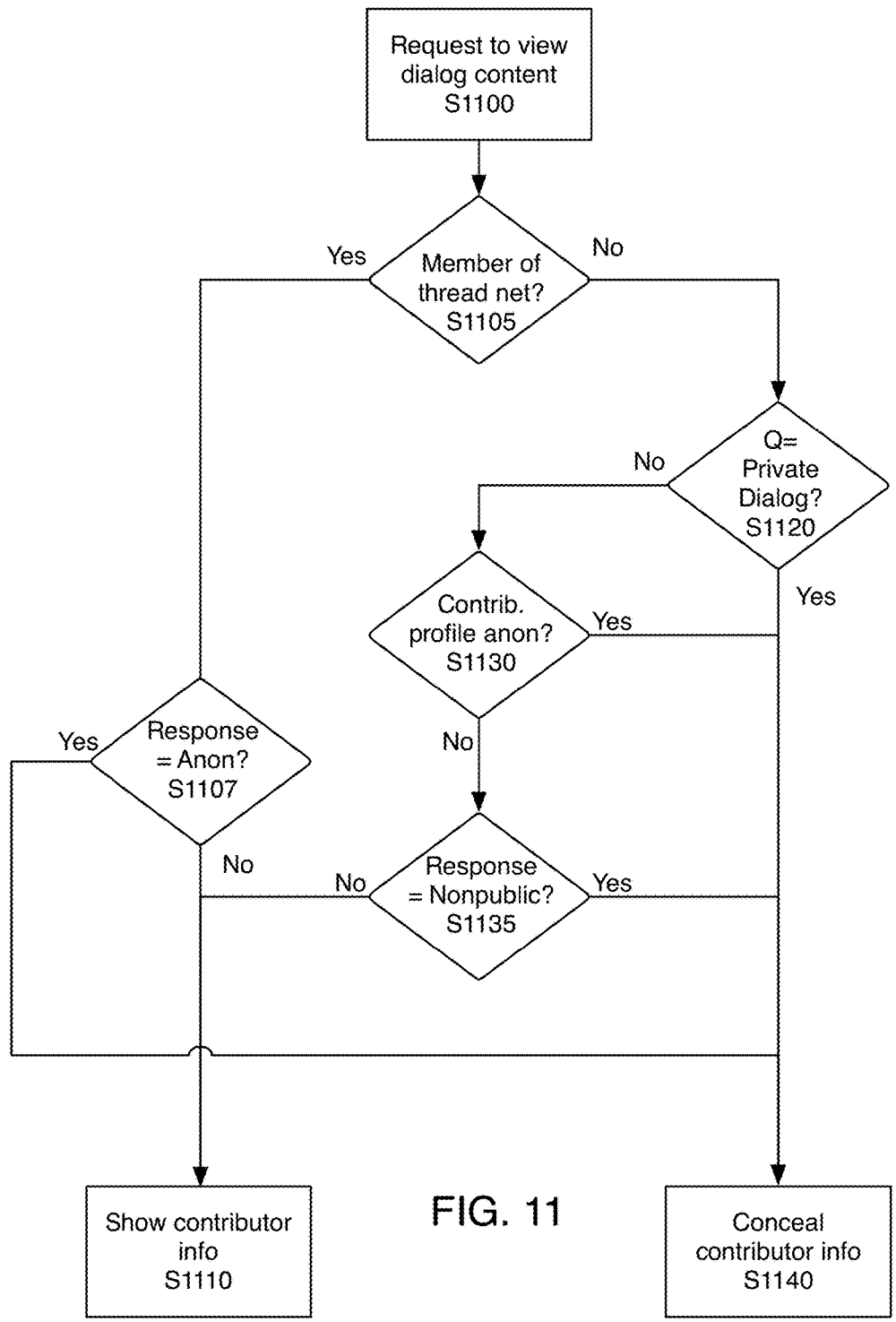
FIG. 11 is a process for determining default view of dialog content.

FIG. 11 is a flow chart illustrating a process for determining visibility of personally identifiable information associated with content contributors (such as biographical information), in accordance with an exemplary embodiment. In step S1100, a request to view dialog content (i.e. a query for dialog content) is received by network-connected database 104 within server 100, such as selection of a result from a keyword search of existing dialogs performed via a Q&A system web site implemented by web server 106. In step S1105, a determination is made as to whether the query originator is a member of the dialog network associated with the requested content, e.g. the dialog asker or a member of the recipient list associated with the dialog. If the viewer is a dialog network member, a further determination is made as to whether the content contributor requested that their identity be withheld from everyone except the question asker (S1107). If not, content returned in response to the query includes personally identifiable information corresponding to content contributors (step S1110). If so, the content item returned in response to the query excludes personally identifiable information (step S1140).

If the viewer is not a dialog network member, a post-level determination is made as to whether a private dialog mode was selected for the question by the asker (step S1120). If so, personally identifiable information corresponding to the content contributor is withheld from the query response (step S1140). If not, in step S1130 a determination is made for each element of dialog content as to whether the content contributor's system profile (if any) is configured, at a profile level, to maintain anonymity (e.g. to withhold personally identifiable information from individuals outside the thread network). If so, personally identifiable information corresponding to that content contributor is withheld from the query response (step S1140). If not, a determination is made as to whether the content contributor identified the contribution as non-public in connection with submission of the specific element of content requested (step S1135). If so, personally identifiable information corresponding to the content contributor is withheld from the query response (step S1140). If not, content is returned inclusive of personal information associated with its contributor (step S1110).

User interface elements enabling implementation of association-based anonymity functionality described above are illustrated in embodiments of FIGS. 4 and 6. For instance, in the "new question" user interface embodiment of FIG. 4, check box 440 is provided for an asker to select or unselect "Private Dialog" for the question at issue. Selection of check box 440 triggers a "YES" response in step S1120 of the method of FIG. 11. De-selection of check box 440 triggers a "NO" response in step S1120 of the method of FIG. 11. Similarly, the answer form user interface of FIG. 6 includes check box 635 labeled "Withhold my identity from the public" beneath the list of individuals involved in a dialog. Selection of check box 635 triggers a "YES" response in step S1135 of the method of FIG. 11. De-selection of check box 635 triggers a "NO" response in step S1135 of the method of FIG. 10. The answer form of FIG. 6 also includes check box 636 labeled "Conceal my identity from everybody except <Asker>, who originally asked this question." Selection of check box 636 triggers a "YES" response in step S1107. De-selection of check box 636 triggers a "NO" response in step S1107. Thus, in combination with the process of FIG. 11, user interface elements 440, 635 and 636 operate to provide association-based anonymity on a conversation-level or post-level, respectively. While the embodiment described here allows a user to elect a privacy setting, it is contemplated and understood that such settings described throughout this specification may instead be default behavior of such system, without allowing for explicit user selection.

The ability to view personally identifiable information about content contributors is, more broadly, an example of a special privilege that can be made available or withheld from users based on their association with a dialog. Other potential association-based special privileges include the ability to add additional individuals to the dialog as dialog network members, the ability to promote external user posts to the dialog network members via push notification, the ability to promote external user posts to the dialog network members by flagging an external post for inclusion within views that are otherwise limited to dialog network content, bypassing moderation or contribution approval processes, or being displayed within a user interface as a "member" as opposed to a "non-member."

Adding Dialog Members

In embodiments described above, an act of the opening user creates new content and defines the dialog network. This initial act preferably creates a Minimum Viable Dialog Unit with users ready, willing and able to engage in productive interaction. However, in some circumstances, dialog participants other than the opening user may know individuals not already a dialog network member who may be productive contributors to a particular exchange. For example, a target responder identified by the opening user may not have pertinent knowledge themselves, but may have a trusted friend or colleague known to have relevant knowledge and expertise. Therefore, in some embodiments, it may be desirable to enable individuals other than the opening user to add new users to a dialog network. Yet restrictions and controls over when and how new dialog network members can be added may still be desirable in order to preserve the characteristics of the embodiments described herein that promote content quality and participant engagement. By enabling (preferably controlled) expansion of a dialog network, a Minimum Viable Dialog Network may evolve into a Maximum Viable Dialog Network with even richer content and interaction.

Figure 12:
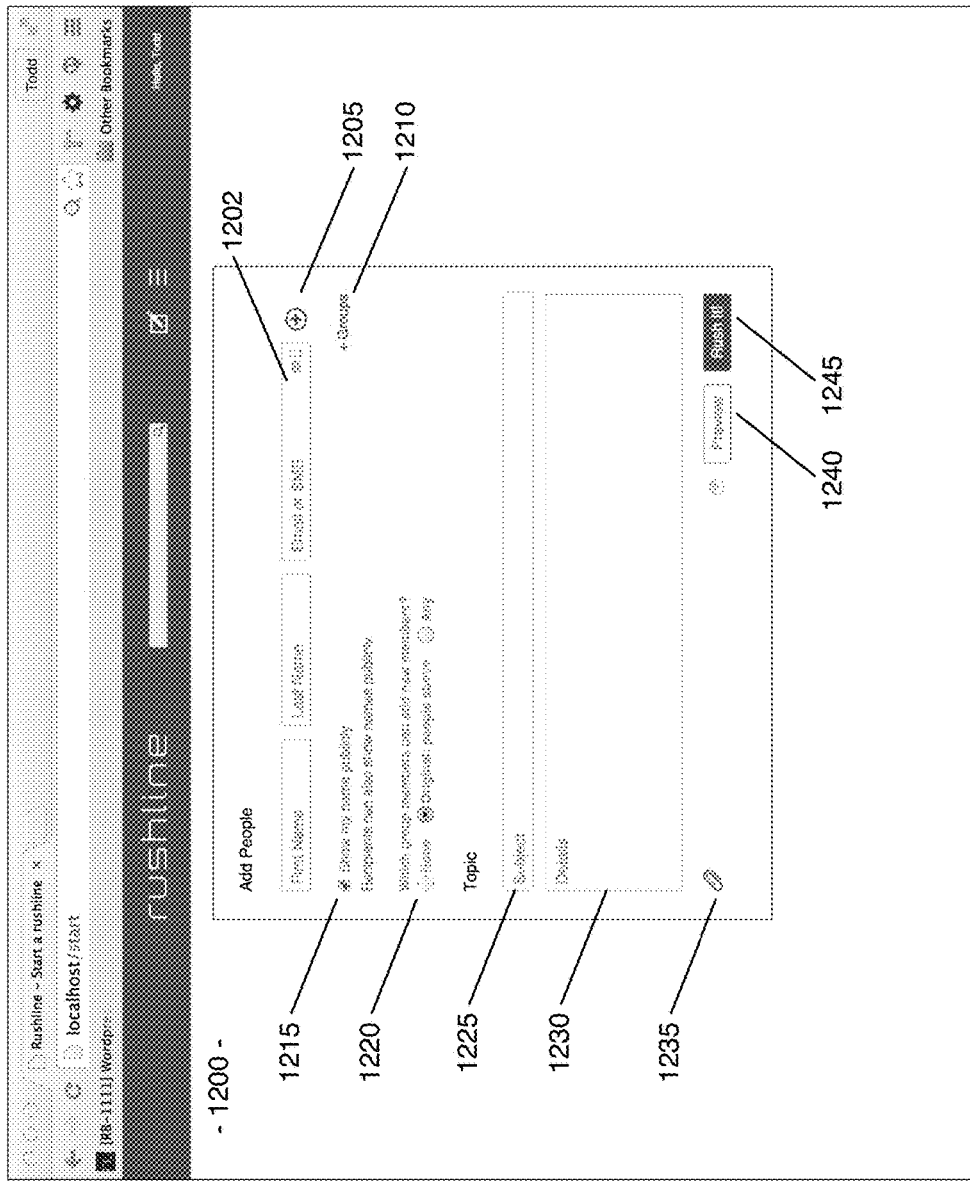
FIG. 12 is user interface for initiation of a dialog.

In accordance with an embodiment enabling dialog member expansion, FIG. 12 illustrates an exemplary user interface that may be presented to an asker 200 for interacting with server 100 to initiate a dialog. The dialog initiation form of FIG. 12 is analogous to that of FIG. 4, and the operation of steps S300 and S305 in the process of FIG. 3, but having additional features and capabilities as described herein.

Web page 1200 is rendered on a user device via communication between the user device and web server 106. Fields 1225, 1230 and 1235 enable asker 200 to specify a dialog Subject, dialog content, and content attachments, respectively (analogously to step S300).

Text entry field 1202 is provided for asker 200 to specify recipients 202 within recipient group 210 (analogously to step S305). Specifically, in the embodiment of FIG. 12, text entry fields are provided for First Name, Last Name, and Email or SMS. Icon 1205 can be selected to add another set of text entry fields analogous to 1202 in order to add additional target recipients for dialog membership. Groups icon 1210 enables asker 200 to select a predetermined group of recipients, such as when re-using a previously-configured dialog network for a new dialog.

Figure 14:
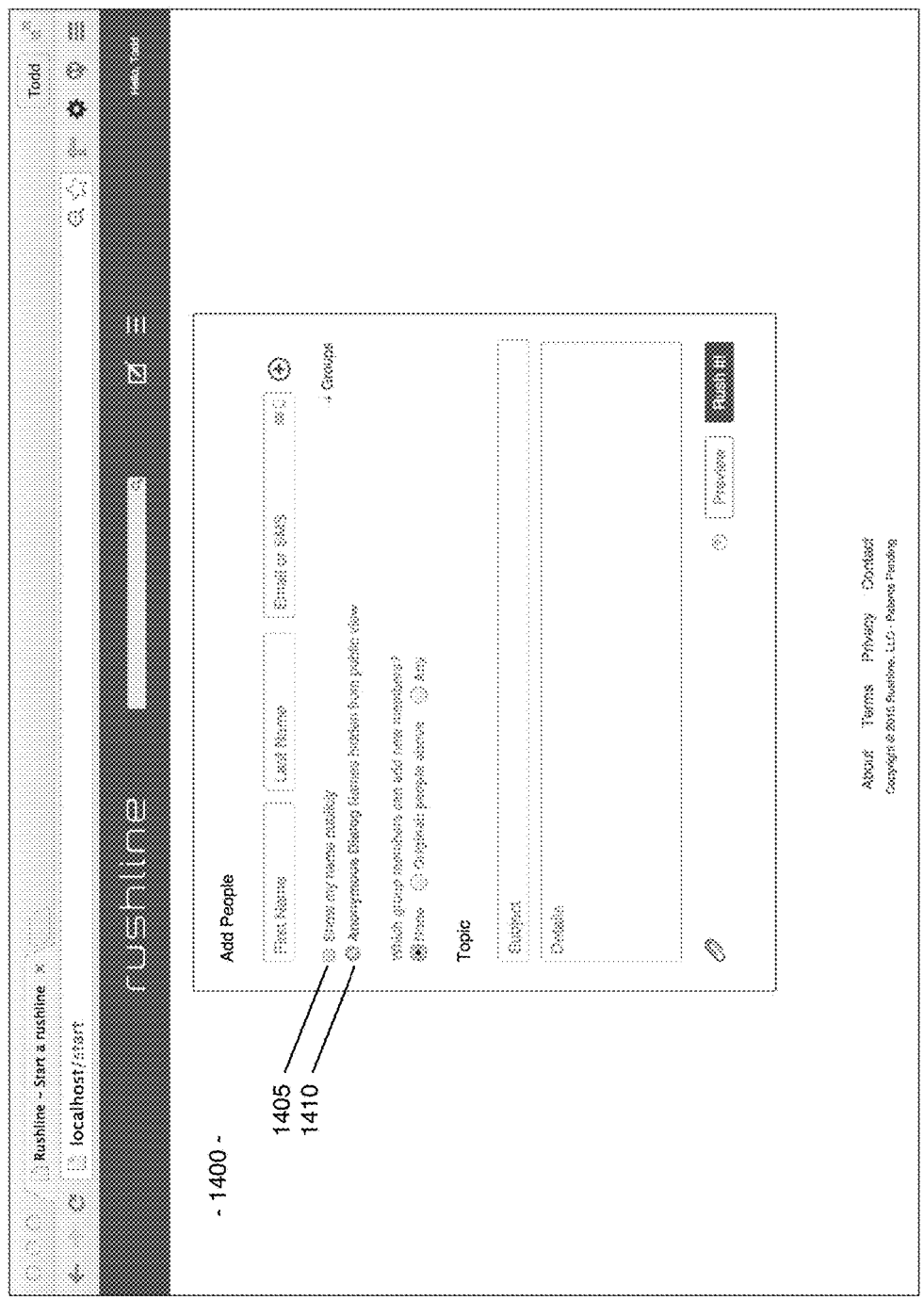
FIG. 14 is another user interface for initiation of a dialog.

Check box field 1215 enables asker 200 to specify whether their name is presented within dialog views by individuals outside the dialog network, similarly to checkbox 635 in the embodiment of FIG. 6. If check box field 1215 is unselected, a modified user interface indicating initiation of an Anonymous Dialog is presented. Such a user interface is reflected in FIG. 14. Web page 1400 includes unselected "Show my name publicly" checkbox 1405, and message 1410 communicating that the dialog is configured as Anonymous, with member names hidden from public view.

Asker 200 can control dialog expansion using a user interface control comprising radio buttons 1220. Specifically, radio buttons 1220 can be utilized to limit the dialog network members who are provided with the option to add new individuals to the dialog network. By selecting "None" within field 1220, asker 200 precludes others from adding new members to the dialog network for the dialog being initiated, similarly to the operation of embodiments described hereinabove. By selecting "Original" within field 1220, asker 200 enables only users specified by asker 200 as the opening user to invite new members to the dialog network. By selecting "Any" within field 1220, asker 200 enables users initially specified by asker 200 to invite new members to the dialog network, and additionally any dialog network members added after the dialog initiation can also invite new members to the dialog network.

Figure 13A:
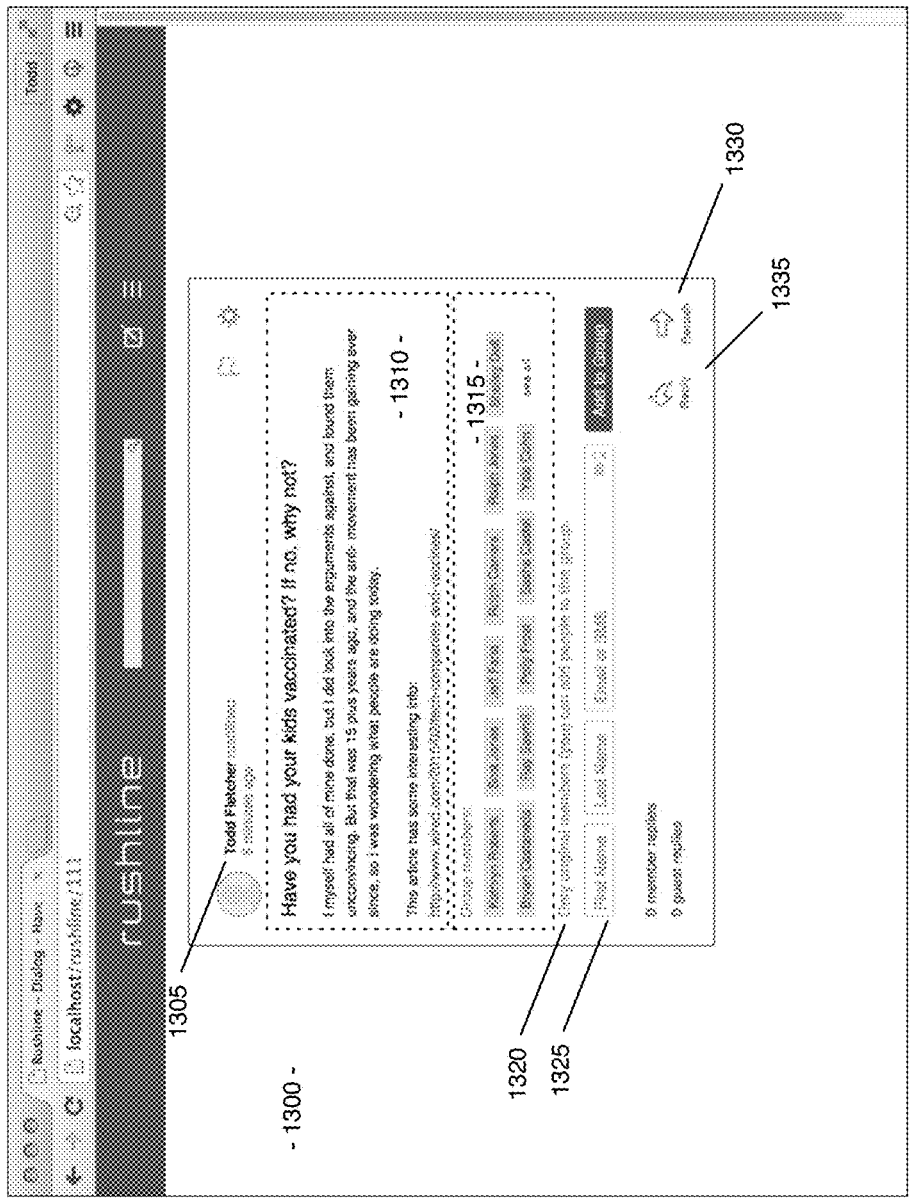
FIG. 13A is a user interface for viewing a dialog, responding and/or adding new members to the dialog.
Figure 13B:
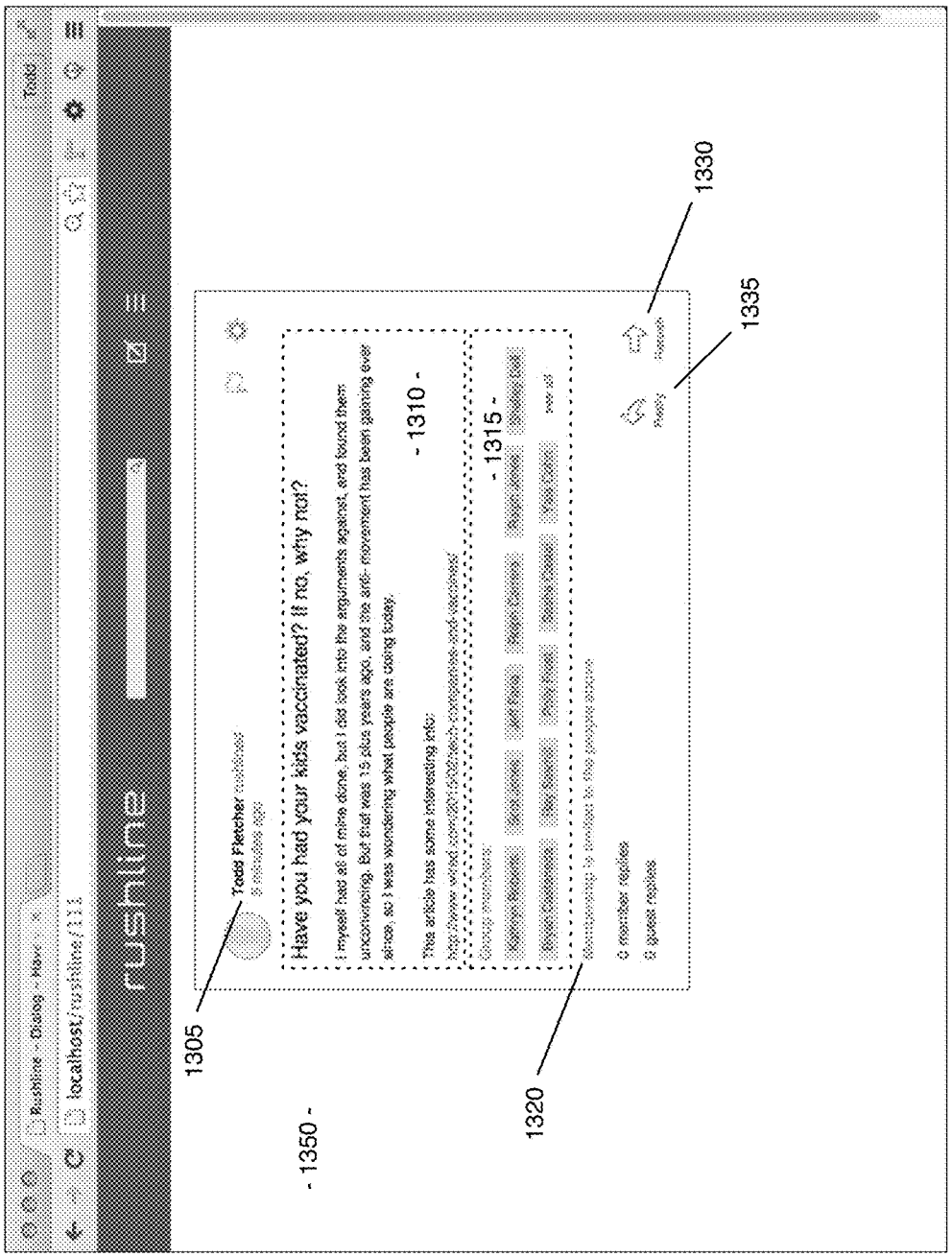
FIG. 13B is a user interface for viewing a dialog and responding.

FIG. 13A illustrates an exemplary user interface for communication of a response to server 100 from a dialog network target recipient who is authorized to add members to a dialog network, based on the viewer's relationship to the dialog and the asker's dialog expansion control setting specified by control 1220. If control 1220 is set to "Original", then the dialog view of FIG. 13A would be provided to dialog network members specified by asker 200. If control 1220 is set to "Any", then the dialog view of FIG. 13A would be provided to dialog network members specified by asker 200, as well as dialog network members added to the dialog by other dialog network members. If control 1220 is set to "None", then the dialog view of web page 1350 (FIG. 13B) would be provided to the viewing individual, in which field 1320 indicates that dialog network membership is limited to the displayed members, and omitting field 1325 to add a dialog network member.

Field 1305 indicates the identity of the individual having contributed the displayed content, as well as an indication of when the content was contributed. Region 1310 displays the dialog opening content. Region 1315 identifies current members of a dialog network associated with the content displayed in region 1310. Field 1320 communicates the setting of control 1220 in FIG. 12, indicating the types of individuals permitted to add new members to the dialog. Fields 1325 enable the addition of a new member to the dialog network associated with the content displayed in region 1310. Thus, by specifying First Name, Last Name, an electronic contact address such as email or SMS, and selecting the "Add to Group" button, the viewer of web page 1300 can add additional members to the dialog network. Selection of Reply icon 1335 enables the viewer of web page 1300 to provide responsive content (analogously to step S315). Selection of "Rerush" icon 1330 enables the viewer of web page 1300 to initiate a new dialog referencing the content of the selected post with their own specified group of contacts.

Using functionality described herein, dialog membership (i.e. the dialog network) is initially established by asker 200, but can be subsequently expanded by other dialog network members if such expansion is authorized in the dialog configuration. Dialog membership conveys some set of rights that non-members do not have. Examples of dialog member rights may include, without limitation: the right to post new content in a dialog or conversation; the ability to view or participate in a dialog in a way that normally requires a user to have previously registered an account with the service hosting the dialog; the ability to view or participate in a dialog in a way that normally requires a user to have opted in or been invited into the forum, group or thread having the conversation; the ability to view aspects of the dialog that non-members cannot see, such as personal names and/or contact details of dialog network members; the ability to receive push notifications of new activity within a dialog; and the ability to filter the view of the conversation in ways not available to non-members.

While the embodiment of FIG. 12 utilizes control 1220 to specify which users can add new members to a dialog network, it is contemplated that in some embodiments, other mechanisms or combinations of mechanisms will control dialog membership. For example, in some embodiments, moderators having special privileges may be provided with rights to override, supplement or otherwise modify dialog membership. In some embodiments, automated system logic will override, supplement or otherwise modify dialog membership. In some embodiments, various combinations of dialog opener actions, dialog member actions, moderator actions and system logic will interact to control the ability to add new members to a dialog network.

Preferably, once a member has been added to a dialog network by another member, the added member automatically receives all rights conveyed upon them by the adding member. In some embodiments, the added member need not opt-in or acknowledge anything to be given these rights. The added member may be notified of their addition via push notification, an indicator in the dialog or forum, or web site feed. Optionally, added members may automatically begin receiving push notifications of all group activity or some subset of it.

Figure 15:
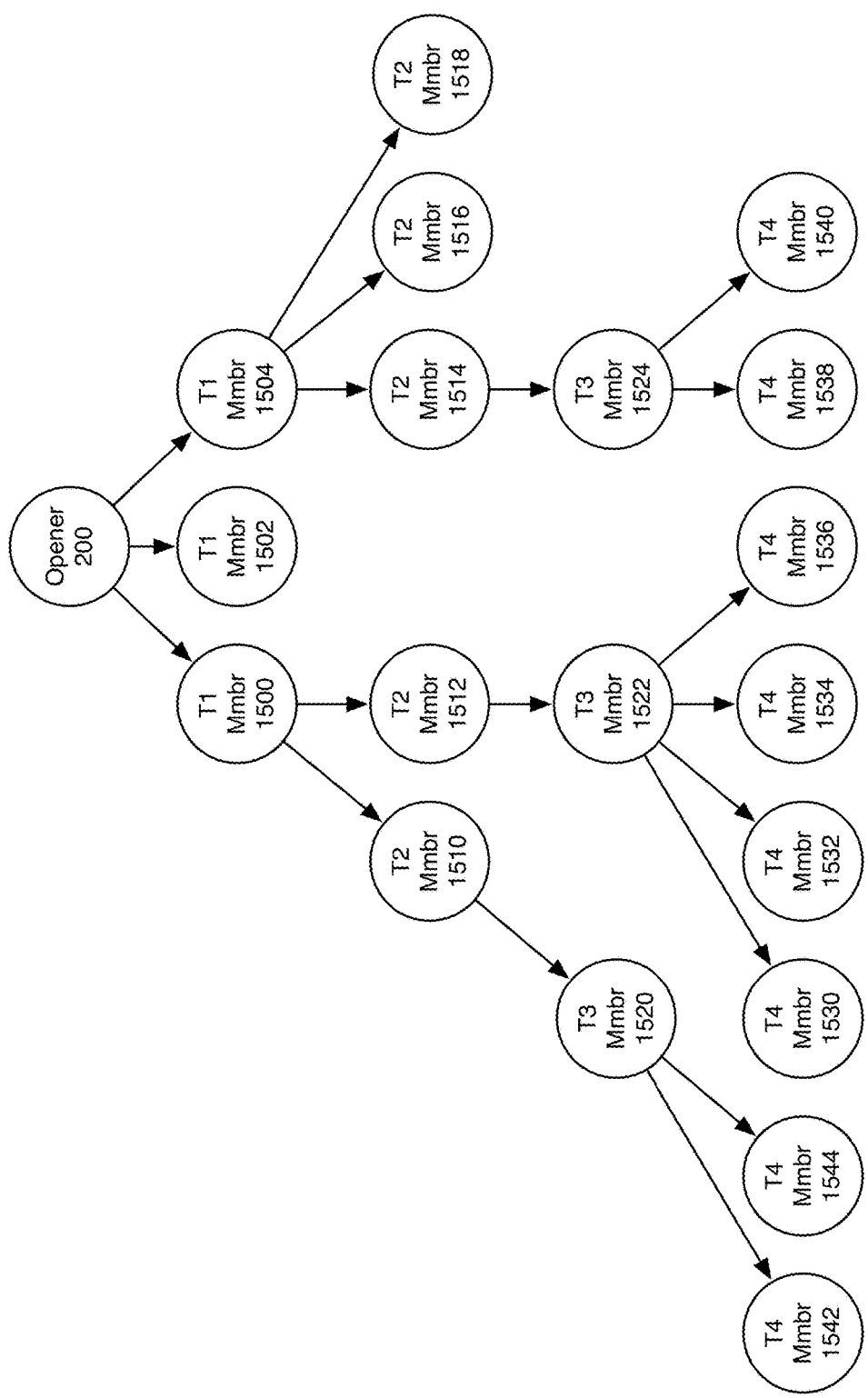
FIG. 15 is a schematic block diagram of a hierarchical dialog network.

Systems enabling adding of dialog network members may facilitate the development of dialog networks that are large, evolve over time and/or have diverse membership. FIG. 15 illustrates an exemplary dialog network that may be developed if control 1220 is set to "Any", thereby allowing any dialog network member to add new members interacting with server 100 via a user interface analogous to that of FIG. 13A. Opener 200 initiates a dialog specifying Tier 1 members 1500, 1502 and 1504 as members of the dialog network. Tier 1 member 1500 adds Tier 2 members 1510 and 1512. Tier 1 member 1504 adds new Tier 2 members 1514, 1516 and 1518. Tier 2 member 1510 subsequently adds Tier 3 member 1520. Tier 2 member 1512 adds Tier 3 member 1522. Tier 2 member 1514 adds Tier 3 member 1524. Tier 3 member 1520 adds Tier 4 members 1542 and 1544. Tier 3 member 1522 adds Tier 4 members 1530, 1532, 1534 and 1536. Tier 3 member 1524 adds Tier 4 members 1538 and 1540.

Once a member is added, server 100 will preferably track each member's relationship to the dialog network, including who invited the added member, when the member was added, and the hierarchical membership history. Such information may be stored by server 100, such as within database 104.

In some applications, particularly where large dialog networks may be developed, it may be desirable to facilitate content filtering based on, amongst other things, the relationship of a viewer to the conversation within a member hierarchy, such as the hierarchy of FIG. 15. In some embodiments, dialog network members may be presented with user interface controls enabling them to limit the degrees of separation within the dialog network hierarchy for whom content contributions are displayed in the member's view. In such embodiments, each "hop" to a new node in the dialog network hierarchy may be considered one degree of separation. Thus, for example, if Tier 2 Member 1522 set a degree of separation limit of 3, the corresponding view would include only content contributed by Members 1530, 1532, 1534, 1536, 1522, 1512, 1500, 200, and 1510. This and other mechanisms for filtering based on the relationship between members in the dialog network hierarchy are contemplated.

Figure 16:
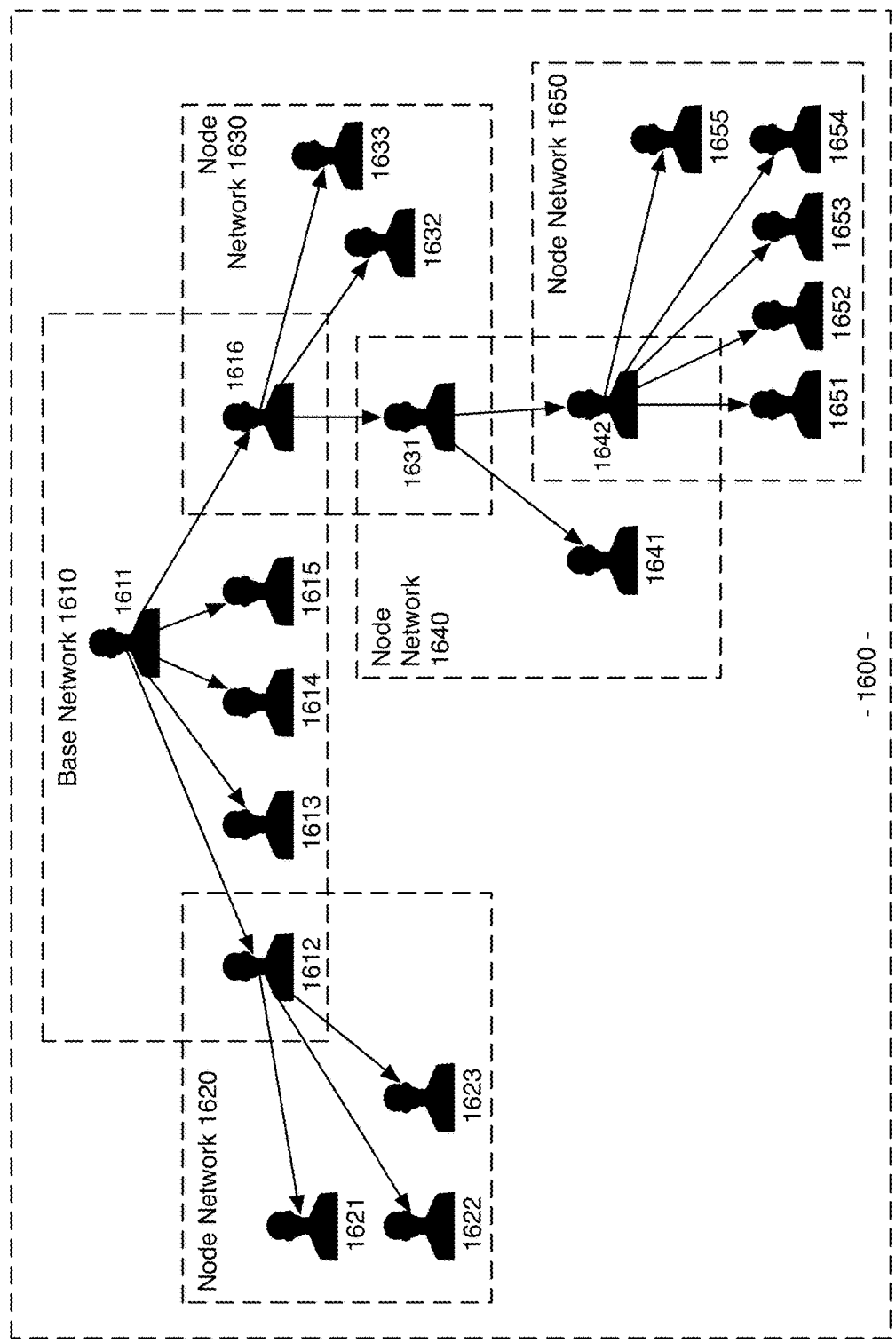
FIG. 16 is a further schematic block diagram of a hierarchical dialog network.

FIG. 16 illustrates a further embodiment of a hierarchical dialog network 1600. Network members are organized into nodes in which each node consists of a dialog network member, and the other members specifically added thereby. In the embodiment of FIG. 16, the original opening user 1611 creates node network 1610 by adding five members (users 1612, 1613, 1614, 1615 and 1616), and specifying that all members can add new members. User 1612 creates node network 1620 by adding three additional members: users 1621, 1622 and 1623. Member 1616 creates node network 1630 by adding three members: users 1631, 1632 and 1633. A member 1631 of the node network 1630 created by user 1616, subsequently creates node 1640 by adding users 1641 and 1642 as members. User 1642 then creates node network 1650 by adding five more members: users 1651, 1652, 1653, 1654 and 1655.

In the embodiment of FIG. 16, filtering of displayed content can be implementing by, inter alia, specifying a number of node networks above and below the member's current node network that are desired for display. For example, the narrowest view of user 1642 may include node network 1640. She may specify a hierarchical display filter of −1/+1, in which the −1 setting includes in her view content from individuals within one node upstream (i.e. node network 1630), and the +1 setting includes in her view content from individuals within one node downstream (i.e. node network 1650). If user 1642 adjusts her filter to −2/+1, she would additionally include content from individuals up to two nodes upstream (i.e. node networks 1630 and 1610).

In some embodiments, hierarchical node network content can be filtered using a slider user interface component to implement a hierarchical zoom function. In an example of such an embodiment, a user's narrowest, most zoomed in view may include content contributed by the node network to which a member belongs, as well as the node network created by the member (if any). As a member moves a slider control in a "zoom out" direction, content filtering can adjust to present progressively more content from node networks progressively further from the member's own node network in the dialog network hierarchy.

While existing social networks, such as LinkedIn™, may rely on user relationships and degrees of user separation, certain embodiments described herein implement dialog-specific, or conversation-oriented, associations based on a user's relationship to a specific conversation. Conversation- or dialog-specific network relationships can recognize, inter alia, the varying natures of an individual's interests, experiences and expertise across different subject matter.

Variable Privacy

In some circumstances, when sharing insights and opinions, privacy is of modest importance. In such cases, the rules of privacy, and the knowledge and expectations of how a system works may be similarly, modestly defined. In other cases, privacy is of greater importance when sharing our insights and opinions.

When important, privacy generally requires a solid foundation of trust to be meaningful. When we know and trust the right people will, and the wrong people will not know what we say, we may be willing to be far more forthcoming and vulnerable, sharing a deeper and more meaningful level of insights.

However, it is human nature that this trust is sensitive. If we don't know with confidence in advance who will see content we post, and whether our personally identifiable information will be visible, we are more likely to act as though anyone can see it and we have little or no privacy at all, significantly limiting our willingness to share our thoughts and valuable insights. By creating an environment in which users understand their privacy with confidence, a deeper and more meaningful level of insights can be exposed and shared for others to learn from.

One key to wide distribution and availability of deep insights through second, anonymous views is trust in how system works and who will see what. To establish such trust in a system may require a combination of a) knowing with certainty that personally identifiable information will be removed and triangulation or reidentification will be difficult or impossible (such as by knowing names of all other dialog network members will also be redacted) and b) knowing in advance with certainty who any second, anonymized view will be available to.

Thus, one vital key to enabling this trust in privacy and unlocking sharing and wider distribution of these valuable insights for others to discover can be giving users advance knowledge, and in some cases advance choice, as to who else outside their dialog network their content will be distributed to, and what, if any, author identifiable information is included. In contrast, if users don't know with certainty if a second view will be available outside their dialog network, what author identifiable information it will include, and know exactly who it will (or perhaps will not) be available to, they are more likely to assume they have little or no privacy at all, restricting what they say and share, if they say and share anything at all.

By providing advance knowledge and in some cases advance choice as described above, this privacy trust can be effectively created and managed both in cases of broad distribution and narrow. If a user knows with certainty in advance that a second view of their content, with personally identifiable information removed, will be available to all members of the public (whether all Internet users or all users of a registered system) in addition to the members of their dialog network, they can have confidence in their understanding of the degree of privacy to which they will receive. Similarly, if a dialog network of medical doctors knows in advance that any second view of their content with attribution removed will only be available to other practicing medical doctors within a restricted access community, or a known third party service restricted to medical doctors, they can interact and share insights with confidence that this information (with or without author attribution) won't be seen by their patients. Getting even more narrow, if members of a dialog network know a second view of their content may be made available to only an explicitly named list of other viewers, such as the names and email addresses of three employees at a medical equipment manufacturer, they may have the privacy trust necessary to openly share their insights.

In contrast, if user expectations are such that a system may or may not make a second view available, the second view may or may not conceal personally identifiable information, concealed information may or may not be subject to triangulation or reidentification (such as by disclosing names of known associates within a dialog's membership), or that if such a second view is made available, the system will automatically determine who else it's available to without advance knowledge of the planned distribution list to all participants, privacy is less likely to be trusted and to the extent privacy was important for the people and subject matter involved, knowledge sharing and discourse is likely to be significantly constrained or it simply won't occur at all.

In addition to association-based privacy implementations, such as those described above, other embodiments may provide variable privacy features. Variable privacy features may enable users to selectively alter dialog privacy attributes between two or more options. For example, in some embodiments, dialog content or portions of dialog content may be selectively set or adjusted to occupy any of three privacy treatments: a public status (e.g. one in which each content item is available to users outside the dialog group, with author attribution such as personally-identifiable information); public-private status (e.g. one in which each content item is available to users outside the dialog group without personally-identifiable author attribution, and available to dialog members with personally-identifiable author attribution); or private status (e.g. one in which each content item is only viewable by dialog members). Enabling dialogs to have broader discoverability may have the following benefits to knowledge sharing and discourse: 1) It increases the chances that other people with valuable insights may find these dialogs and contribute valuable information to them, leading to better and/or more robust answers, and 2) It allows other people who may benefit from the content in these dialogs to find them, whether they have anything helpful to add or not. In some circumstances, the broader the distribution, the more value that will be created and shared. In these circumstances, the system may utilize methods aimed at encouraging users to publish second views of their dialogs to as inclusive of an audience as possible (e.g. entire populations, user bases, or defined groups without exclusive restriction). In other circumstances where privacy is particularly important (e.g. where there may be unforeseen legal implications for disclosure), the system may instead implement methods designed to achieve the critical goal of limiting discoverability exclusively to narrow and/or selective audiences.

Regardless of how an electronic conversation originated, it may be valuable to enable that conversation to come to exist in the public-private state: where conversation members see one view that includes personally identifiable information, and the remaining viewers see a view that excludes personally identifiable information of the conversation members. Variable privacy mechanisms may be beneficially implemented in numerous different communication platforms implemented via central network-connected servers or peer-to-peer clients.

Figure 17:
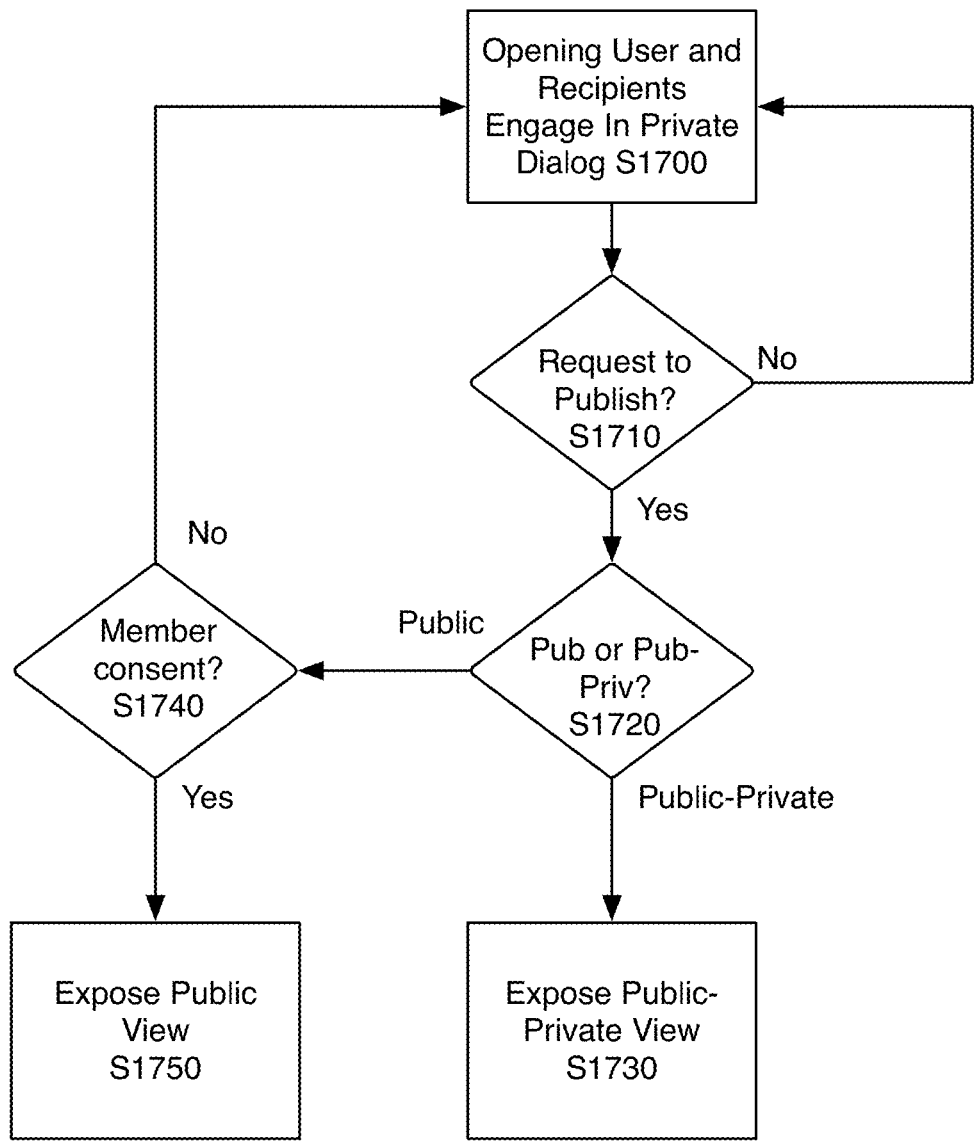
FIG. 17 is a process diagram for implementing variable privacy.

FIG. 17 illustrates one process for implementing variable privacy mechanisms, in the context of a network-connected computing platform that enables private communication amongst individuals interacting with the computing platform. The embodiment of FIG. 17 allows users to initiate a private conversation, and then later elect to disseminate the dialog content more broadly, while still controlling the privacy of the dialog participants. For example, users could initiate a private dialog amongst known, trusted individuals; then, if the invited dialog members cannot answer a question sufficiently, they can "crowdsource" an answer by exposing the dialog content more broadly and therefore increasing opportunities for valuable engagement with knowledgeable individuals.

In step S1700, a private dialog is conducted amongst one or more dialog members. The dialog includes one or more content contributions, with each content contribution being originated by a dialog member. In step S1700, the dialog content is not made available to individuals other than dialog members; meanwhile, dialog content is made available to dialog members via a first view, which includes personally-identifiable information enabling dialog members to attribute each dialog contribution to its contributor.

Figure 18:
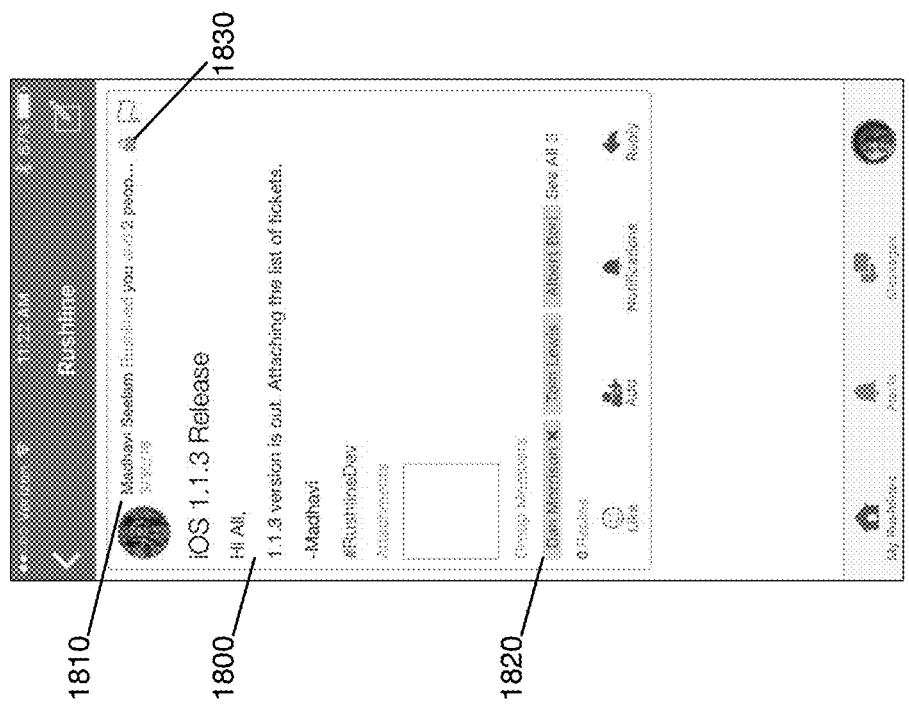
FIG. 18 is a user interface for messaging with variable privacy.

FIG. 18 provides an exemplary user interface for a mobile application implementing private conversations with variable privacy, such as could be implemented on smartphone 124 interacting with server 100. The user interface of FIG. 18 provides a first view of dialog content that is private to dialog members, with no view being made available to individuals who are not members of the dialog. Dialog content is displayed in display region 1800. Display region 1810 provides personally-identifiable information indicative of the contributor of content displayed in region 1810. Display region 1820 displays indicia indicative of some or all other dialog members. Lock icon 1830 provides a visual indicium indicating to a viewer that the dialog is private.

Returning to the process of FIG. 17, in step S1710, a determination is made as to whether a dialog member has requested to publish the dialog, or a portion thereof, towards making at least some of the dialog content available beyond the dialog members, such as a public or public-private view of the dialog. The request to publish in step S1710 will typically be associated with an explicit group of individuals to whom the dialog content (or portions thereof) will be made available. For example, in some embodiments, a request to publish may be specifically directed to making dialog content available (in whole or in part) to all individuals, i.e. the public at large. In other embodiments, a request to publish may be specifically directed to making dialog content available to specific individuals or groups of individuals, such as: all other members or registered users of a service via which the content is published; predefined subsets of users of a service via which the dialog content is published; individuals associated with a third party service (e.g. sharing a second view of the dialog via Twitter™ or Facebook™); individuals associated with a subgroup defined via a third party service (e.g. sharing a second view of the dialog with a user's Facebook Friends, a Facebook Group or Google Group); individuals individually identified by a dialog member (e.g. via email address, phone number or other contact mechanism); and/or individuals individually identified by the opening dialog member.

It is understood publishing to third party audiences may include making a second view of the dialog available for publishing and/or receiving responses at a third-party platform that is not associated with the system where the dialog originated. In such a scenario, a second view with personally identifiable author information removed might be published at Facebook, LinkedIn, or some other third-party platform. Depending on available integration, comments to such views may or may not be published back to the originating system. In some embodiments, a communications platform could be provided that allows users to start conversations with known dialog members, where the platform automatically posts a second, anonymized view of the conversation to the user's account on a third party social networking platform, to help get more answers without comprising the user's privacy or the privacy of others with whom the user initiates the communication. The platform may also post the dialog to the social network accounts of other dialog members, if authorized. The dialog members' social network connections can view the conversation, share it with their own connections, and participate, allowing the conversation to live on the web anonymously.

If no request to publish is received in step S1710, the dialog continues as a private dialog (step S1700). If so, a determination is made as to whether the requesting dialog member has requested to publish a public-private view, in which dialog member personally identifiable information is shielded from exposure outside the dialog members, or a public view, in which dialog content is made available with personally identifiable contributor information to individuals outside the dialog network. If the dialog member has requested to publish a public-private view, the communication platform makes a second view of the dialog content available to individuals other than the dialog members, that excludes personally-identifiable information associated with the individual(s) that contributed each element of dialog content (step S1730).

If the dialog member has requested to publish a public view (which includes personally-identifiable author information) to individuals other than dialog members, other dialog members can be queried for authorization (step S1740). If the public view of the dialog content is authorized, the platform makes available a view of the dialog content that includes personally-identifiable author attribution, to individuals other than dialog members (step S1750). If the public view of the dialog content is not authorized by the dialog members, the dialog continues as a private dialog accessible only to dialog members (step S1700). It is understood and contemplated that circumstances may arise where some dialog members provide authorization while others withhold, and that in such circumstances partial views of the dialog may be made available in a second view that exclude the contributions by the withholding dialog members.

Figure 19:
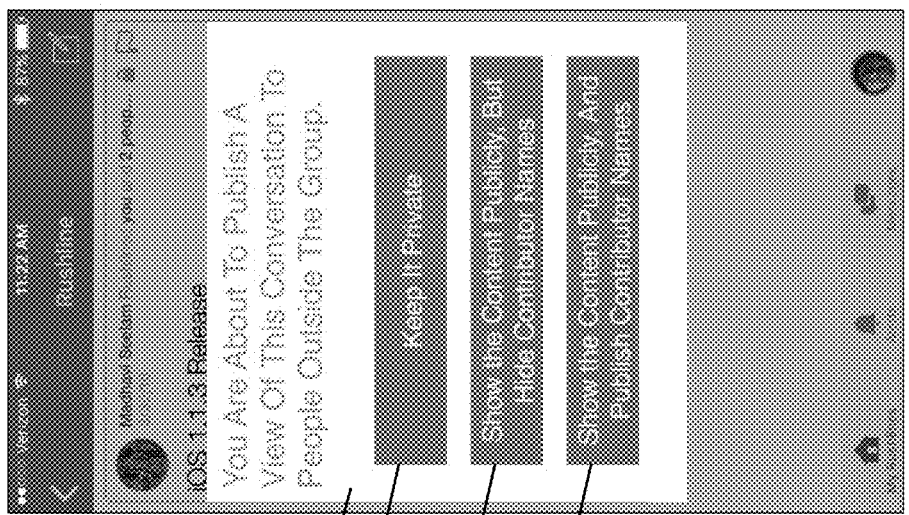
FIG. 19 is a further user interface for messaging with variable privacy.

FIG. 19 illustrates an exemplary mobile user interface via which a user could specify variable privacy settings for a previously-private dialog (e.g. steps S1710-S1720). In some embodiments, the display of FIG. 19 could be triggered by, e.g., a user selecting privacy status indicium 1830 via the user interface of FIG. 18. User query window 1900 pops over the private dialog display. Query window 1900 includes button 1910, selection of which preserves the dialog as private with no second view available to individuals other than the dialog members (e.g. a means for selecting the "No" option of step S1710). Selection of button 1920 causes server 100 to make available a public-private second view of the private dialog content of region 1800, in which contributor identity 1810 and group member identities 1820 are withheld (e.g. step S1730). Selection of button 1930 causes server 100 to make available a public second view of the private dialog content of region 1800, in which contributory identity 1810 and group member identities 1820 are made available to individuals other than group members (e.g. step S1750).

While the method of FIG. 17 provides an exemplary embodiment of variable privacy for a dialog initially started as private, other variations may be implemented. For example, in some embodiments, unless and/or until user consent to a fully public view is obtained from the dialog members in step S1740, a public-private view of the dialog may be exposed automatically (step S1730), rather than withholding any public or partially-public view at all. In other variations, consent may be sought to provide a public-private view rather than a fully public view. In other variations, the ability to control privacy features (e.g. requesting publication in step S1710) may be provided only to a dialog opening member, rather than all dialog members. In other variations, a dialog opener may be permitted to modify dialog privacy settings (e.g. exposure of a second view that is public or public-private) without consent of other users, while non-opening dialog members may be required to obtain consent (e.g. from the opening user and/or other dialog members) before modifying a dialog privacy setting.

In other embodiments, a network-based communication platform may be utilized to make available views of dialogs initiated via various other, independent private communication mechanisms (such as email, SMS, and other chat or messaging platforms) with variable and/or association-based privacy. Thus, for example, a member of an email communication chain could initiate a dialog (analogous to step S1700) within the network-based communication platform of FIG. 17, based on the contents of a prior email exchange with others that transpired through some other independent communication mechanism. The process of FIG. 17, and the associated communications infrastructure, could then be used to enable members of the public to review, learn from and/or comment on the dialog exchange, via a view providing association-based privacy, such as a public-private view that withholds the identity of dialog members to individuals who are not dialog members.

While the embodiment of FIG. 17 discloses a variable privacy mechanism in the context of a dialog that is initiated as a private dialog, in yet other embodiments, a network-connected communication server may implement a variable privacy mechanism in the context of a dialog in which non-private (e.g. public-private) views are exposed ab initio. For example, a communications server may be configured to expose a second, public-private view of a dialog by default, with dialog members being presented with options to add user attribution to the second view (i.e. make the second view fully public) or remove the second view entirely (i.e. make the dialog private).

Embodiments may also enable users to control the scope of exposure for various dialog views. Dialog members may be provided with a selection tool to pick one or more of multiple groups of individuals to whom the dialog content is made available, in whole or in part. In some embodiments, the groups are known to the dialog member, enabling the dialog member to understand the scope of distribution being permitted. For example, the embodiment of FIG. 17 contemplates universal access to the second view, when it is made available. The second view is inherently made available to a group known to the dialog members, which includes all individuals other than dialog members (or in some cases, all registered users of a communication platform other than dialog members). However, in other embodiments, users may specify one or more of multiple possible scopes of distribution for the various dialog views that are made available. For example, a second view of a dialog could be published to predefined subsets of individuals, in accordance with default system rules and/or publishing dialog member specification. Predefined subsets of individuals may include, e.g., a user's social network connections (such as Facebook™ Friends or publication via Twitter™), groups of individuals defined via third party platforms (e.g. a Facebook Group or LinkedIn™ group), groups of individuals defined via the communication platform (e.g. distribution lists, followers of certain topics or hashtags, forum members, members of a restricted access community, etc.), or individually-specified individuals.

Selection of individuals to whom the second view is made available may also be determined algorithmically, such as by a centralized communication server. For example, when a user requests to publish dialog content outside the dialog members in step S1710, an associated server 100 identifies potential recipients believed to be interested and/or knowledgeable in the subject matter of the dialog. For example, application logic 102 may implement natural language processing on the dialog content to extract dialog content characteristics (such as keywords or topics), and then compare those dialog content characteristics against characteristics associated with each user (such as via user profile keywords or other profile content, user behavioral profiling, prior dialog contributions by each user, topics followed by a user, or the like). These and other user targeting mechanisms may be employed to facilitate optimal distribution of dialog content. In some embodiments, the publishing user may be presented with a system recommended list of potential users, groups, or forums for distribution from which the user may select or deselect prior to publishing. In some circumstances, knowing exactly which people, groups of people, or other populations at large their post will be available to prior to publishing may be critical to providing the degree of trust and confidence in their privacy necessary for them and their dialog members to openly contribute their insights and opinions.

In some embodiments, it may also be desirable to provide multiple or varying mechanisms by which an individual may be designated a dialog member. For example, as described in several embodiments herein, dialog members may be explicitly identified by a dialog opener. In some embodiments, dialog members may be permitted to invite other individuals to become dialog members. In some embodiments, individuals may be permitted to subscribe to a dialog in order to opt in to dialog membership. In some embodiments, individuals may be permitted to request dialog membership, which request may be approved by, e.g., the dialog opener, a dialog administrator, or another dialog member. In any case, once an individual is designated a dialog member, the first view of the dialog may be made available to them.

User Control Over Broadly Disseminated Dialog Views

While providing variable and/or association-based privacy mechanisms to control dissemination of information that is personally-identifiable with content contributors may eliminate or significantly mitigate dialog member privacy concerns, in some circumstances, dialogs amongst individuals may include information embedded within the substantive dialog content that reveals contributor identity or otherwise includes information content that may be considered private or sensitive (e.g. posting the name of someone's family member or employer could be used to reveal their own identify, as would, obviously, posting an image of themselves or a family member). In such circumstances, the availability of a broadly-disseminated view may inhibit dialog members from communicating freely. Dialog members may also inadvertently disseminate information more broadly than intended, within the members' substantive dialog content. As a result, it may be desirable to provide content contributors and/or dialog members with tools to modify the view of dialog content published to individuals other than dialog members.

Figure 20:
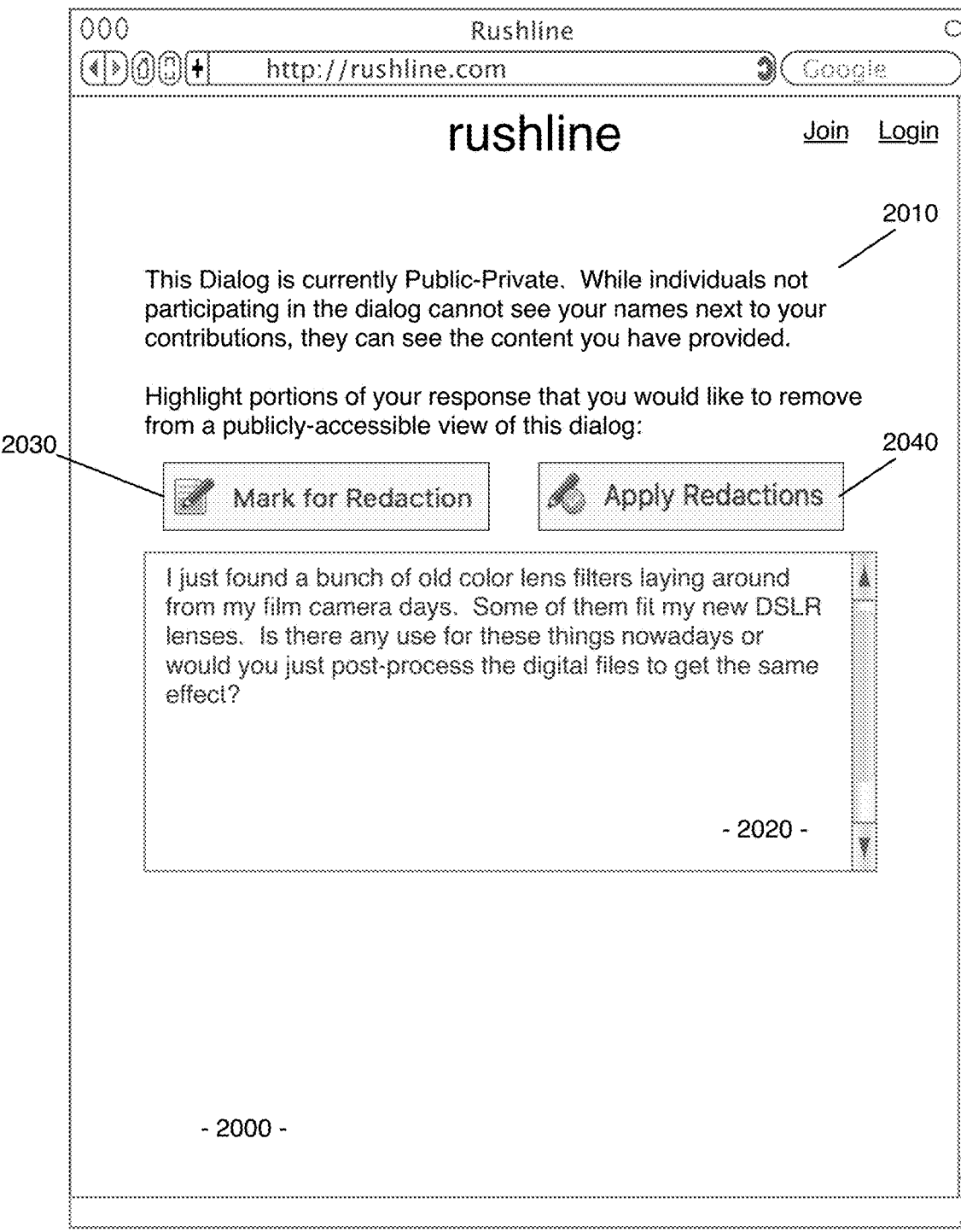
FIG. 20 is a user interface for redacting content from dialog views made available outside a dialog network.

One such tool for controlling dissemination of dialog content is a redaction tool. Dialog members may be provided with tools to manually identify portions of a content contribution that will be redacted or otherwise removed from a second view of the content made available to individuals not having privileges required to view a user's personal content, such as individuals other than dialog members. FIG. 20 illustrates an exemplary user interface 2000 that may be rendered on a client device, in communication with a centralized application server, in order to mark content for redaction from publicly-disseminated dialog views in a text-based dialog. Message display 2010 provides a user with an indication of the current privacy status of a dialog. A content contribution from the currently logged in user is displayed in region 2020. Mark for Redaction indicium 2030 can be selected, after which portions of text within region 2020 can be selected for redaction from a second view of the dialog, made available to individuals other than dialog members. Apply Redactions indicium 2040 can then be selected to apply marked redactions to the dialog content, when rendered in the second view.

While FIG. 20 illustrates an exemplary user interface for redaction of user-entered text content, other types of user content contributions may call for analogous redaction mechanisms. For example, in some use cases, users may contribute content in the form of a PDF document; well-known PDF redaction tools may be applied by users to provide viewer-dependent redactions in the manner described herein. Similarly, content contributions may include bitmap graphics, such as images of scanned documents or photos of people. For example, users may wish to share an image of a medical record or bill to discuss with trusted colleagues; in such a circumstance, it may be desirable to redact any name and address appearing on the document from viewing outside of a trusted group, while enabling feedback regarding unredacted portions from others. As another example, a user may desire to post a photo in its entirety to a trusted group, while making the image available with certain individuals' faces blurred for comment or consumption by others. Image-based content redaction tools, such as "black box" or image-based graphic overlay tools, or tools to blur a portion of an image (such as a blur filter), are known and may be applied to enable presentation of viewer-dependent views of such content, using the methods and mechanisms described herein.

Using such mechanisms, content contributors can be provided with fine-grained control over dissemination of their content to individuals outside a privilege group, such as individuals outside a particular dialog network.

Association-Based and Variable Privacy for Forums

In yet other embodiments, association-based and/or variable privacy mechanisms can be implemented in the context of a communications environment in which privacy criteria are determined at an organizational level that is separate and distinct from an individual dialog. One such example is an online forum in which individuals can become members or registered users. Thus, the forum has a defined membership that may be utilized as a criterion for association-based and/or variable privacy mechanisms.

Figure 21:
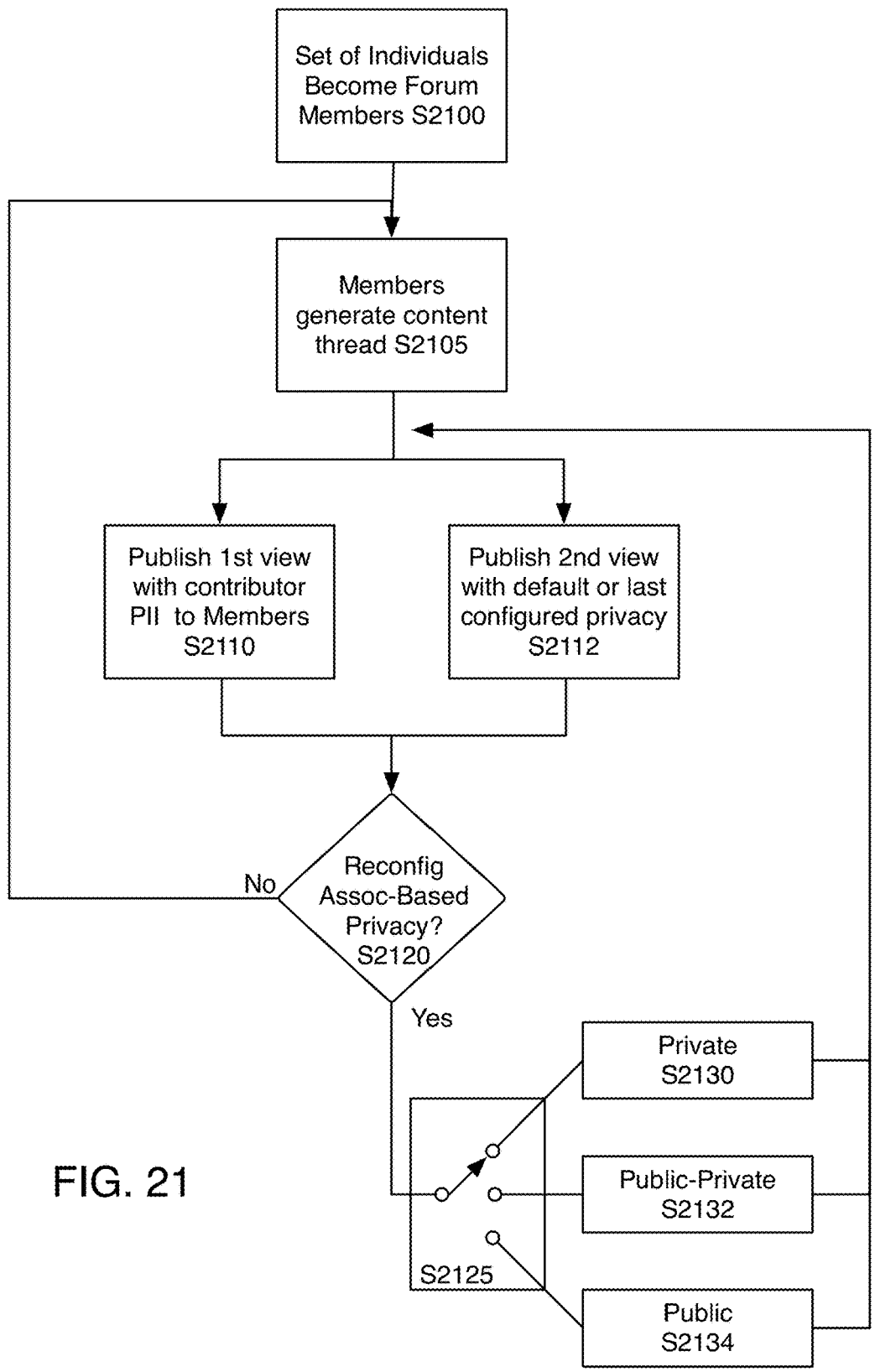
FIG. 21 is a process diagram for implementing variable and association-based privacy in an online forum.

FIG. 21 illustrates an exemplary association-based and variable privacy mechanism, in the context of an online forum. In step 2100, a set of one or more individuals become forum members. Forum membership may be granted by one or more mechanisms, such as being added by someone with authority to do so (such as a forum moderator), by an individual opting in to membership (e.g. joining the forum), or both. In step S2105, a content thread is generated by one or more of the forum members. Typically, a content thread will be generated by an opening member posting an initial content item for publication by the forum to other members. Other members may then contribute further content in response. In some forum, content may be organized by hierarchical subcategories based on, e.g., intended subject matter for content therein.

In step S2110, a first view of forum content is published or otherwise made available to other forum members. This first view includes both dialog content and user attribution, such as personally-identifiable information associated with the dialog content contributors. In step S2112, a second view of forum content is published or otherwise made available, implementing an association-based privacy configuration that is a system default or most recently configured for the thread. In step S2120, a determination is made as to whether association-based privacy is reconfigured for a particular content thread. If so, an association-based privacy configuration is specified in step S2125. In the illustrated embodiment, one of three privacy states may be specified in the reconfiguration: a private state S2130, in which the second view is withheld from publication to individuals other than members in step S2112; a public-private state S2132, in which a second view is made available to individuals other than members in step S2112, but the second view omits personally-identifiable information associated with the content contributors; and a public state S2134, in which a second view is made available to individuals other than members in step S2112, and the second view includes personally-identifiable information associated with content contributors. In any event, after reconfiguration, the content thread is made available accordingly in steps S2110 and S2112.

In some embodiments, any member may be permitted to reconfigure privacy settings for a content thread. In other embodiments, a forum platform may solicit consent from content thread contributors prior to implementing a reconfiguration of privacy settings.

While the embodiment of FIG. 21 illustrates variable and association-based privacy mechanisms applied to a forum on a content thread basis, in other embodiments, variable and association-based privacy mechanisms may be applied to a forum at different levels of a content hierarchy. For example, the configuration of a second view exposed to non-members may be configurable for an entire forum, rather than on an individual thread basis. Alternatively or additionally, for forums in which content threads are organized by topical categories and subcategories, the configuration of a second view exposed to non-members may be separately configurable for a particular category or subcategory.

Variable and association-based privacy may be configured at hierarchical levels below an individual thread as well. For example, a subset of content contributions within a thread may be made available via a non-member second view that differs from the non-member second view applied to the thread, as a whole. In such embodiments, members may select specific content items for broader or narrower dissemination.

Restricted Access Communities

In some embodiments of communication platforms implementing association-based and/or variable privacy mechanisms, second views of dialog content that potentially withhold dialog member identification may be defined relative to a broad public body of users, such as any Internet user. However, in other embodiments, it may be desirable to implement a communication platform with variable and/or association-based privacy mechanisms within a restricted access community, where membership is controlled.

In such an environment, the public to which a second view of dialog content is accessible may be restricted to a controlled set of individuals, i.e. members of the restricted access community. Thus, for example, dialog content designated as Private may be viewable only by associated dialog members; dialog content designated as Public-Private may be viewable with user attribution by associated dialog members, and without user attribution by any member of the restricted access community; and dialog content designated as Public may be viewable with user attribution by all members of the restricted access community. Meanwhile, no view of the dialog content at all may be provided to individuals who are not members of the restricted access community.

In some embodiments, restricted access communities may also permit yet other variable privacy options. For example, dialog content may be made available with contributor attribution to all members of the restricted access community, but without attribution to the public-at-large, i.e. individuals who are not members of the restricted access community. An option may also be provided to make dialog content available with contributor attribution to all individuals, regardless of whether they are members of the restricted access community.

Figure 22:
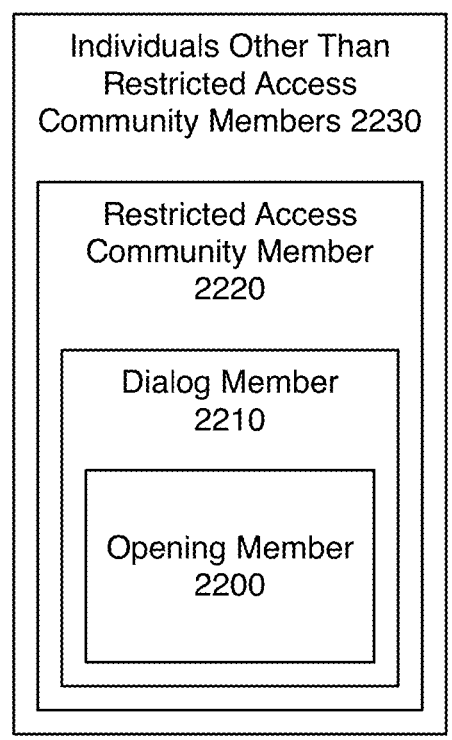
FIG. 22 is a schematic block diagram of viewer categories for use in applying association-based and/or variable privacy mechanisms.

FIG. 22 is a schematic representation of viewer categories which may be utilized as a basis for selecting a variable privacy mechanism for application to a dialog content view. Viewer categories include: the dialog opening member 2200; other dialog members 2210 (including, in some embodiments, users specified by the opening member); all members of a restricted access community 2220; and individuals other than restricted access community members 2230.

In yet other embodiments, multiple restricted access communities may be implemented within a communications platform, having separate and/or overlapping membership. In such embodiments, variable privacy mechanisms may be applied on a per-community basis. For example, content from a dialog concerning an individual's personal medical condition may be made available with user attribution to a restricted access community composed of licensed medical doctors, and without user attribution to a restricted access community composed of individuals suffering from a related medical condition.

Variable privacy mechanisms such as those of FIGS. 17-22 may provide individuals with important tools to balance accountability achieved through personal attribution of contributions, with privacy sufficient to promote unfettered participation by dialog members.

Integration with External Communication Systems

In some communication platforms implementing association-based and/or variable privacy mechanisms, a privacy-enabling system may integrate in various ways with external communication systems. The original source of a dialog may be a communication platform that is separate and independent from the privacy enabling system. Additionally or alternatively, a dialog view generated by the privacy-enabling system may be displayed to other individuals via one or more other external communication platforms.

Figure 23:
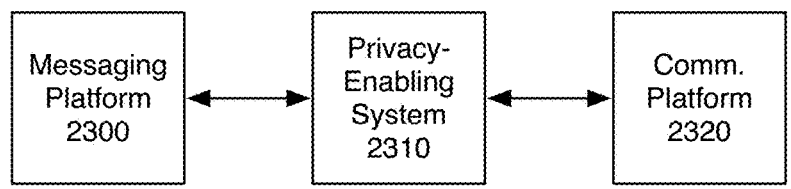
FIG. 23 is a schematic block diagram of a privacy enabling system integrated with external communication platforms.

FIG. 23 provides a schematic representation of some such embodiments. A dialog conducted amongst a group of dialog network members via messaging platform 2300, may be conveyed to privacy-enabling system 2310, with a modified view of the dialog content being published via communication platform 2320. Privacy-enabling platform 2310 can be implemented to mirror a conversation or dialog conducted on platform 2300, providing a second dialog view that removes personally identifiable information directly by system 2310 and/or by publishing the second dialog view to platform 2320. Communication platform 2320 may include one or more other communication mechanisms such as a web site, mobile app, API feed, and/or third party social network such as Facebook™ or Twitter™.

Figure 24A:
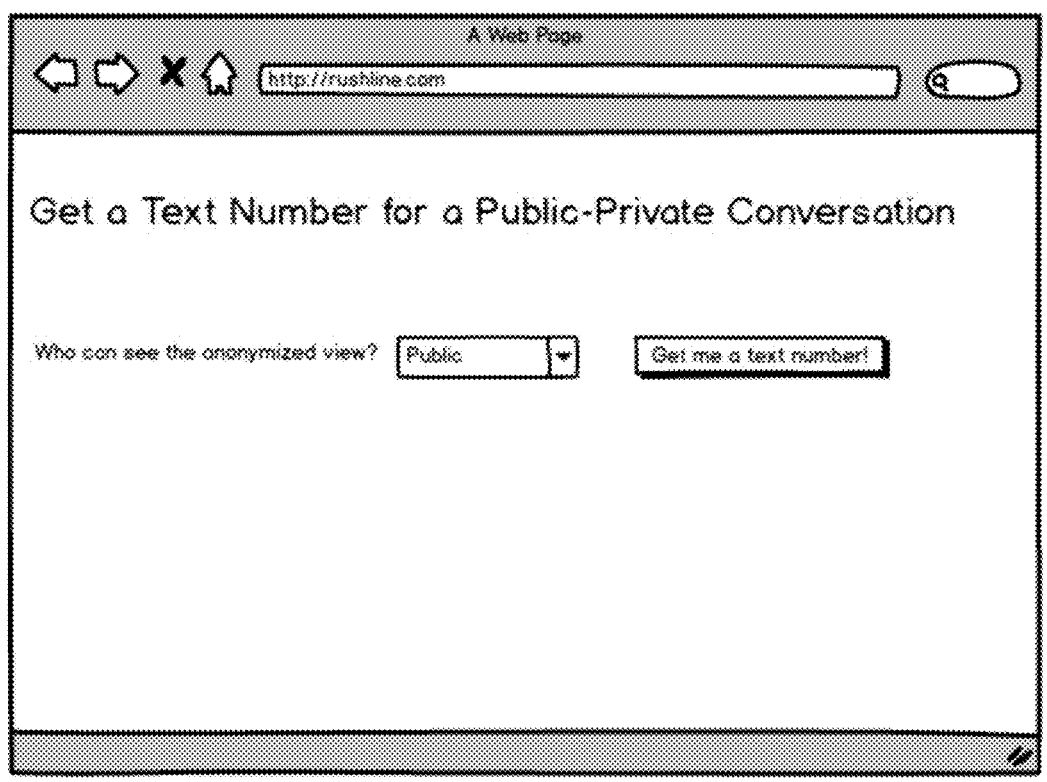
FIG. 24A is a first user interface for initiating a second view of a SMS conversation.
Figure 24B:
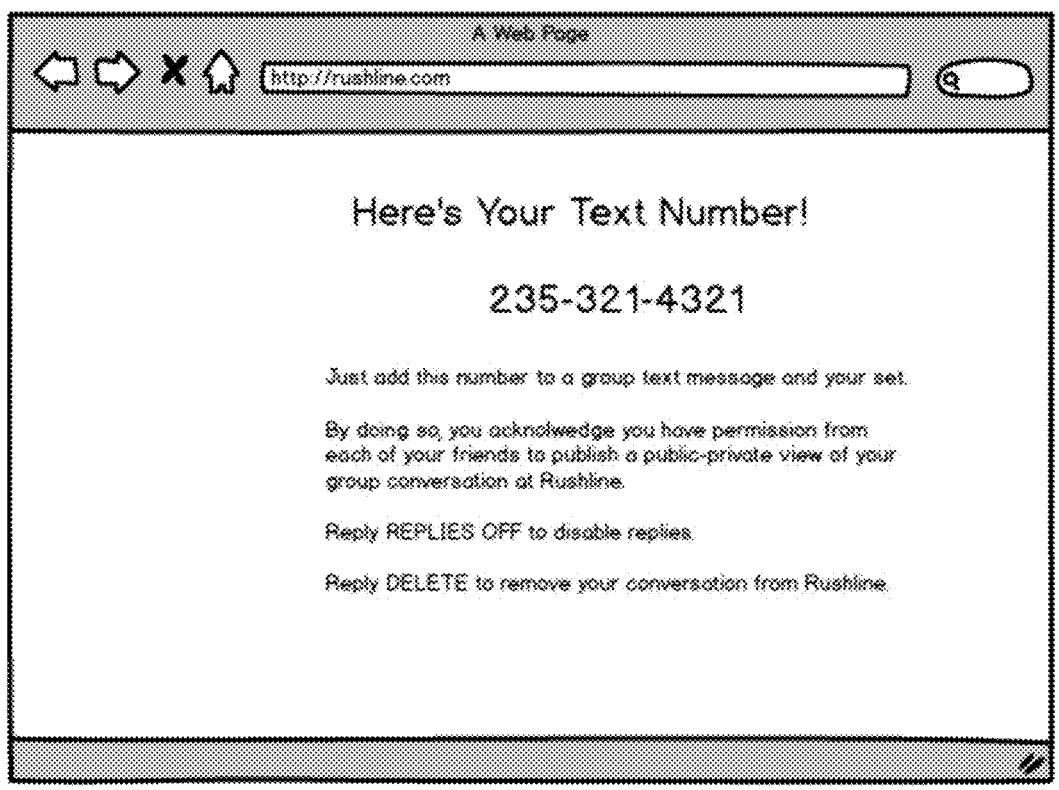
FIG. 24B is a second user interface for initiating a second view of a SMS conversation.

In one embodiment, one or more individuals may start a dialog using SMS or MMS text messaging as a messaging platform 2300. By adding a dedicated text number provided by the privacy enabling system to their text message conversation (e.g. adding the privacy enabling system to a group text message), a second view of all messages sent to that conversation with author attribution removed is published to the privacy-enabling system. FIG. 24A illustrates an exemplary user interface that may be provided to initiate configuration of a text messaging conversation integration, with which the user specifies the type of integration desired (e.g. Public or Public-Private). FIG. 24B illustrates an exemplary user interface subsequently providing a telephone number for inclusion in the group SMS exchange. The members of the text message conversation are considered to be the dialog members.

Figure 25:
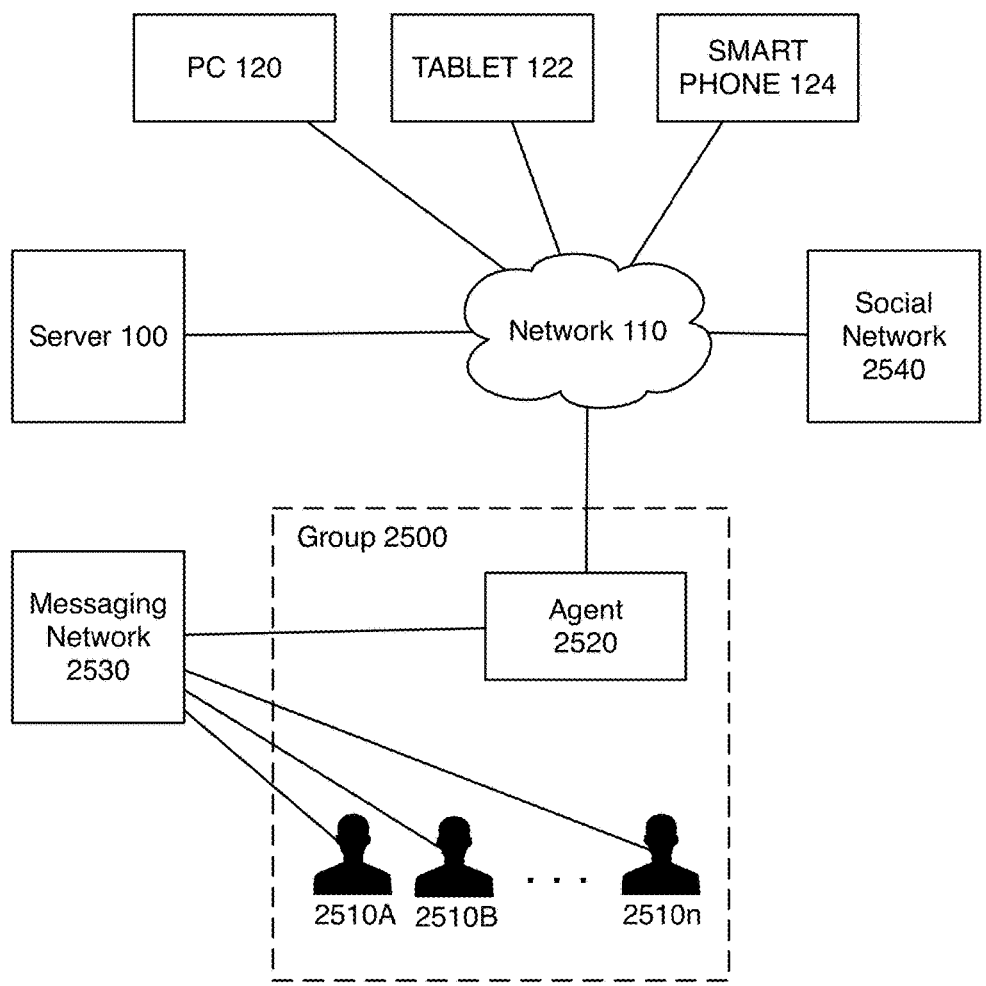
FIG. 25 is a schematic block diagram of a communications network for mirroring a dialog conducted via an external messaging platform.

FIG. 25 illustrates an embodiment of a communications network for generating an anonymized mirror of a conversation conducted via an independent group messaging platform, such as group SMS. A messaging group 2500 (e.g. an SMS messaging group) includes multiple users 2510 and agent 2520. Users 2510 are associated with dialog participant devices capable of messaging on the desired messaging platform, such as smartphones. Agent 2520 is a data service providing network-connected servers or devices with messaging services on the desired messaging platform, such as via an API. For example, in an SMS messaging embodiment, Twilio™ SMS services may be utilized, with agent 2520 being associated with an SMS number such as that provided via the user interfaces of FIGS. 23 and 24. Members of group 2500 transmit and receive messages via messaging network 2530. In a group SMS embodiment, messaging network 2530 may include one or more cellular service provider networks. Agent 2520 also interacts with network 110, and in turn, server 100, in order to convey messaging platform content to server 100.

While agent 2520 is illustrated, in the embodiment of FIG. 25, as a component separate from server 100, in other embodiments, agent 2520 may be implemented directly by server 100, such as by a component implemented in application logic 102. Such embodiments may be particularly advantageous when messaging network 2530 provides an API for direct interaction by network-connected servers.

Figure 26:
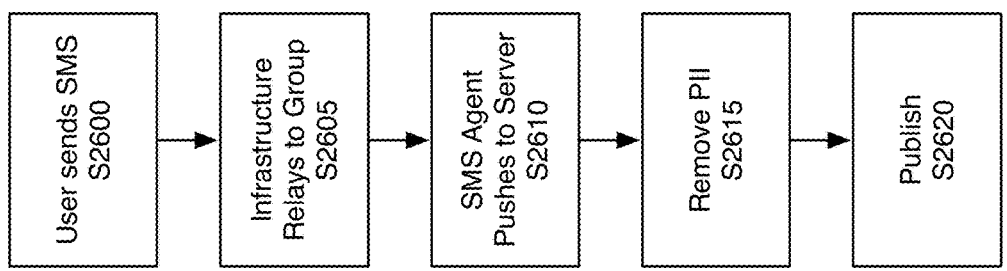
FIG. 26 is a process for mirroring a dialog conducted via SMS.

FIG. 26 illustrates a process that can be implemented within the network of FIG. 25, to provide mirroring of SMS conversations with participants' personally identifiable information removed. In step S2600, one of users 2510 sends an SMS message to a SMS group 2500, namely, each of users 2510A, 2510B et seq., and further including an SMS number associated with a SMS agent 2520 (such as that provided in FIG. 24). In step S2605, the SMS message sent in step S2600 is received by SMS network 2530, and relayed to the other members of SMS group 2500. In step S2610, SMS agent 2520 receives the inbound message, and pushes its content to server 100 (e.g. via API connection between SMS agent 2520 and messaging server 108).

In step S2615, server 100 (via operation of application logic 102) removes (or flags for removal) personally identifiable information (PII) from the received message, and stores the message within database 104. Varying levels and types of PII removal can be implemented. For example, in some embodiments, PII removal may include removal of sender and recipient information (e.g., in the context of group SMS messaging, removing the sender and recipient phone numbers).

While step S2615 may be referred to as removal of personally identifiable information, it is contemplated and understood that this step encompasses various techniques to prevent the display of some or all personally identifiable information within a public, or more broadly disseminated, view of a dialog otherwise conducted amongst individuals using a non-public messaging platform. For example, upon receiving a dialog content contribution in step S2610, server 100 may operate to remove PII prior to storing an anonymized copy of the content contribution later published in step S2620. In other embodiments, server 100 may operate to flag content known to be, or suspected of being, PII. The original dialog content and PII flags can then be stored within database 104, and utilized to later render a view of dialog content with PII removed prior to its publication. These and other variations of PII removal sequences may be utilized, as would be understood by a person having ordinary skill in the relevant field.

In some embodiments, anonymization of message content may be undertaken by making message content pseudonymous, such as replacing the phone number of senders and recipients with system-assigned (and possibly random) icons, monikers, avatars or other user indicia that does not identify the associated individual's real identity. Server 100 may associate a dialog participant's electronic contact address used for a particular communication (e.g. SMS number) with a non-identifying user indicium on a per-dialog basis (e.g. such that a random indicium is associated with the user persistently within a given dialog), or across dialogs (such as where a user is assigned a user indicium that is used across multiple dialog networks in which the user participates).

Particularly in an embodiment in which a group dialog, conducted via a traditionally private messaging platform, is seamlessly or automatically mirrored with a public view, dialog participants may naturally refer to one another by name within the body of content contributions, without fully considering privacy implications of doing so. Therefore, in addition to removing personally-identifiable information from dialog sender and recipient fields in the mirrored dialog view, it may also be desirable to remove personally-identifiable information from substantive dialog content contributions made available in a mirrored dialog view that is made available beyond the dialog network. For example, in an embodiment providing aggressive automated removal of personally identifiable information, application logic 102 may include a natural language processing mechanism configured to recognize and remove any proper names from the mirrored view of a content contribution.

Other embodiments may seek to limit name removal to known names of dialog participants or people or entities with whom a dialog participant may be identified. For example, dialog participants may each be provided with a user profile, illustrated schematically in FIG. 30. User profile 3000 may be configured within privacy enabling system 2310, as implemented by server 100, and available for editing via user devices 120, 122 or 124. User profiles may include, amongst other things, user preferences 3005, a list 3010 of electronic contact addresses and external communication platform handles with which the user is associated, as well as a list 3015 of words or phrases that the user believes to be potentially identifying in the context of their communications and which the user desires to conceal from viewers other than other members of dialog networks in which the user participates. Additionally or alternatively, user profile 3000 may include a number of identifying information fields 3020, each prompting the user for an item of text content with which the user may be identified, such as "Employer Name", "Spouse", "Child" or the like.

Figure 30:
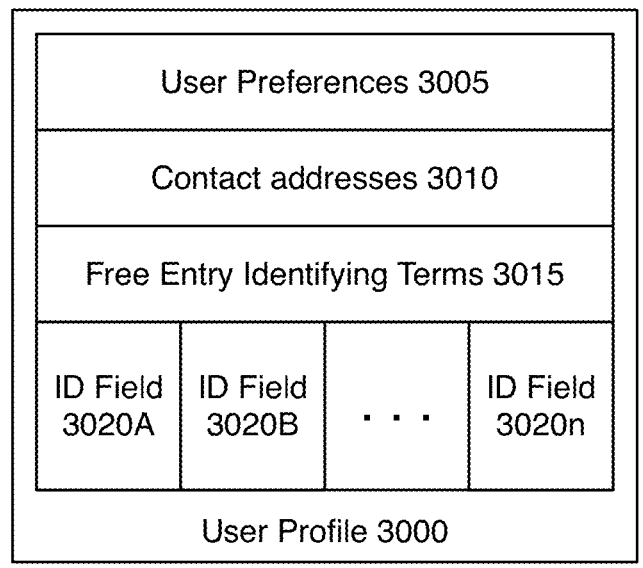
FIG. 30 is a schematic block diagram of a user profile.
Figure 31:
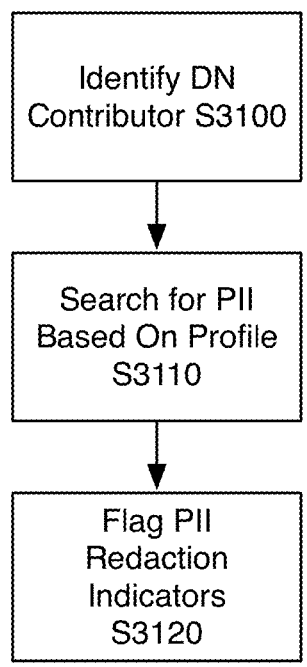
FIG. 31 is a process for applying descriptive redaction indicators.

In operation, the user profile of FIG. 30 may be used to remove PII in step S2615, using the process in FIG. 31

Upon receiving a dialog contribution from a dialog network member, server 100 operates to identify the content contributor (step S3100). For contributions originating on external messaging platform 2300, the content contributor may be identified by cross-referencing a contributor's electronic communication address from the private messaging platform (e.g. SMS number, email address, social network username, or the like) with contact address fields 3010 within user profiles. For contributions contributed via a messaging mechanism implemented directly by server 100, server 100 may associate the contribution with a user profile based on the logged in user. In any event, server 100 may then search the contribution for PII specified in user profile fields 3010, 3015 and/or 3020 (step S3110). PII identified in step S3110 may then be flagged for replacement in step S3120. A contribution version with replacements determined in step S3120 may subsequently be published (e.g. in step S2620, described below).

In some embodiments, PII content removed or flagged for removal may be replaced by a redaction indicator. Removed content may be replaced with a generic redaction indicator, such as [REDACTED] or [XXXX]. In some embodiments, server 100 may operate to replace PII content with descriptive redaction indicators. Information within profile 3000 may be utilized to select redaction indicators descriptive of the removed content. For example, if profile field 3020A corresponds to a user's current employer, and the user specifies "Acme" within field 3020A, the instances of text content "Acme" found within a dialog contribution may be replaced with "[COMPANY NAME]", thereby providing an indication of the nature of the content removed.

In step S2620, the dialog view with PII removed (and replaced with redaction indicators) is published via one or more publication mechanisms. In some embodiments, server 100 may make available a web site using web server 106, through which individuals other than dialog members may access a mirrored view of dialog content, with PII removed. In some embodiments, the mirrored dialog view with PII removed may be published to social network 2540, such as Facebook™ (e.g. publishing dialog content to a Facebook group or a user's timeline), LinkedIn™ or Twitter™. In some embodiments, the mirrored dialog view with PII removed may be published via an API made available by server 100, such that the mirrored dialog content may be accessed by third party information systems. For example, a search engine may index mirrored dialog views to index and make available substantive dialog content, while limiting or avoiding the disclosure of participants' personally identifiable information.

In some embodiments, it may be desirable to permit users of messaging platforms to which anonymized dialog views are mirrored, to reply to dialog content, with replies being relayed back to the originating dialog group 2500 via the originating messaging platform. For example, in the SMS messaging example described above, as other users of the privacy enabling system (and/or third party platforms to which the privacy enabling system pushes anonymized dialog content) other than dialog members reply, their messages may be automatically texted back to the SMS group 2500, and these messages may or may not include personally identifiable information of the author. In particular, server 100 may utilize SMS agent 2520 to send a SMS message containing reply dialog content to users 2510 via messaging network 2530. In some embodiments, by texting a simple command (e.g. REPLIES OFF), any dialog member may disable further replies from the privacy enabling system. In some embodiments, dialog members may further have the option to text a command (e.g. "DELETE"), thereby causing the privacy-enabling system to stop publishing the second view.

Figure 27:
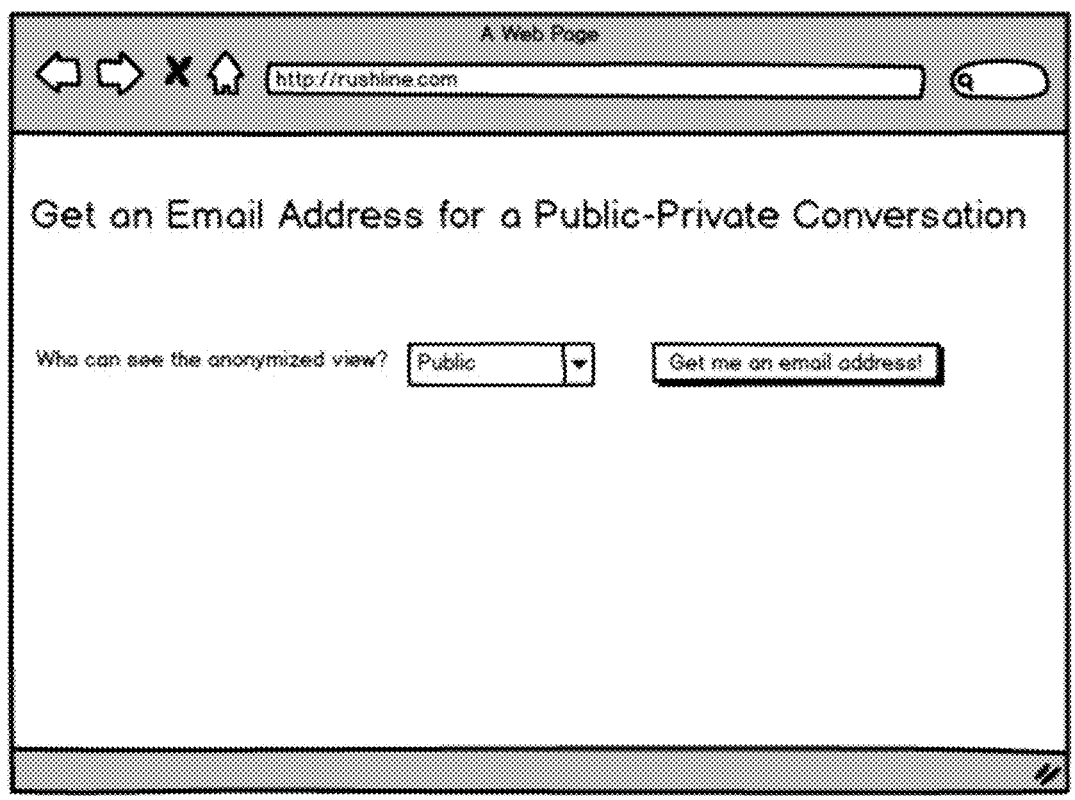
FIG. 27 is first user interface for initiating a second view of an email conversation.
Figure 28:
FIG. 28 is a second user interface for initiating a second view of an email conversation.

The embodiments of FIGS. 23-26 can provide simple and seamless mirroring of a second view of dialogs conducted via SMS, by adding an SMS number associated with a communication platform to a group SMS recipient group. However, like embodiments can be readily used to extend the same functionality to other independent messaging platforms. For example, users may automatically mirror a group dialog conducted via email, with PII removed, by including an email address associated with server 100 to the email recipient list. FIG. 27 illustrates an exemplary user interface that may be provided to initiate configuration of an email conversation integration, with which the user specifies the type of integration desired (e.g. Public or Public-Private). FIG. 28 illustrates an exemplary user interface subsequently providing an email address for inclusion in the group email exchange. The members of the email conversation are considered to be the dialog members.

A second view of all messages sent to that email conversation, with author attribution or other PII removed, can then be published by the privacy-enabling system, as described above in connection with step S2620. In such an embodiment, agent 2520 may be an email inbox with predetermined message processing, while communication network 2530 may be a network of interconnected mail servers. In email embodiments, mail headers may include not only electronic contact addresses, but also name fields associated with senders and recipients, which can be extracted by server 100 in order to identify and remove PII in step S2615.

Similar to SMS embodiments described above, as other users of the privacy enabling system other than dialog members reply to a dialog, their messages can be automatically emailed back to all members of the group email message, similar to a CC all function in email, and these messages may or may not include personally identifiable information of the author. In some embodiments, by emailing a simple command (e.g. REPLIES OFF), any dialog member may disable further replies from the privacy enabling system. In some embodiments, dialog members may further have the option to email a command (e.g. "DELETE"), thereby causing the privacy-enabling system to remove the second view from its system or stop publishing the second view.

In another variation of the email embodiment described above, an email conversation integration may begin with an initial conversation thread being forwarded to the dedicated email address provided by the privacy enabling system, thereby prepopulating the second view of the conversation on the privacy enabling system with an email conversation that already transpired. Consistent with other embodiments described here-in, the prepopulated view will preferably have personally identifiable information removed prior to publishing. In such embodiments, the system may accept conversations previously published on an external communication system, and publish a second view from that point and time to an audience with personally identifiable information removed.

Other embodiments may incorporate similar integrations with various other external communication platforms that enable group conversations with external sources. For instance, Facebook and Snapchat integrations may be implemented allowing similar second views of group conversations to be published on the privacy-enabling system or other external communication networks. For example, agent 2520 may be implemented by an API provided by a network-based messaging platform 2530.

Certain embodiments described above illustrate front-end external integrations, in which dialogs originate on a communication platform that is external to the privacy-enabling platform, with or without back-end external integrations to publish an anonymized view of the dialog. However, in other embodiments, only a back-end external integration may be provided. A dialog may be conducted amongst a dialog network on the same communication system on which privacy-enabling mechanisms are implemented. The anonymized dialog view may then be published by that system to external systems, such publication for display on social networks or for indexing by search engines. Thus, messaging systems such as those described herein in connection with, e.g., FIGS. 1-14 and 17-22, may additionally publish dialog views with author attribution or other PII removed via external platforms, such as Facebook™, Twitter™ or the like.

Embodiments implementing external integrations may rely on system default configurations to determine which individuals the dialogs will be published to (e.g. all other individuals, all registered users, or some subgroup). Alternatively, these configurations may be determined by the integration address used (e.g. the text number or email address provided by the system that is used to start the dialog on the privacy enabling system).

Reversing Pseudonymous References to Dialog Network Members

When dialog network member PII is replaced by system-generated monikers or other indicia, users viewing the anonymized dialog view may wish to respond to dialog content with reference to dialog network members and their content. Some embodiments may implement reverse anonymization mechanisms, whereby system-generated pseudonymous monikers used to replace dialog network member identification in anonymized dialog views may be used in responses from individuals responding to anonymized dialog view content. When rendering views of such responses, the privacy enabling system then renders the system-generated moniker within an anonymized dialog view, but converts the system-generated monikers back to identifiable references to the associated dialog network member when displayed to dialog network members.

Figure 29:
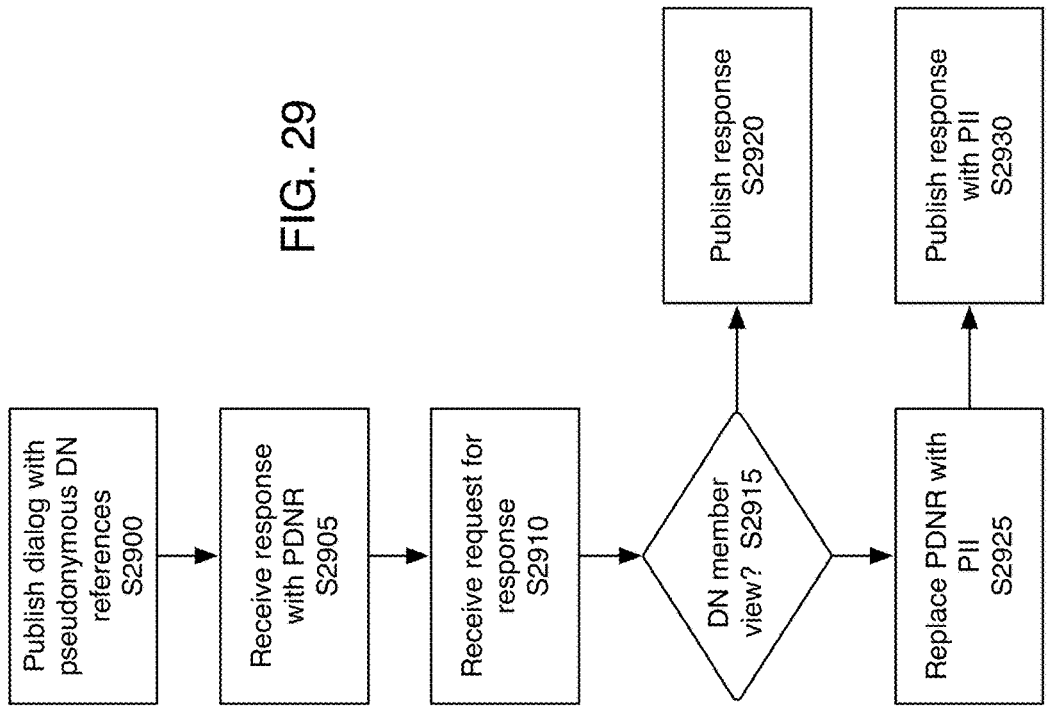
FIG. 29 is a process for reversing pseudonymous references to dialog network members in replies, when viewed by dialog network members.

FIG. 29 illustrates an exemplary process involving reverse anonymization of references to dialog network members by viewers of an anonymized dialog view. In step S2900, privacy enabling system 2310, implemented by server 100, publishes dialog content with pseudonymous references to dialog network members, replacing personally identifiable references to dialog network members with pseudonymous dialog network references ("PDNRs"), each PDNR being uniquely associated with a dialog network member at least within a given dialog. In step S2905, responsive dialog content is received by system 2310, containing one or more pseudonymous references to a dialog network member. In step S2910, system 2310 receives a request for dialog content that includes the response received in step S2905. A determination is made by system 2310 as to whether the request should be responded to with a dialog network member view, or an anonymized view (step S2915). If system 2310 determines to respond with an anonymized view, the requested content is published, including the response with references to system-generated monikers, substantially as received in step S2905. If system 2310 determines to respond with a dialog network member view, each PDNR is replaced with the dialog network member personally identifiable information for which the PDNR was previously substituted (step S2925). The resulting view of the response is then published (step S2930).

User Interface Mechanism for Conveying Variable Privacy Views

While above-described systems and methods may be effective in enabling variable privacy within communication platforms, in some environments, it may be important to ensure that users readily understand how content will be displayed to various viewers. Improving user understanding of how variable privacy features are applied may help promote user adoption and improve user satisfaction.

To that end, dialog rendering and user interface mechanisms may be provided to allow users to interactively toggle between public and private views of a given dialog. Such mechanisms permit users to readily appreciate how a public dialog view will be modified to preserve privacy, including how dialog participant pseudonyms and any redactions will be applied. Users can therefore confirm that no undesired information will be conveyed outside the dialog network, while also verifying whether the dialog substantive content is still comprehensible and unambiguous as conveyed in a public view.

Figures 32, 33:
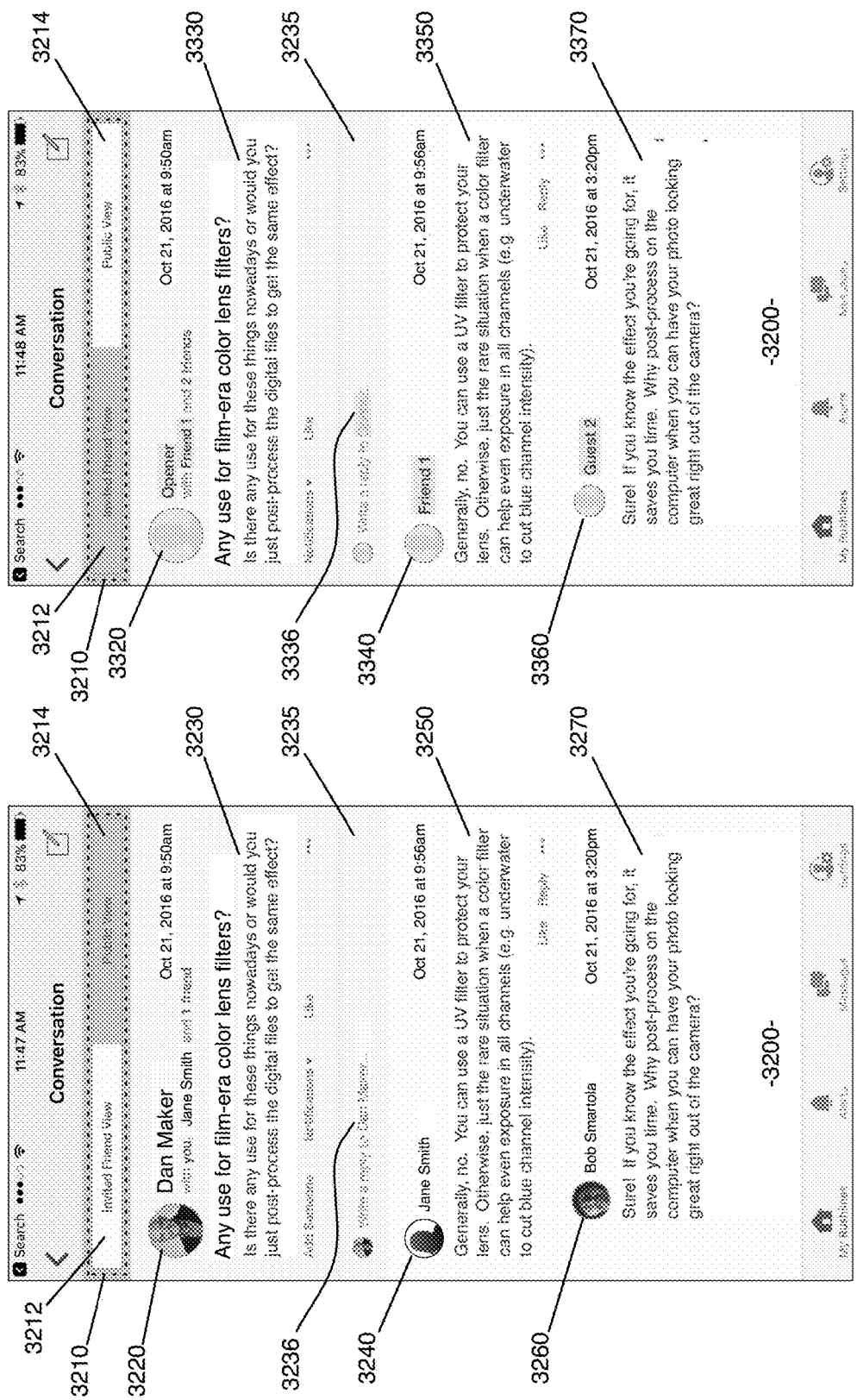
FIG. 32 is a user interface displaying a dialog private view.
FIG. 33 is a user interface displaying a dialog public view.

FIGS. 32 and 33 illustrate an exemplary embodiment of a user interface providing a dialog view toggle mechanism that may be rendered on a display of a personal electronic device, such as on smart phone 124 interacting with server 100, for a user that is a member of a dialog network for the dialog being viewed. Toggle 3210 enables a user to change the dialog view rendered in display area 3200 between an "Invited Friend View" (i.e. a private view that would be available for rendering only to members of a dialog network for the dialog being viewed) and a "Public View" (i.e. a view that would be available for rendering to individuals, regardless of whether they are dialog network members). The Invited Friend View is rendered upon selection of toggle region 3212, while the Public View is rendered upon selection of toggle region 2314. The Public View rendered upon selection of toggle region 3214 may, depending on dialog settings, be a public-private view, in which personally-identifying information associated with dialog network members is withheld, or a purely public view, in which dialog network member information is not withheld. While private, public-private and public concepts of variable privacy are discussed elsewhere herein, the user interface mechanisms of FIGS. 32 and 33 enable users to readily comprehend the privacy implications associated with a particular dialog.

In FIG. 32, toggle region 3212 has been selected, thereby rendering an "Invited Friend View" of an associated dialog within dialog display region 3200. The Invited Friend View includes opening dialog content 3230, rendered proximate indicium 3220 indicative of the individual who contributed dialog content 3230. Reply region 3235 can be selected to contribute a response to message 3230. Because FIG. 32 illustrates an Invited Friend View, reply region 3235 includes an explanatory reference 3236 indicative of the author of content to whom a reply would be directed. Dialog display region 3200 further includes other content contributions 3250 and 3270 within the dialog, proximate contributor-identifying indicia 3240 and 3260, respectively. Thus, dialog region 3200 provides a dialog view available only to dialog network members, which includes personally-identifying information associated with each content contribution.

In FIG. 33, toggle region 3214 has been selected, thereby rendering a "Public View" of an associated dialog within dialog display region 3200. The Public View includes dialog content items 3330, 3350 and 3370, each of which contains the same substantive content as Invited Friends View dialog content items 3230, 3250 and 3270, respectively. (In the example of FIG. 33, no content has been redacted by a user or automatically replaced by pseudonymous indicia, as described elsewhere herein.) However, personally-identifying dialog opener indicium 3220 (a system-generated identifier rather than user-originated substantive content) has been replaced with pseudonymous indicium 3320, thereby preserving the privacy of the opening user relative to viewers who are not members of the dialog network. Other system-generated personally-identifying dialog member references in the Invited Friends View of FIG. 32 are replaced similarly. For example, personally-identifying dialog contributor indicia 3240 and 3260 are replaced by pseudonymous contributor indicia 3340 and 3360, respectively. Personally-identifying reply region reference 3236 is replaced by pseudonymous reference 3336. In the embodiment of FIG. 33, information that is rendered differently between the Invited Friends and Public views is highlighted visually, such as by local application of a contrasting color background (e.g. yellow highlighting on a light neutral background).

In sum, the user interface illustrated in FIGS. 32 and 33 implements several features to readily convey to users, information concerning how private information will be viewed by various other users. The user interface provides a user with direct control over view rendering, such as via toggle 3210, so that the user can readily switch back and forth between various views and compare information rendering. Private information is replaced with anonymous or pseudonymous references, with the replacements being visually highlighted when rendering the Public View. These operations, individually and in combination, may be used to effectively convey a communication platform's privacy preserving measures to users.

Variable Privacy Using Privacy Attributes

In the context of social dialog or content sharing, there are a number of different ways that a participant's personal information may be conveyed. In addition to disclosures through system operation, such as publication of a user name or personal profile link proximate a particular content contribution and/or a dialog generally, users themselves may reveal private information about themselves or other users, intentionally or not, within an opening content contribution and/or during the course of a dialog. Therefore, in some embodiments, it may be desirable to provide users with mechanisms for fine control over variable privacy functions, which may be applied by various combinations of manual user actions and/or system-driven automation to manage disclosure of private content and information. Different embodiments may apply privacy-preserving operations to different types of information, such as one or more of: information that may directly identify a person as perceived by observers (e.g. name, username, image); information that may re-identify an individual when perceived by others in combination with other information (e.g. job title, employer); information that may be processed by a data analysis system to re-identify an individual; and any other information directly or indirectly associated with a user. Various embodiments may provide users with either, or both, knowledge of, and control over, how one or more of these types of information is disclosed to others. It may also be desirable to provide certain user with cues to facilitate user comprehension of variable privacy operation, thereby increasing user confidence in, and understanding of, how private content will be disclosed (or not disclosed) to others. Some such mechanisms are described hereinabove. Other embodiments of privacy-preserving mechanisms are described hereinbelow.

Figure 39:
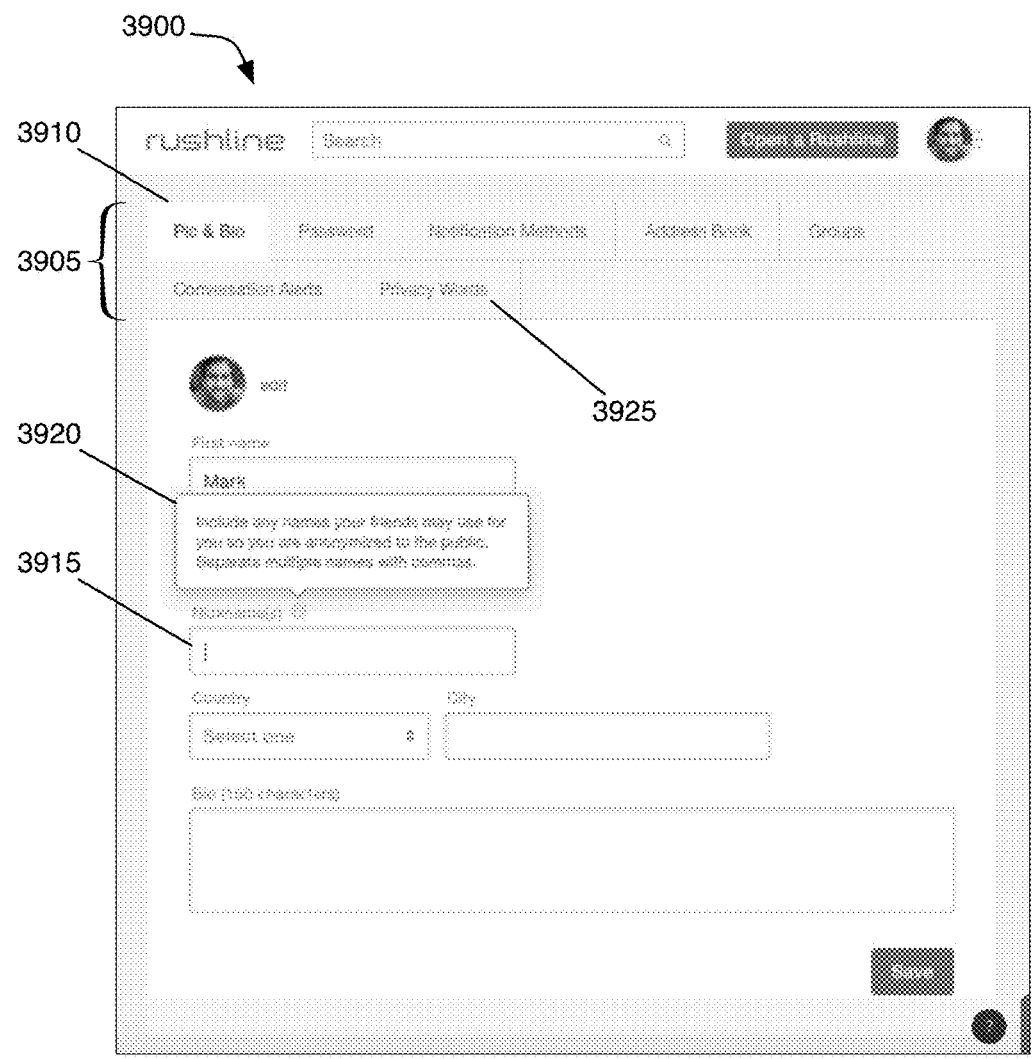
FIG. 39 is a user interface for configuring a profile with personal references for pseudonymous substitution.

One such embodiment is illustrated in FIG. 39 et seq. FIG. 39 is a user interface that may be rendered on user devices, in order for users to specify privacy attributes, such as may be stored in user profile 3000 (FIG. 30), and subsequently used (e.g. by a network-connected communication platform and/or local user device) in order to replace references to private user information with anonymized references. Anonymized references may include redaction indicators, pseudonymous content substitution, content obfuscation or other variable-privacy functions.

Figure 40:
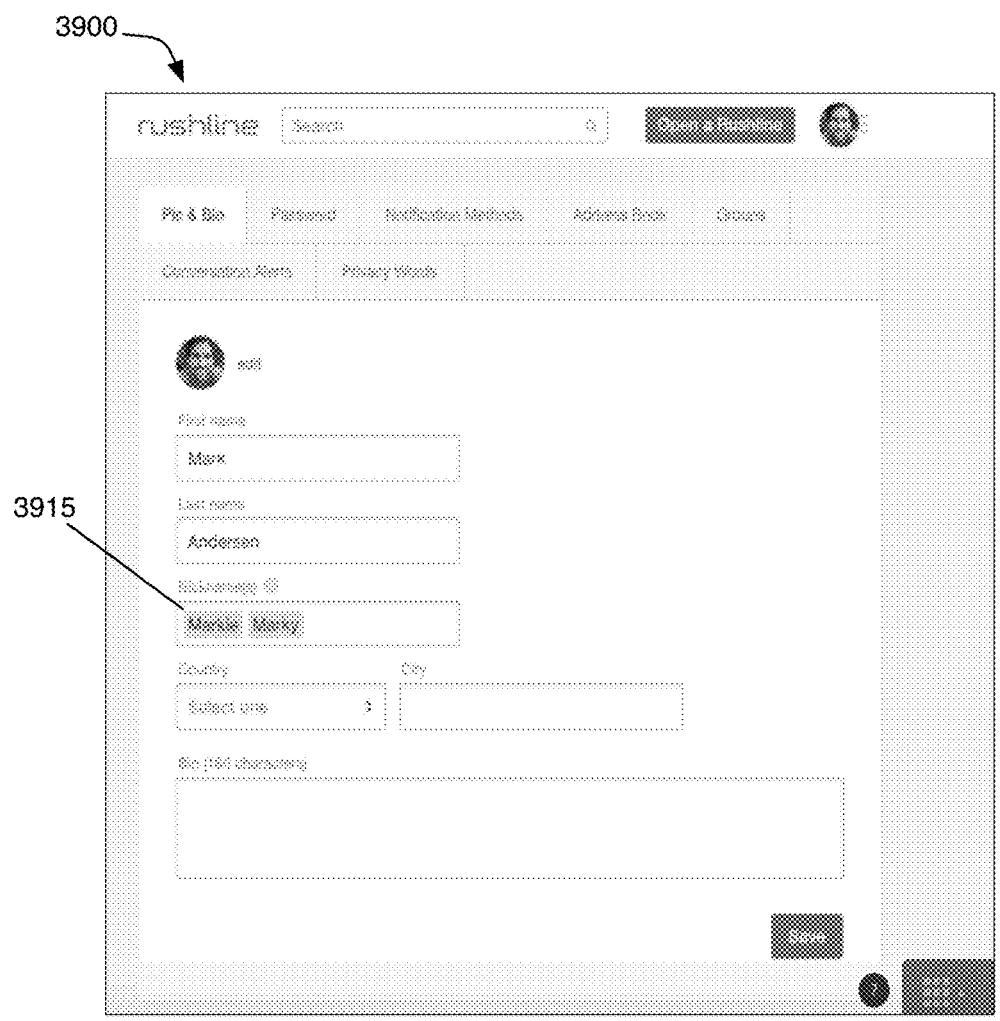
FIG. 40 is the user interface of FIG. 39, with personal references configured.

For example, for text-based content, a user may specify one or more nicknames. In applications facilitating social discourse, individuals may commonly refer to one another by nicknames, in lieu of an individual's full or proper name. Therefore, user profile mechanism 3900 includes multiple profile tabs 3905, including bio tab 3910. Bio tab 3910 includes text entry field 3915, which may be used by a user to specify nicknames by which the user may be referred, as privacy attributes for application of variable privacy functions. The illustrated user interface displays explanatory popover pane 3920 when, e.g., hovering over field 3915 and/or an associated tooltip icon. Content entered into nickname field 3915 on a user device (e.g. device 120, 122 or 124) may be transmitted to server 100 via network 110 and stored within database 104, and in particular, user profile record 3000. FIG. 40 illustrates user profile mechanism 3900, with exemplary content items "Markie" and "Marky" entered as nicknames for a user associated with profile 3900.

Nicknames associated with a dialog participant may subsequently be utilized by a dialog entry mechanism to automatically recognize dialog content references to a user's nickname. Recognized dialog references to private information such as nicknames may be then replaced with anonymous references, either automatically or upon prompting of the user.

Figure 41:
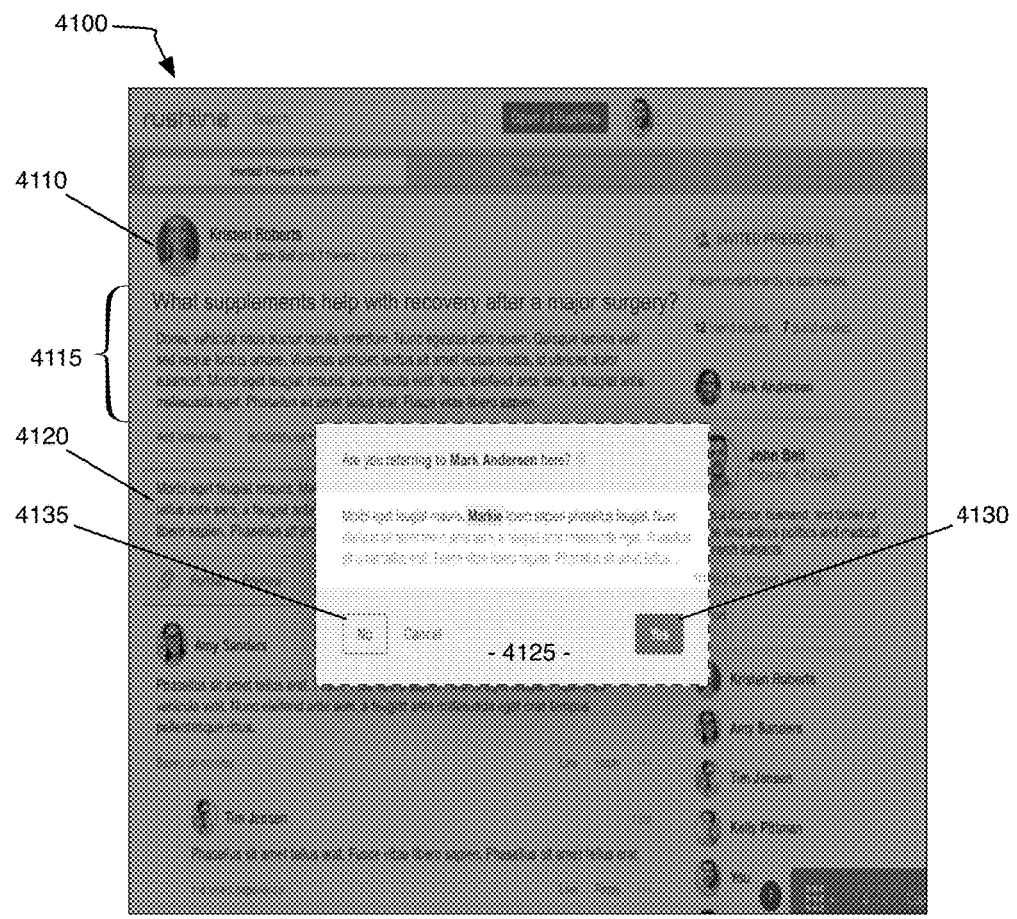
FIG. 41 is a user interface for submitting dialog contributions, with a user query regarding pseudonymous substitution.

FIG. 41 illustrates such a dialog entry mechanism, implemented as a web application with PC 120 interacting with server 100, including web server 106. Web page 4100 is rendered on PC 120 (e.g. within a web browser application) to facilitate a response to question 4110, asked by an opener designated by user indicium 4115. Text entry field 4120 can be used for entry of a dialog content contribution in response to question 4115. Upon selection of a SUBMIT indicium (not shown) proximate field 4120, content entered into field 4120 is transmitted by PC 120 to server 100. Application logic 102 compares the content of field 4120 with nicknames associated with user profiles of dialog network members (e.g. via entry into the profile form of FIG. 39). In the event that dialog contribution content matches a nickname associated with a dialog network member, the dialog entry mechanism of FIG. 41 prompts the user for clarification as to whether the matching text is referring to the dialog network member with whom the text is associated as a nickname. Specifically, server 100 transmits code causing PC 120 to render modal dialog box 4125 on web page 4100, extracting the relevant reference from the dialog contribution text and querying whether the reference is intended to refer to the dialog network member having specified an associated nickname. The dialog contributor can then select YES button 4130 or NO button 4135, which selection is conveyed to server 100 and utilized to determine whether to apply a variable privacy mechanism to the relevant reference, such as redaction or substitution with a pseudonymous indicium, as described elsewhere herein.

By requesting confirmation of the user reference, rather than automatically applying a redaction or substitution, the platform may avoid problems arising from words having multiple meanings. For example, a sentence beginning with the word "Mark" may be referring to a user having a first name of "Mark", or it may be a use of the English-language verb "mark". In the latter case, automated substitution of "Friend n" for the word "Mark" may render the dialog content confusing or meaningless. Even worse, such an erroneous substitution may actually serve to compromise user privacy, as the context of the sentence may make it clear that the verb "mark" was replaced with a "Friend n" reference, thereby indirectly revealing that one of the dialog network members is named "Mark". Thus, user confirmation of wording substitutions can be beneficial.

While the embodiment of FIG. 41 provides for identification of privacy words by a dialog content entry form upon submission of dialog content to server 100, it is contemplated and understood that in other embodiments, the timing of privacy word identification may differ. For example, in some embodiments, server 100 may accept and store dialog content as written, without marking privacy words; when later viewed, server 100 may identify privacy words and, depending on the identity of the viewer, replace privacy words with redaction indicators and/or pseudonymous substitutions automatically. In other embodiments, the dialog content entry form may operate to evaluate dialog content text entered in substantially real time, as the content is entered, to identify privacy words and flag them for redaction or substitution while a user is entering the dialog content (either automatically, or by prompting the user during text entry).

Once a portion of a dialog contribution is identified as a reference to a dialog network member, server 100 may designate the dialog portion, as stored in database 106, as PII eligible for substitution in variable privacy views of the dialog. Server 100 may then make available views of the dialog having variable privacy, based on factors described elsewhere herein (e.g. the identity of the viewer and their relationship to the dialog as a member or guest, or the platform from which the contribution is viewed). In public views, server 100 may render dialog content with pseudonymous substitutions in place of dialog network member names or nicknames. Thus, dialog network member names and nicknames may be replaced with pseudonymous indicia such as "Friend n", with n being a numeric reference that is incremented each time a different word sharing a common type is used in a given dialog. For example, all references in a dialog to a first dialog network member may be substituted with a pseudonymous indicium "Friend 1"; all references in a dialog to a second dialog network member may be substituted with a pseudonymous indicium "Friend 2"; all references in a dialog to a third dialog network member may be substituted with a pseudonymous indicium "Friend 3", et seq. The pseudonymous dialog member indicia are preferably applied consistently across a particular dialog, such that, e.g., references to a particular user will be consistently substituted with "Friend 1" each time that user is referenced in a particular dialog, regardless of the individual submitting the dialog contribution.

In embodiments involving social networking functionality, qualifying social network relationships may also be defined in order to apply pseudonymous substitutions and visual obfuscation to the content of a user contribution. For example, a communications platform having social networking functionality (or integrating with social network functionality of another system) may operate to identify and automatically apply pseudonymous substitutions to names of individuals having a qualifying relationship with the contributing user (e.g. all of the user's first-degree social network connections, or some subset of a user's social networking connections such as those assigned to a Family group or a Friends group). In various contexts and applications, social network relationships may be used in addition to or in lieu of dialog network membership or other criteria for identifying portions of content contributions to be removed from a public or untrusted content view.

One challenge to applying social networking relationships as criteria for anonymity, is that many social networking applications provide a large number of groups, forums or contexts within which a user may contribute content. A user may, for example, participate in a relatively obscure or limited-membership group that includes no other individuals with whom the user has a "friend" or other qualifying social networking relationship. In embodiments, it may be feasible for a user to prevent the automatic dissemination or notification of content contributions to the user's friends, e.g. by removing the post from the contributing user's personal content feed and directing the post to a forum having no qualified trusted users. In such cases, the user's qualifying social network relationships would have to manually locate the user's content contribution on their own. Thus, in this scenario, in a large social networking environment, it may be unlikely that a user's qualified social network relationships will ever see such content. The content may therefore be effectively published on a purely anonymous basis. Such anonymity may lead to lack of accountability and thus lower quality content. Therefore, for social networking applications, it may be desirable to restrict the application of anonymity functions such as content redactions to content contributions having some threshold level of exposure to trusted individuals (e.g. automatic notification to some minimum number of individuals within the contributor's trusted group), thereby maintaining some desired level of contributor accountability for posted content.

Figure 42:
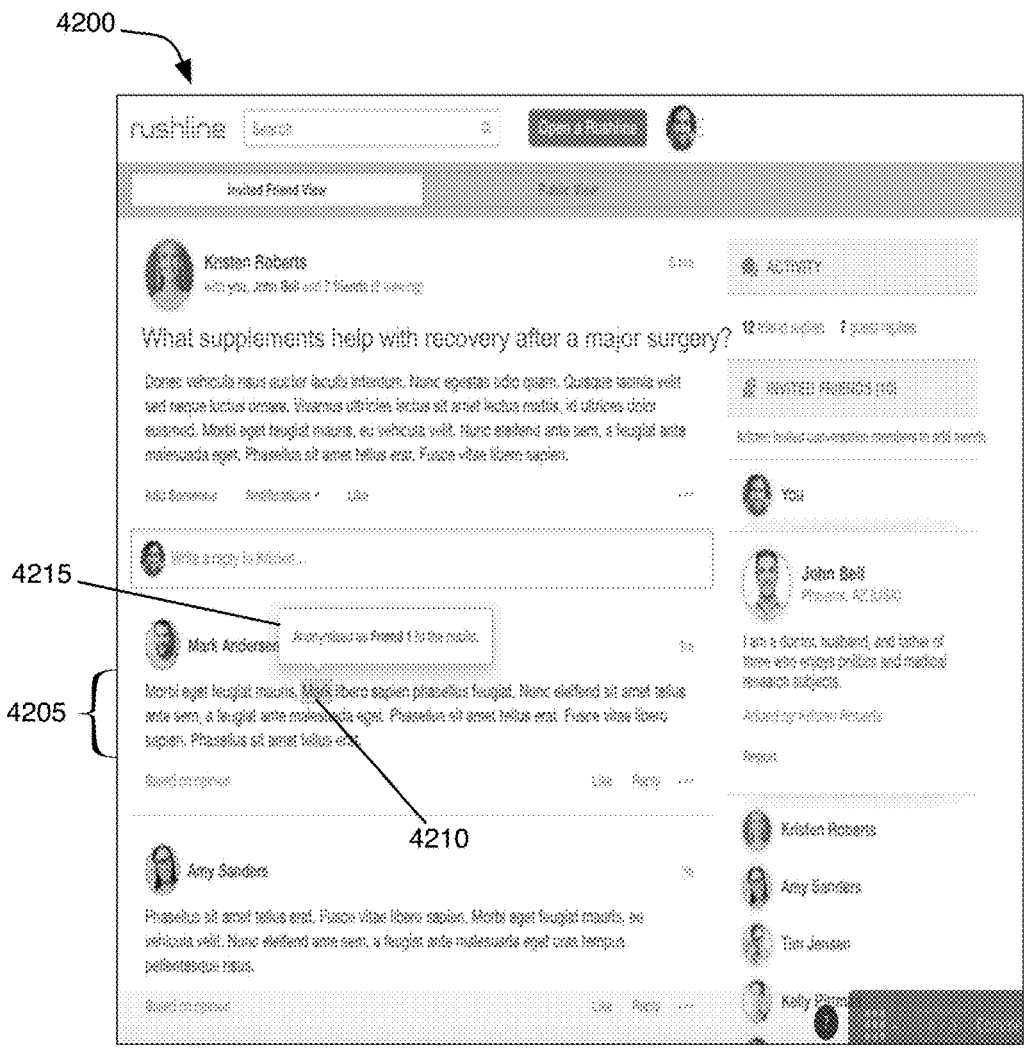
FIG. 42 is a user interface for dialog display with a user cue regarding variable privacy mechanisms.

In some embodiments, user interface cues may be provided in dialog network member views to clearly convey the nature of privacy substitutions or redactions made in public views. FIG. 42 illustrates a web application user interface implementing such a user cue. Web page 4200, rendered on PC 120, includes dialog content contribution 4205. Text content 4210 has been identified as a reference to a dialog network member, and therefore rendered as highlighted in a contrasting tone, thereby providing a first cue to a viewer that variable privacy treatment is applied to the highlighted text content. Additionally, popup pane 4215 provides further explanation of the variable privacy treatment applied to the associated text; in the embodiments of FIG. 42, popup pane 4215 indicates that the highlighted text "Mark" is being anonymized, i.e. replaced by the pseudonymous indicium "Friend 1" in renderings of dialog content 4205 that are made available to public viewers.

It may also be desirable to permit users to apply variable privacy treatment to dialog content contributed by themselves or others in dialogs for which they are dialog network members, even after the dialog content has been contributed to the dialog. Mechanisms for applying variable privacy treatment in this situation may help address, e.g., situations in which another dialog network member failed (inadvertently or not) to apply variable privacy treatment to a dialog network member reference, or where a user had not configured their profile to include privacy terms at the time a dialog contribution is submitted, or where a dialog member is added and the added member's profile includes privacy attributes appearing in the prior dialog content.

Figure 43:
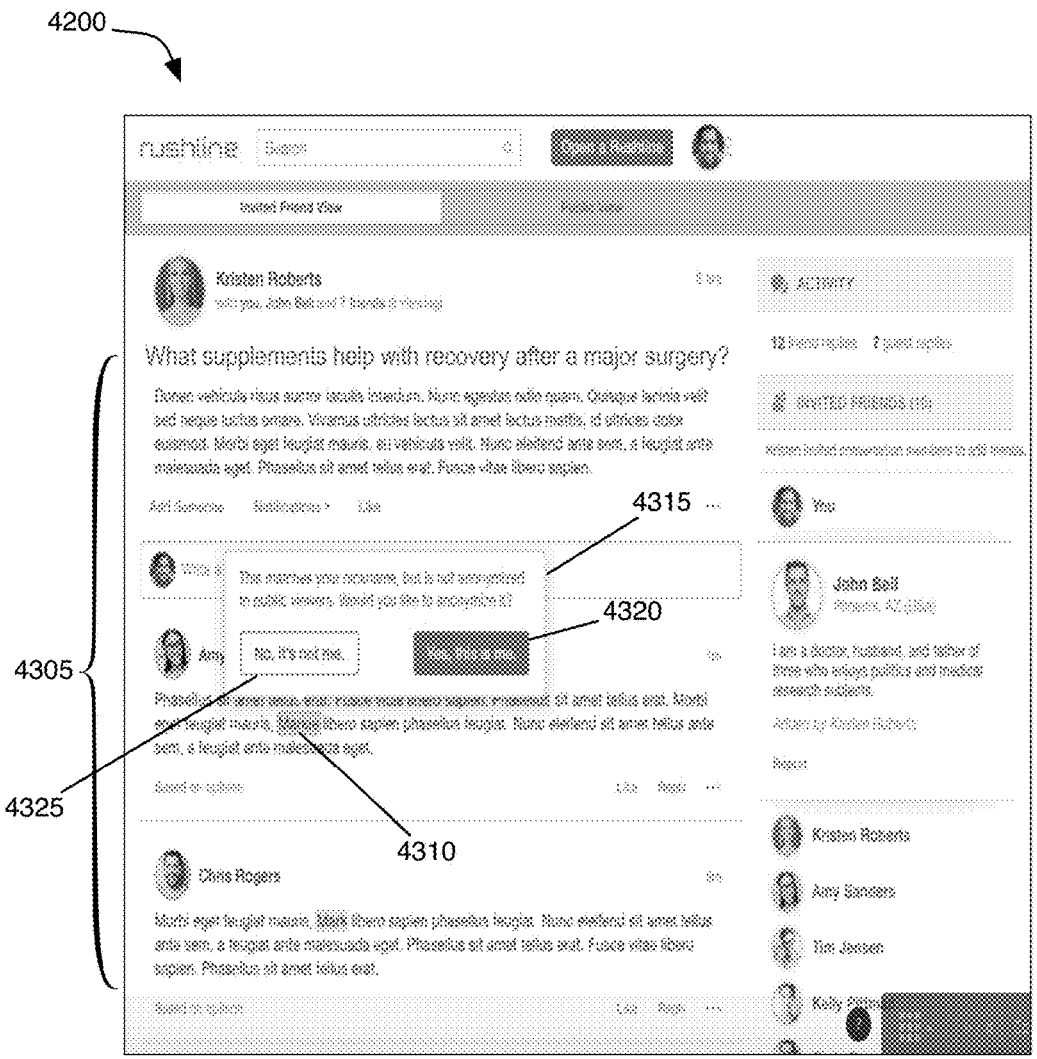
FIG. 43 is a user interface for dialog display with a user cue and query regarding pseudonymous substitution.

FIG. 43 illustrates an embodiment rendering a dialog to a dialog network member, incorporating proactive user cues to query for privacy status of content corresponding to terms associated with the viewer's profile. Web page 4300 is rendered by, e.g., PC 120, in response to a query to server 100 for display of dialog content 4305. Upon receiving the query for display of dialog content 4305, the text within dialog content 4305 is compared to privacy terms associated with the profile of the requesting user (e.g. name, nick names, employer, or other designated privacy terms). Upon identifying the presence of text content 4310 corresponding to the viewer's profile privacy terms but not previously identified as a privacy term, the corresponding content 4310 is rendered as highlighted in a contrasting tone, thereby drawing the viewer's attention to the content. Additionally, popup pane 4315 provides further explanation that content 4310 matches a privacy term associated with the viewing user, and queries whether the viewer would like to apply a variable privacy treatment to the content. The viewer may then select button 4320 to anonymize the content (e.g. replace the nickname with a pseudonymous "Friend n" reference in public views of the dialog content), or button 4325 to leave the text content unaltered in public views of the dialog content.

In addition to replacing nicknames with anonymous references, such as redaction references or pseudonymous indicators, other types of terms and other privacy attributes may be configured within profile 3000 for anonymization in variable privacy views. With the profile user interface of FIG. 39, users may select Privacy Words tab 3925 in order to render a user interface having one or more text entry fields in which a user may specify terms for classification as privacy words. Such terms are subsequently associated with the user and stored in user profile 3000.

Various types of privacy words may be specified. Like nick name field 3915, some privacy words may be associated with a reference type, such as company name, person name (spouse, child, etc.), email address, or phone number. Some privacy words may be useful for preserving privacy of individuals about whom discussion is made (e.g. a user's spouse or children), in addition to the user contributing content. Like nickname field 3915, privacy words associated with a specific reference type may then be anonymized in public views via a s that is indicative of the nature of the masked content, and applied consistently throughout a dialog rendering. For example, references to companies, such as a user's current or former employer, may be replaced in public dialog views with a "Company n" pseudonymous substitution. References to a person may be replaced with a "Person n" pseudonymous substitution, or if the person is a dialog network member, with a "Friend n" pseudonymous substitution. Therefore, when a user specifies a privacy word to be stored in connection with their profile, it may be desirable to query the user to categorize the privacy word (e.g. as a company, person, email address, phone number, or other), thereby enabling pseudonymous substitutions in content contribution views rendered to untrusted recipients.

Alternatively, in some circumstances it may be desirable to substitute privacy words with redaction indicators, which may or may not provide indicia of the type of reference redacted. For example, public views of a dialog containing a user's email address may be rendered with a pseudonymous substitution of "Email address n", a content-specific redaction indicator of "[EMAIL ADDRESS REMOVED]", or a content-neutral redaction indicator such as "[PRIVATE CONTENT REMOVED]".

Privacy words tab 3925 may also permit free text entry of terms that a user deems to be personally identifying information. Such terms can also be stored within profile 3000 (e.g. terms field 3015) and are typically substituted with content-neutral redaction indicators in public dialog views.

Figures 45A, 45B:
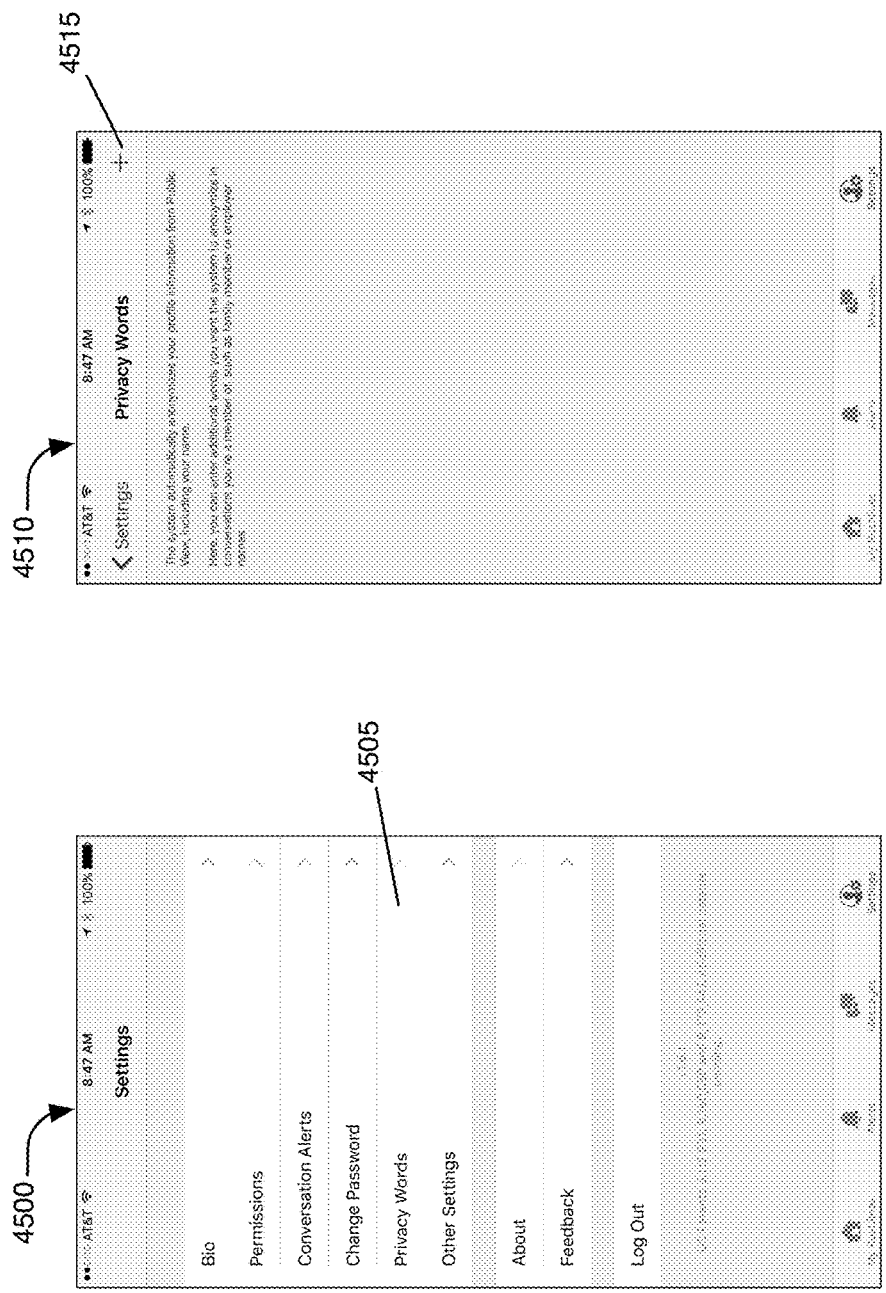
FIGS. 45A, 45B, 45C, and 45D are a sequence of mobile user interactions for specifying profile-associated privacy words.
Figures 45C, 45D:
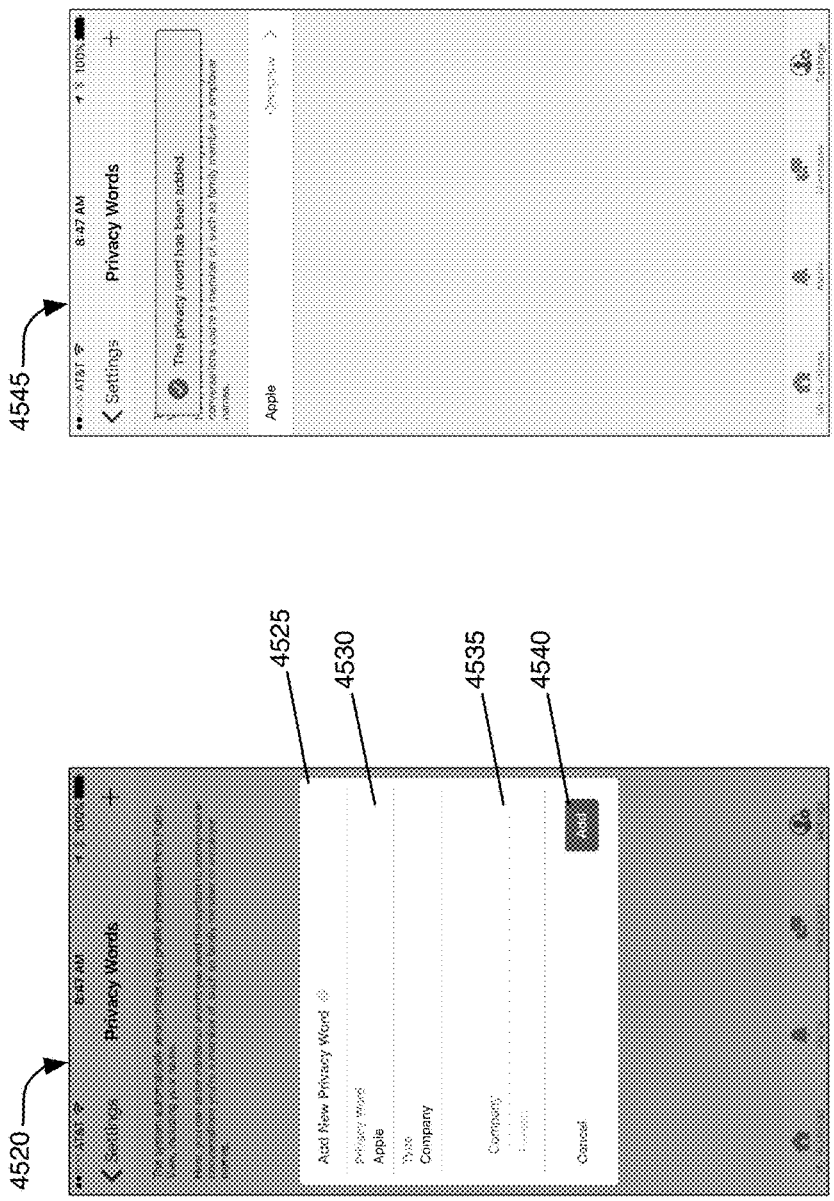

FIGS. 45A-D illustrate an exemplary embodiment of a sequence of user interactions for specifying profile-associated privacy words on a mobile device. FIG. 45A provides a mechanism 4500 to specify settings for a user's profile. "Privacy Words" option 4505 may be selected to access a privacy words control interface 4510 (FIG. 45B). Indicium 4515 may be selected to add a new privacy word, in response to which the user is provided with a privacy word entry mechanism 4520 (FIG. 45C). A modal 4525 is presented, via which a user may enter a privacy word in field 4530, and select a corresponding classification of the privacy word in picker field 4535. As described above, the classification specified in picker field 4535 may subsequently be utilized to identify a pseudonymous substitution for the privacy word in untrusted content views. Upon selection of commit button 4540, the user's privacy attributes stored within user profile 3000 are updated to reflect the added Privacy Word, with the updated Privacy Word List conveyed to the client via display 4545 (FIG. 45D).

As with nicknames defined in field 3915, dialog content contributions submitted by a user (e.g. via form 4100) to server 100 may be searched (e.g. operation of via application logic 102) for privacy words, or any other privacy attributes, defined in a profile 3000 associated with the content contributor, and optionally other dialog network members. In some embodiments, where communications are structured as a dialog amongst a defined set of dialog network members with a variable privacy view made available to individuals outside the dialog network, application logic 102 may operate to pool a set of privacy attributes from all dialog network members into an aggregate set of privacy attributes. The pooled set of privacy attributes may then be applied when dialog network members submit new content contributions, or query the system for content contributions, via various combinations of automatic and/or manual redaction, substitution or obfuscation.

Upon identification of potentially-applicable privacy attributes, such as privacy words, during a process of content contribution, modal dialogs such as modal 4125 may be rendered on the end user interface, to effect contributor confirmation of potential content anonymizations. Similarly, when a dialog network member views a dialog, a user interface may be rendered with anonymization queries for other types of privacy words defined in the viewer's profile 3000, analogous to the nick name query illustrated in FIG. 43.

While it may be desirable, in some circumstances, for users to exercise control over identification of personal content for removal from public views of a content contribution, in other circumstances, it may be desirable to allow for automated identification of personal content (or content deemed likely to be personal). Automated identification of content portions may be utilized to query a user for confirmation of the personal nature of the content portion, or it may be applied automatically to remove the identified content portions from public views without user interaction.

In some embodiments, automated content analysis mechanisms such as natural language processing and/or machine learning components may be applied to user contributions, in order to identify user content that should be subject to redaction, pseudonymous substitution, or other privacy-preserving treatment. For example, upon submission of a user content contribution containing text, application logic 102 may apply a natural language processing ("NLP") component to the submitted text. The NLP component may be, e.g., implemented directly by application logic 102 or implemented via call to an external network-connected service, such as the Google Cloud Natural Language API. The NLP component may then classify (e.g. by applying tags to) elements of the submitted text. The tags that may be utilized in the application of variable privacy treatment. NLP tags may include attributes such as identifying a text element as an organization, a location, a person, an event, a phone number, an address, or the like. In some embodiments, NLP tags may be used to automatically classify content as personal information and apply redactions or pseudonymous substitutions in variable privacy views to untrusted viewers. (E.g., automatically replace telephone numbers with "[PHONE NUMBER]".) In some embodiments, NLP tags may be used to select portions of text for which the user should be queried about privacy attributes (similarly to the query UI of FIG. 43). If the user responds positively to applying variable privacy treatment to a text element flagged based on its NLP tags, that text element may be automatically added to the user's profile privacy words, or the user may be further queried as to whether the text element should be added as a profile privacy word. User decisions on automated content classifications may also be utilized as feedback to automated content classification mechanisms incorporating supervised machine learning components.

Automated content analysis and privacy classification mechanisms may additionally or alternatively be applied to substantive content at various other times throughout the process of creating and viewing a content contribution. For example, in some embodiments, dialog contribution text entered into field 4120 may be compared to privacy words pertinent to the dialog in real-time or quasi-real time, as the text is entered, with dialog-pertinent privacy words being highlighted with a contrasting tone or appearance to notify the dialog contributor that a word is or may be a privacy word. The highlighted word may then be clicked, hovered-over or otherwise selected to initiate a confirmation dialog or modal, such as query 4125 and 4315.

As with nick names, it may be important to permit user confirmation of privacy treatment for other types of privacy words in a dialog content contribution. For example, a dialog may involve individuals having "Microsoft" as their employer, but may also refer generically for popular products such as Microsoft Word or Microsoft Windows. Enabling users to apply variable privacy treatment to individually-associated Microsoft references, without redacting all references to popular Microsoft products, permits dialog members to achieve privacy preservation objectives without significantly sacrificing dialog comprehension from public views.

Insofar as privacy words are user-configurable and/or personalized for a user, it may be desirable to permit users to delete privacy words from their profile 3000, and/or whitelist terms that are identified as being subject to variable privacy treatment via automated mechanisms. Preferably, once server 100 categorizes a portion of dialog content as a privacy word, the privacy word designation will be stored with the dialog content and be applied to various views of that content unless and until a specific variable privacy designation is modified by a permitted user. Therefore, deletion of a variable privacy word from a user's profile 3000 would not retroactively remove variable privacy treatment from previously-submitted dialog content corresponding to the deleted privacy word. This ensures that dialog members' understanding of the scope of dissemination for a particular portion of dialog is preserved despite subsequent profile changes.

With application of multiple types of pseudonymous substitutions, it may be desirable for server 100 to implement additional reverse anonymization mechanisms, analogous to reverse anonymization of dialog network member references described above, but applied to one or more other types of pseudonymous substitutions. For example, references to multiple employers of dialog network members may be presented in a public view of the dialog as pseudonymous references to "Company 1", "Company 2", etc. A guest user, accessing a public dialog view via a user device such as PC 120, tablet 122 or smart phone 124, may submit a content contribution in which the guest user includes one or more of the pseudonymous references, such as Company 1 or Company 2, within the guest dialog contribution's substantive content. Upon receipt of the guest contribution, server 100 may search the contribution for content matching pseudonymous references associated with the dialog. Server 100 may then mark the content, as stored in database 106, with correlations between pseudonymous references and their associate private content. When the dialog is subsequently rendered to dialog network members, pseudonymous references in the guest content contributions may be reversed, with the actual, private content items being displayed. For example, a guest reference to "Company 1" may be reversed for dialog network members, so that in the private dialog view, the pseudonymous reference is replaced with its associated dialog network member employer name.

In order to allay any dialog network member concerns about confidentiality of private information, the display of reversed pseudonymous references in a private dialog view may be accompanied by highlighting or other visual cues, as well as messages to a view (such as upon selection or hover-over) indicating the nature of the reversed reference. For example, a popover message explaining reverse anonymization of a dialog network member name may indicate, "The guest saw <Invited Friend First Name> as 'Friend 3'. The system is showing you <Invited Friend First Name>'s name for your readability, as an invited friend of the conversation." Likewise, a popover message explaining reverse anonymization of a dialog network member affiliated company may indicate, "The guest saw <Company Name> as 'Company 1'. The system is showing you <Company Name> for your readability, as an invited friend of the conversation."

It may also be desirable to implement a reverse anonymization mechanism for dialog references to guest users. For example, a conversation member may wish to reply to a dialog content contribution from a guest user displayed as "Guest 3". Accordingly, the dialog member contribution may include a responsive reference to "Guest 3". Upon submission of a dialog content contribution to server 100, application logic 102 may operate to search the dialog content contribution for pseudonymous references to guest users, and mark any such references discovered with an association to the corresponding guest user's account. The associated dialog content may then be variably displayed as the guest user pseudonymous reference (e.g. "Guest 3") or a direct user reference (e.g. the guest user's first name, or an appropriate pronoun), depending on the identity of the individual for whom the dialog is subsequently rendered. For example, when server 100 publishes a dialog view to a guest user mentioned by another user as a pseudonymous reference, the guest user's dialog view may include a personal reference, such as "Guest 3 (You)" in both the body of messages, as well as the byline of that user's posts. The personal reference may be displayed as highlighted or with another visual cue to notify the viewer that a variable privacy mechanism has been applied. Upon selecting or hovering over the personal reference, a further explanatory message may be displayed (e.g. via popover message box), such as "<Opener or Friend n> saw you as 'Guest 3'. The system is showing 'You' here for your readability."

The same principals and mechanisms applied to text content in embodiments of, e.g., FIGS. 49-43, may also be applied to content contributions in which the substantive content consists of or contains images, such as photos, video, and scanned documents. In embodiments permitting image-based content contributions, privacy attributes that may be subject to variable privacy views may include characteristics of image content. Image substantive content may be characterized for privacy treatment in a variety of ways. For example, application logic 102 may apply an image classification component to image-based content contributions. Such an image classification component could be implemented directly by application logic 102 or via call to an image classification service implemented externally to server 100, such as the Google Cloud Vision API. In either case, image classification may yield attributes that can be used to control variable privacy treatment. For example, in some embodiments, image classification may include an evaluation for the presence of human faces. If human faces are deemed present in the image, variable privacy treatment may be triggered.

Variable privacy treatments that may be triggered based on image classification and analysis include, without limitation: (a) prompting the user to manually evaluate and redact any image having certain attributes (e.g. the presence of human faces, the presence of text, the presence of text that yields user privacy terms upon processing by an optical character recognition module); or (b) automatically redacting image areas associated with predetermined types of content (e.g. human faces, text). In yet other embodiments, it may be desirable to query users for redactions to every image submitted, rather than relying on automated image classification.

In some embodiments, a privacy-enabling system may integrate with a user-specific image analysis profile to facilitate greater automation of image redaction for privacy. For example, some users may utilize photo storage services that can be trained to recognize individuals commonly appearing in the user's photos. Examples of such systems include Google Photos and Apple Photos, in which common faces within a library of photos associated with a user are grouped and presented to the user for labeling. Such systems may utilize such image recognition capabilities for search and classification. However, the same facial recognition and image analysis functions may be applied to automate application of privacy-preserving functions, such as redaction via graphic overlay or application of a blur filter, within a communication platform. Such image recognition and classification services may permit users to specify profile-specific image attributes for redactions (such as faces of specific individuals or classes of individuals, e.g. family members), analogous to profile-based nickname specification in the embodiment of FIG. 40. In various embodiments, a communications platform may integrate with a third party photo library for access to training images, or a user may upload image content (e.g. photos of family members, friends and/or other things with which the user may be personally associated) directly to the communications platform for training and analysis.

Figure 44:
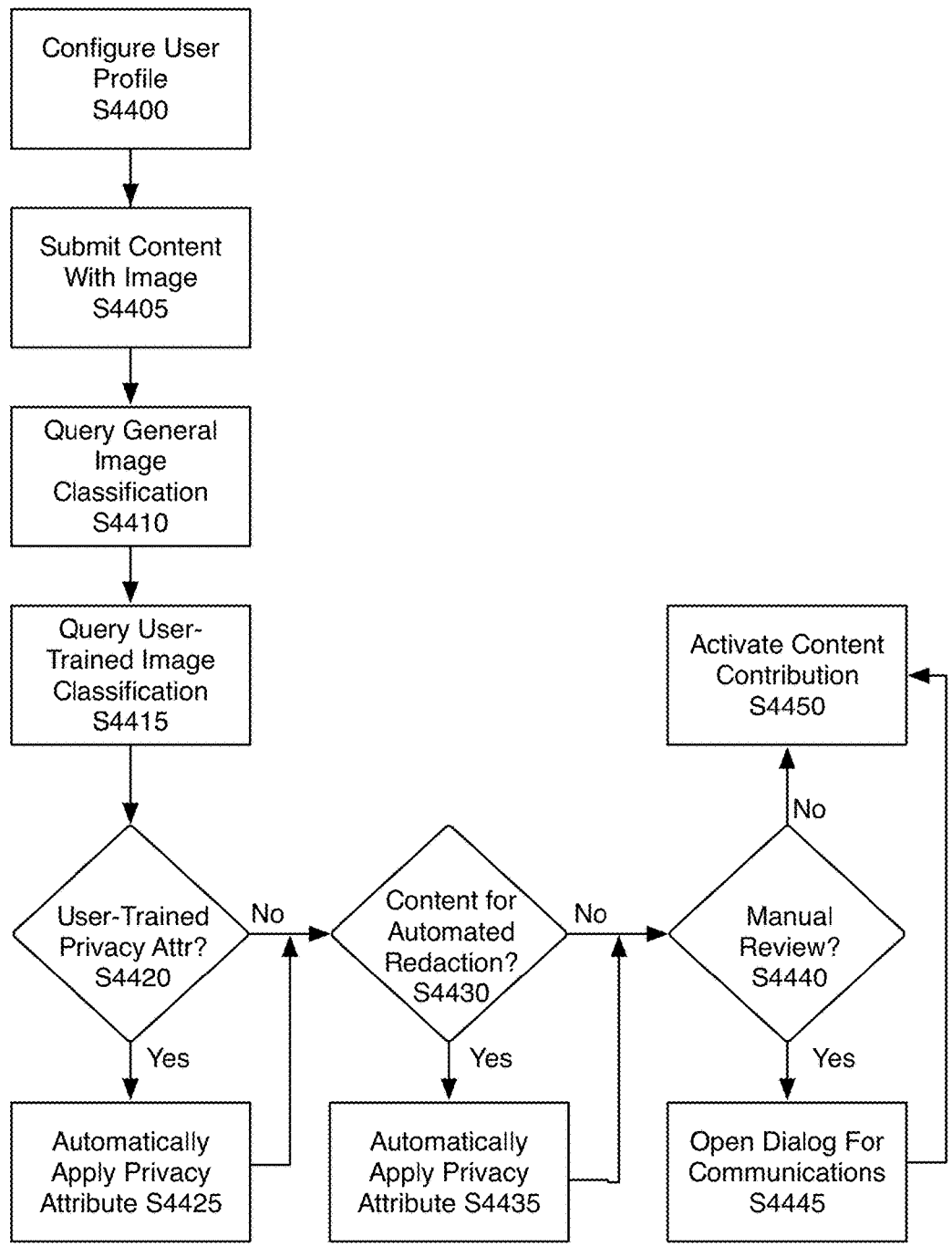
FIG. 44 is a process for applying privacy attributes to determine variable privacy views of a content contribution via combinations of user-specified attributes, automated redactions and/or manual review.

FIG. 44 illustrates an exemplary process that may be used for applying a variable-privacy function to an image-containing content contribution within an online social media or communication platform. In step S4400, a user configures profile settings that may include one or more of (a) general image classifications for which the user would like to be queried for manual privacy designation (e.g. "people", "houses", "children"); (b) image general content types for which the user desires automated application of privacy designations (e.g. "human faces", "text", "mailing addresses"); and (c) specification of user-specific image tags for a classification mechanism trained by the user (e.g. "Mom", "Uncle Bob", "Spouse", "Children"). In step S4405, a user submits a content contribution that includes an image, to server 100. In step S4410, server 100 queries a general image classification API (such as the Google Cloud Vision API) for analysis of the image content in the user's content contribution. In step S4415, server 100 queries a user-trained image classification API for identification of user-tagged image content. (The image classification mechanism of step S4415 may be the same as the general classification mechanism of step S4410, or a different one.) In step S4420, server 100 (i.e. application logic 102) determines whether any areas of the submitted image content correspond to user tags designated as privacy attributes in step S4400. If so, privacy attributes are automatically applied to corresponding portions of the image (step S4425) (e.g., portions of the submitted image corresponding to people configured for privacy in the user's profile, are flagged for application of a variable privacy blurring or other obfuscation function when the image is rendered to individuals outside of a dialog network, or otherwise untrusted relative to the specific content contribution). In step S4430, server 100 compares query results from step S4410 with content types configured for automated privacy treatment in the user's profile. If such content is present, in step S4435, application logic 102 automatically applies privacy attributes to corresponding portions of image content (e.g. automated blurring of all human faces). In step S4440, application logic 102 determines whether to query the user for manual review of how privacy attributes are applied to the submitted image. If so, the user is provided with a preview of the image, with designations of how privacy attributes will be applied to untrusted viewers, and tools to add, remove or modify privacy attributes (step S4445). In some embodiments, it may be desirable to flag every image for manual review (either as a system rule, or as a user-configurable preference). In some embodiments, images may be flagged for manual review based on analysis of image content, such as image classifications derived in step S4410 and/or S4415. In step S4450, the image-containing content contribution is activated within the host system (e.g. is published on a social media platform, communicated to members of an associated dialog, and/or made available for privacy-enabled public viewing).

In some embodiments, privacy-preserving functions described above with respect to image content generally, may be applied using mechanisms particularly well-suited to video-based user content contributions. For example, video content analysis mechanisms (such as Google Cloud Video Intelligence, automated face blurring algorithms, filters applying graphic overlays on predetermined or dynamically determined portions of video content, and/or other systems for video analysis, classification and modification) may be applied to user content contributions containing video. In some embodiments, image content analysis mechanisms described herein for use with image content (e.g. facial recognition components for identifying family members in photos), may also be applied to video content, such as by periodic application of image content analysis mechanisms to frames within video content. Privacy attributes may then be applied to video contributions automatically, and/or manually specified, thereby enabling application of analogous variable privacy views of content, regardless of whether the content contains text, image, video or various combinations thereof.

For all types of content contributions, machine learning and personalization components may be beneficially applied to improve the precision and accuracy of automated privacy classification. For example, criteria described elsewhere herein as useful for automated privacy classification, may be applied as inputs to a supervised learning classification algorithm, potentially in combination with other attributes related to the content contribution and/or any dialog containing it, and personalized across an individual user, a dialog group, a cohort of users, or all users. User decisions on whether to apply or overturn an automated privacy classification may be utilized as feedback to the supervised learning algorithm. Thus, for example, if a user typically applies a blur effect to untrusted views of human faces in image content, but the user repeatedly elects not to apply a blur effect to images having numerous faces in a crowd, the system may learn to weight the face image portion size heavily, such that it forgoes variable privacy treatment of human faces when they fall below a threshold size.

By allowing users to configure and apply content anonymization tools, such as redactions, pseudonymous substitutions and other obfuscations, using various combinations of manual and automated mechanisms, a communication platform can facilitate a common dialog or content exchange that can be rendered in multiple views with varying privacy restrictions, while still being both easily understandable and unburdensome for dialog participants or other trusted viewers.

Determining Dialog View Using Social Relationships

Many embodiments described hereinabove utilize a viewer's status as an invited dialog network member to determine which of multiple views are applied when rendering a dialog. However, in other embodiments, variable privacy views of a dialog may be determined by other factors. For example, trusted viewers who see a "Friend View" (such as that of FIG. 32) and untrusted viewers who see a "Public View" (such as that of FIG. 33) may be determined by factors such as social relationships, such as mutual address book connections or social networking connections between the content contributor and viewer, rather than (or in addition to) conversation groups associated with each conversation. Such variable privacy mechanisms may be particularly useful, for example, so that content contributors can control dissemination of private information by applying variable privacy functions in embodiments for which opening content contributions are not directed to an explicit group of target responders, but rather are made generally available to a universe of individuals having varying relationships with the content contributor. Examples of environments in which social relationships may be useful in applying a variety of variable privacy mechanisms include, without limitation, social networking platforms, messaging platforms, online forums or other online communities.

Users of a computer-implemented communication platform may develop social relationships with one another in various ways. For example, traditional two-way social networking connections may be established between users, in which each user must consent to establishment of a connection. In other embodiments, one-way social networking connections may established between users, such as a "follow" relationship in which a user may connect with another user unilaterally.

Yet another mechanism for establishing and maintaining social connections between users of a communication platform is an address book analog. In some embodiments, each user may maintain an "address book" with a listing of other individuals with whom the user desires to have a social connection. The address book listing need not include individuals' personal contact information directly, but rather may include system-specific user IDs, or system-specific links to other users' accounts.

Figure 34:
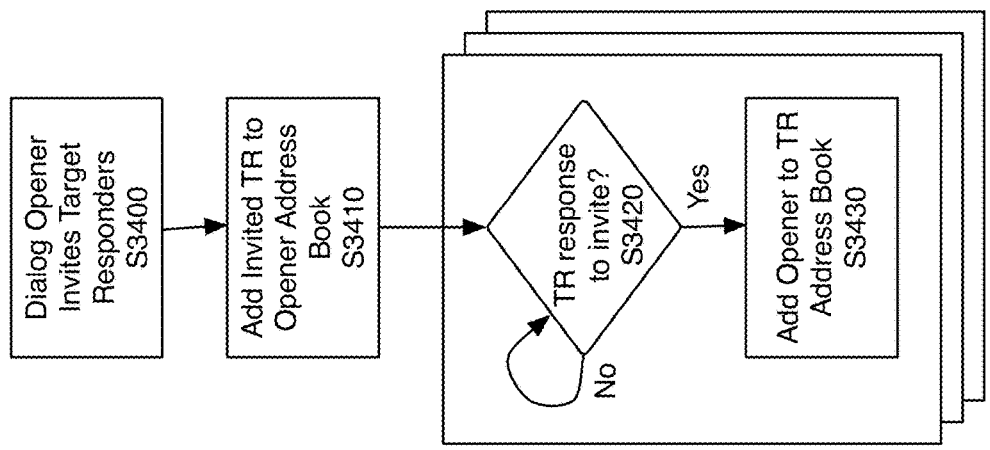
FIG. 34 is a process for establishing social connections amongst communication system users.

User connections maintained with such a user address book may be established in a number of different ways. In some embodiments, connections may be established implicitly by identifying an individual as a target responder in a dialog. FIG. 34 illustrates such a process for establishing social connections amongst communication system users. In step S3400, an opener initiates a dialog and invites one or more target responders, as described elsewhere herein. In step S3410, invited target responders are automatically added to the opening user's address book by the communication system, if they are not already included therein. In step S3420, for each target responder, the communication system determines whether a target responder has acknowledged the dialog (e.g., clicked on a link within a notification message directed to the target responder, or otherwise viewed the dialog). If not, the system awaits acknowledgement. If so, the opening user is added to the address book of the responding target responder (step S3430).

Figure 35:
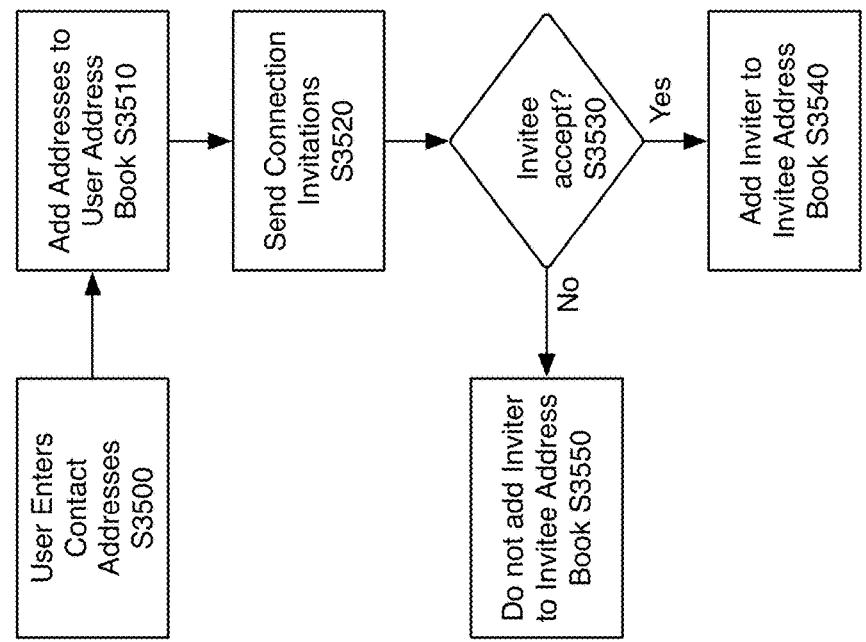
FIG. 35 is a process for establishing social connections amongst communication system users.

An explicit invitation mechanism may also be used for establishing social relationships between individuals, separate and apart from a particular dialog. FIG. 35 illustrates an exemplary embodiment. Users having one or more electronic contact addresses for other individuals may enter or select them using, e.g., a user device 120, 122 or 124 interacting with server 100 via network 110 (step S3500). In step S3510, server 100 adds the addresses entered in step S3500 to an address book associated with the user, and stored within database 104. In step S3520, server 100 transmits connection invitations to contact addresses specified in step S3500, e.g. via transmission of email, SMS or app notifications from messaging server 108. In step S3530, server 100 evaluates whether connection invitation recipients have accepted the connection invitations sent in step S3520. If so, the invitation sender is added to an address book associated with the accepting invitation recipient (step S3540). If not, the invitation sender is not added to an address book associated with the invitation recipient (step S3550).

In some embodiments, individuals may also be able to establish social connections with other individuals that they meet in conversation, e.g. via user interface mechanisms provided directly from a dialog view. It is in viewing other peoples' contributions to dialogs that users may identify individuals with whom they would like to have further interactions. For example, users may observe others providing content that appears interesting or of high value. Thus, it may be beneficial to allow such users to connect with others directly from a view of such content contributions. For example, in some embodiments, a user viewing the dialog view of FIG. 33 may select a user indicia 3320, 3340 or 3360, in order to initiate a connection request to the associated individual. Such a connection request may be implemented similarly to steps S3510 to S3550 in FIG. 35.

In some embodiments, a user may wish to offer up approval for another individual to open conversations with them by, for example, clicking a link on the other individual's profile or user indicium within a conversation. There is no need for the other individual to reciprocate, but if they want to, they can offer their contact info (or a figurative social connection) in exchange. This might happen where someone is highly impressed with someone else in a conversation and would be happy to consult with them in the future, even though that other person might be a e.g. an important figure or influencer who is very guarded about who they share their info with to avoid getting overrun by conversation requests.

Conversational variable privacy may also be controlled by social connections established using diverse systems, such as social networking connections, whether implemented locally by server 100 or established via a separate social networking system (e.g. social network 2540 in FIG. 25). Server 100 may access social graphs maintained by users of server 100, in associated accounts on social network 2540, for purposes of determining whether users of the communication system implemented by server 100 have social connections with one another.

Social connections established via mechanisms such as those described above, may then be utilized in order to control dialog view. Rather than limiting private views only to individuals invited to participate in a particular dialog, the private view may be made available to anyone viewing a conversation with a trusted relationship to the content contributor and/or dialog network members, such as anyone who has a social connection with the author of a post or content contribution within the conversation. If a viewer is not connected with such a content contributor in a particular conversation, that conversation is rendered with an untrusted public view, having certain personal information removed, as described elsewhere hereinabove.

Figure 36:
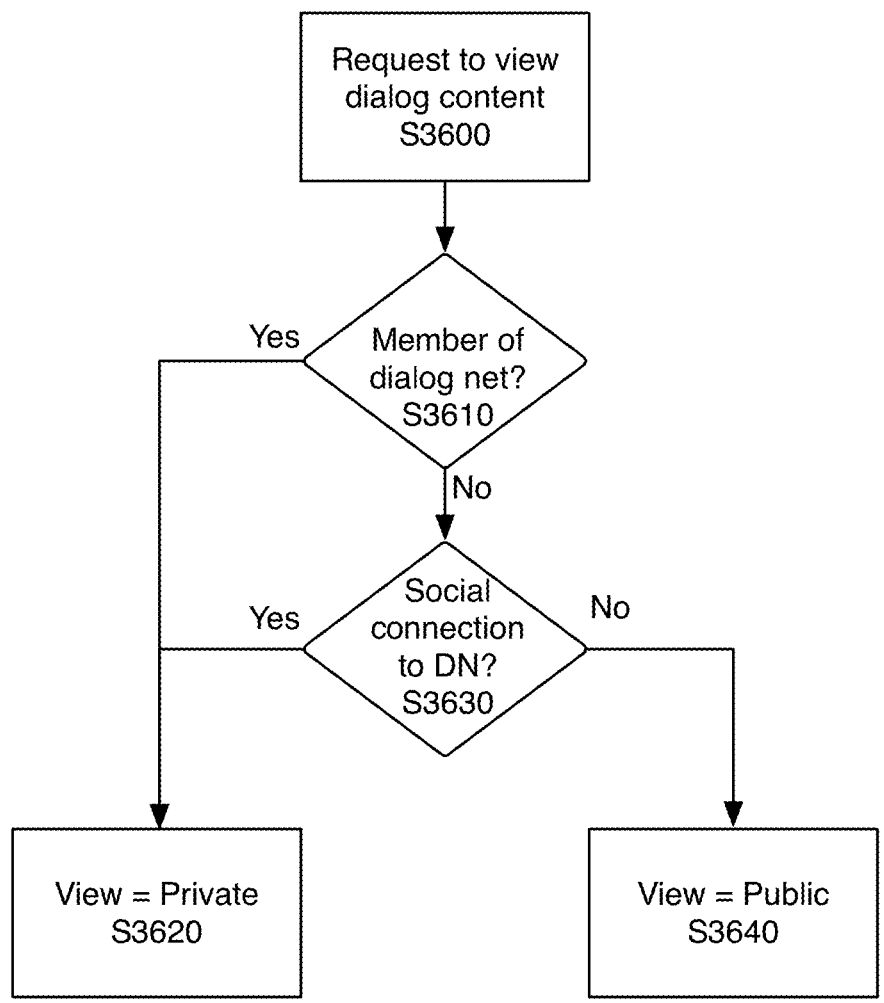
FIG. 36 is a process for determining application of variable privacy to a dialog based on dialog network membership as well as social connections.

FIG. 36 illustrates a process for determining a dialog view to be rendered to a content viewer, based on both the viewer's status as an invited dialog participant, as well as the viewer's social connections with dialog participants. In step S3600, server 100 receives a request to view dialog content. In step S3610, server 100 determines whether the requester is a member of the dialog network for the requested dialog. If so, server 100 responds with a private view of the dialog, including identifying information associated with dialog contributors (step S3620). If not, server 100 determines whether the requester has a social connection with one or more users who are dialog contributors (step S3630). If so, server 100 responds with a private view of the dialog, including identifying information associated with dialog contributors (step S3620). If not, server 100 responds by sending a public dialog view, which excludes personally identifying information associated with dialog contributors (step S3640).

Various criteria may be utilized in step S3630 for determining whether a user requesting a dialog view has a qualifying social connection with dialog contributors. In some embodiments, in which users develop and maintain address books as described above, a social connection may be deemed to satisfy the determination of step S3630 if the dialog viewer is within the address book of any dialog content contributor (i.e. a one-way social connection criteria). In some embodiments, a social connection may be deemed to satisfy the determination of step S3630 only if the dialog viewer is within the address book of a dialog content contributor, and the dialog content contributor is within the address book of the dialog viewer (i.e. a two-way social connection criteria). In some embodiments, the social connection evaluation of step S3630 may be performed based on a viewer's connection with any dialog target responder, regardless of whether the target responder has contributed content to the dialog. In some embodiments, in which social connections are automatically established when individuals are invited to participate in a common dialog, step S3610 may be eliminated from the process of FIG. 36, as the social connection test of step S3630 will inherently provide private dialog views to all dialog network members. These and other variations and social connection criteria may be utilized to control dialog view and implementation of variable privacy.

Such determinations of user trust via social relationship may also be applied to implement privacy words within the substance of a content contribution, during content submission and/or upon content rendering. For example, operations are described above in which privacy words or other privacy attributes are pooled from dialog network members, with an aggregate set of privacy attributes applied to a content contribution for automatic privacy treatment of responsive content components (e.g. automatic contributor pseudonymous substitutions 3320, 3340 and 3360 in FIG. 33), and/or for prompting users to consider whether content should be subject to variable privacy treatment (e.g. content submission prompt of FIG. 41, or a post-submission prompt of FIG. 43). In embodiments for which trusted dialog view status is determined by social relationship (in whole or in part), it may be desirable to extend the pooling of privacy attributes, for a given content contribution or for an entire dialog, to include privacy attributes of all individuals having a trusted relationship to the content. Thus, privacy words and other privacy attributes associated with all users to whom a trusted (e.g. unredacted) view of the content may be made available (potentially including, without limitation, dialog network members and/or individuals having a predetermined social networking relationship to the content contributor), may be pooled and applied to a particular content contribution.

One potential limitation of providing anonymity to individuals outside a user's social network connections, is that there are some use cases for which the impact of real-name accountability within one's social network may be ineffective—particularly for broad-based social networking sites having a wide diversity of content and contributors. For example, a user may seek to participate in a group or online dialog in which none of the participants have a social networking relationship with the user. Allowing such a user to elect variable privacy based on social networking status, would effectively provide that user with complete anonymity, potentially facilitating the types of trolling and other low quality content contributions that plague anonymous and pseudonymous online communication and social networking platforms. (To the extent that a user's content contributions are automatically posted to a user-specific content feed, the user could defeat any attribution by social networking connections by simply deleting a particular content contribution from their own feed.) Therefore, when applying variable privacy functions described herein using social relationship in determining anonymity, it may be desirable to enable a user to elect variable privacy treatment only if a threshold number of dialog participants will be provided with a trusted view containing the user's personally-identifiable information.

Figure 46:
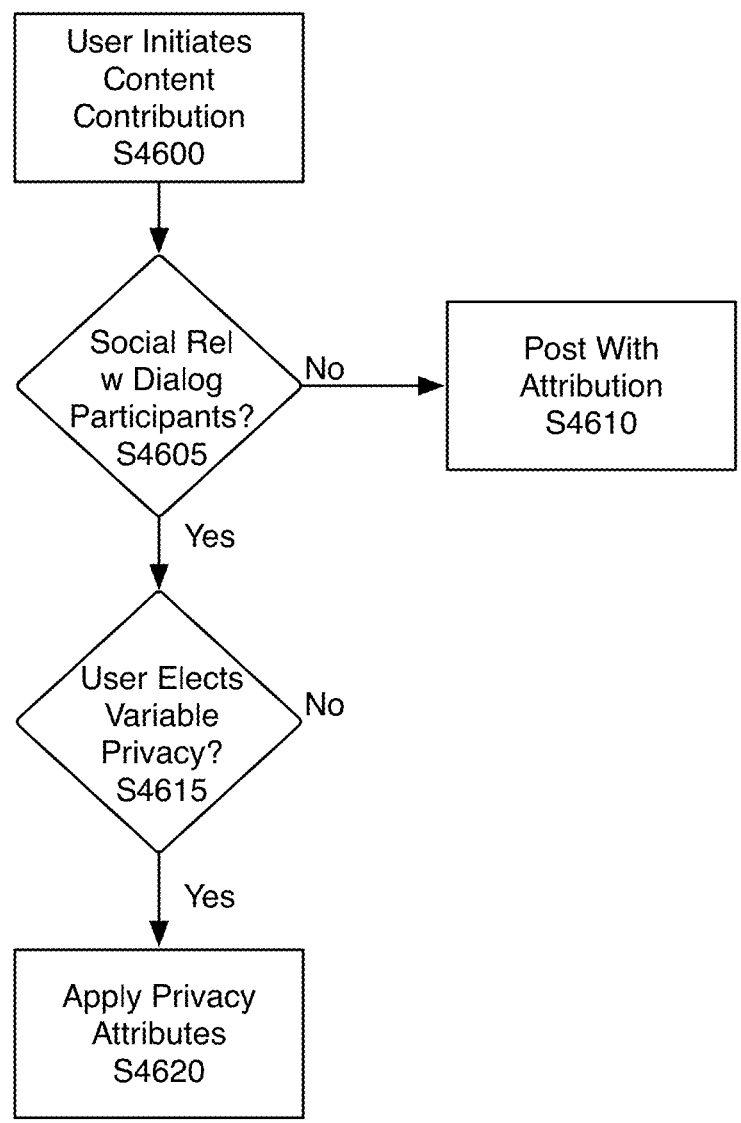
FIG. 46 is a process for applying variable privacy functions based on social networking relationship.

FIG. 46 illustrates an exemplary process for authorizing use of variable privacy functions in which content view is dependent on social relationships. In step S4600, a user initiates a content contribution. In step S4605, server 100 evaluate whether the posting user has a qualifying social networking relationship with one or more other users to whom the content contribution will be made directly available. For example, if the content contribution is a post of a group having a defined membership, an evaluation is made as to whether the contributing user has a qualifying social networking relationship with some threshold number of group members. If a content contribution is a reply to content posted by another user, an evaluation may be made as to whether the contributor has a qualifying social networking relationship with the user to whom the reply is directed, and/or others engaged in a dialog to which the contribution is directed. If not, the user's content post is made with user attribution (step S4610) and variable privacy views are not applied. If so, the contributor may elect whether to apply variable privacy treatment to the content contribution (step S4615). If not, the user's content post is made with user attribution (step S4610). If so, privacy attributes are applied to the content contribution, enabling contributor attribution and/or other private information to be withheld from view of the content contribution made to untrusted viewers. Such a process enables use of social networking relationship to determine variable privacy view, while avoiding opportunities for content contribution without some level of user accountability.

"Ask Me Anything" Dialogs with Variable Privacy

Variable privacy concepts described herein may also be beneficially applied in the context of a pre-scheduled, online group dialog. One example of such dialogs are commonly referred to as "Ask Me Anything" dialogs, or "AMAs". An AMA typically involves a host user who makes themselves available during a specified period of time to answer questions posed by others, often in real time. The question askers may be drawn from broad groups, such as members of the public at large. The questions and answers are then typically made available to the public at large.

Platforms hosting AMA events may be fraught with many of the same disadvantages as other types of public Internet message forums. For example, forums permitting completely anonymous participation may attract trolls, spammers and others contributing low-quality content, diluting the value provided by the AMA host. On the other hand, requiring real name identification of participants may have a chilling effect on certain individuals who value privacy, particularly if the dialog content is considered to be sensitive.

Figure 37:
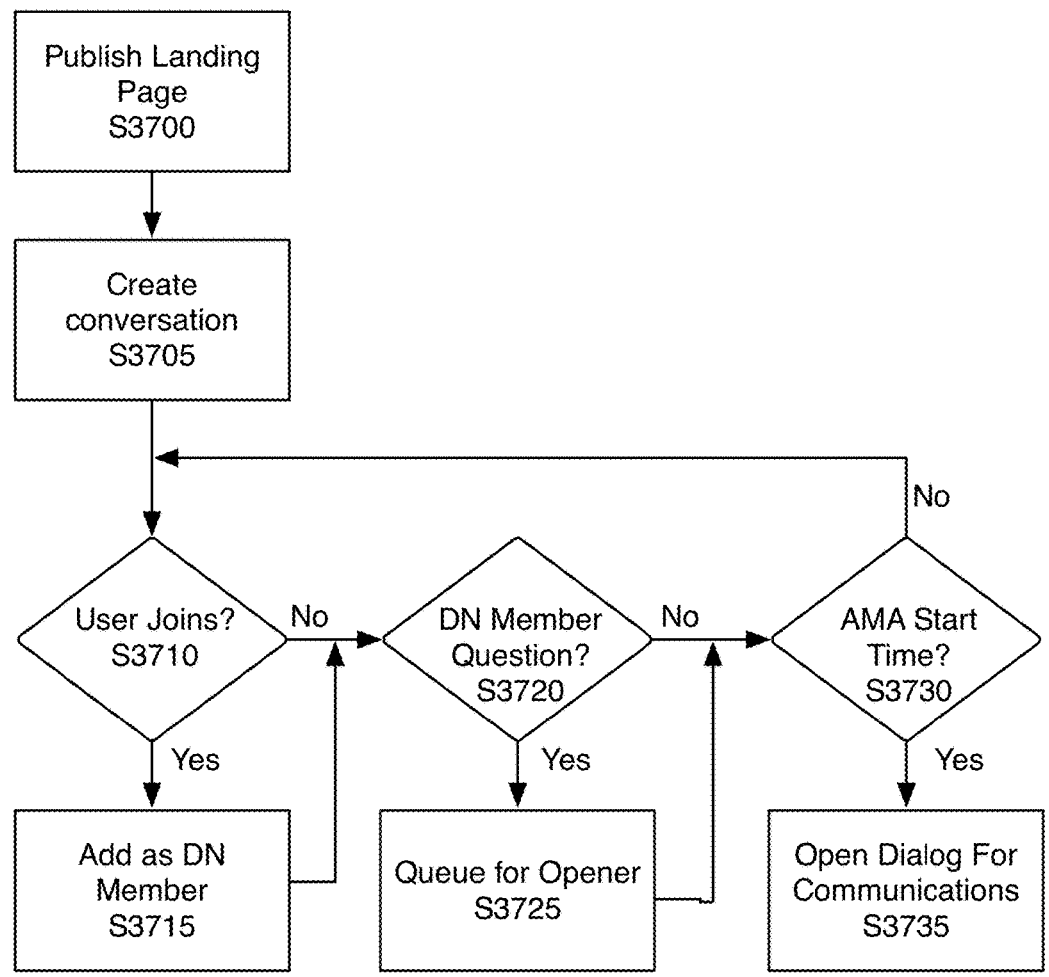
FIG. 37 is a process for implementing a pre-scheduled group dialog.

Therefore, it may be desirable to host an AMA event using a dialog platform with variable privacy features. One embodiment of a process for implementing such an AMA event is illustrated in FIG. 37. The process of FIG. 37 may be implemented by a network-connected server such as server 100, described elsewhere herein.

Figure 38:
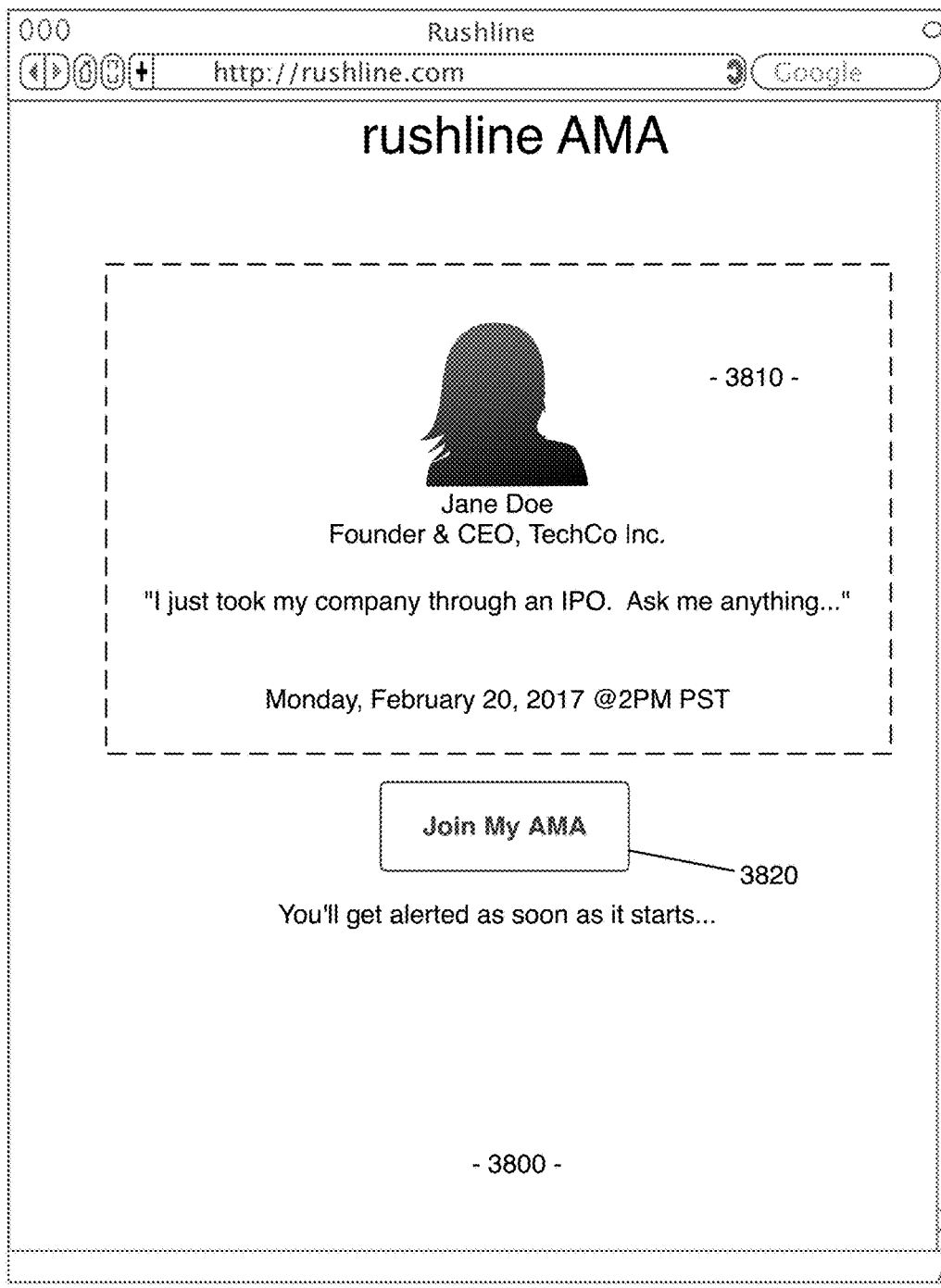
FIG. 38 is a user interface for registering dialog members for a pre-schedule group dialog.

In step S3700, a landing web page is generated and made available to potential event participants, such as via a public web page on the Internet. FIG. 38 illustrates an embodiment of such a landing page 3800. Region 3810 provides information describing the event, such as the identity and/or description of the AMA host, a contemplated topic for discussion and the date and time of the event. In some use cases, a real-name identity of the host may be provided. In other use cases, the host's identity may be withheld from the public description, with some feature, characteristic or experience of the host being described to attract participants and guide discussion. User interface element 3820 provides a button that can be selected by individuals desiring to participate in the AMA event.

In step S3705, a conversation or dialog is initiated, with the AMA host configured as the opener. Step S3705 typically occurs in advance of the event start time. The conversation generated in step S3705 serves as a placeholder until the scheduled start of the AMA event.

In step S3710, determinations are made as to whether users have joined the AMA, e.g. by selecting button 3820 on landing page 3800. When a user indicates an intent to join the AMA event, the user is queried for contact information, such as first name, last name and email address or other electronic contact address (step S3715). Contact information for individuals completing the event registration process of step S3715 may be stored by server 100 and the individuals may thereafter be deemed dialog network members for the scheduled AMA event dialog. In some embodiments, any individual may be automatically added as a dialog member by completing registration. In other embodiments, an additional approval step may be required, whereby, for example, individuals may not be added as dialog members unless and until their requested registration is approved by the AMA host or another administrator.

In step S3720, determinations are made as to whether a member of the AMA event dialog network (i.e. a user having registered for the event in step S3715), submits a question. Step S3720 permits dialog network members to submit questions in advance of the AMA event. Advance questions submitted by event members are then submitted to a moderation queue for consideration and review by, e.g., the AMA host (step S3725). In some embodiments, questions queued in step S3725 may be made available to the AMA host in advance of the scheduled event start time, such as via a published dialog view and/or a queue user interface published by server 100. In some embodiments, questions queued in step S3725 may be made available to the AMA host at the scheduled time of the AMA event.

In step S3730, a determination is made as to whether the AMA start time has arrived. If not, server 100 may continue monitoring for event participant registrations and advance questions. While a particular example of steps and associated sequencing is illustrated in FIG. 37, it is contemplated and understood that other combinations of the same or different steps may also be employed to beneficial effect. For example, in some embodiments it may also be desirable to invite registered participants to an exclusive social network or communications forum, such as a Slack™ group, for pre-event communications amongst the group of registered participants.

In step S3735, the dialog is opened for communications. The AMA host may answer previously-submitted questions, or questions submitted live during the event. Event participants may submit new questions during the event, and/or respond to answers provided by the AMA host. Dialog views of the event may be made available during and after the period during which the event is conducted.

System operation in step S3735 is analogous to that described hereinabove (e.g. steps S310-S320 in the process of FIG. 3) with the AMA host serving as the dialog opener. However, dialog network members or target recipients are those individuals having pre-registered for the AMA event in step S3710 (such as via the landing page of FIG. 38) rather than users directly specified by the opening user. In some cases, some members may have pre-registered on their own, while others may have been added to the conversation by the AMA host as described elsewhere above. The dialog of step S3735 includes variable privacy views described above, such that dialog views are made available to event participants that include personally identifiable information of other event participants (such as some or all of the information provided by users in step S3710), while individuals not self-registered as event participants, or not added by the host or another registered participant as event participants, receive anonymized views.

In some embodiments, AMA hosts may desire to limit disclosure of their identities, in which case personally identifiable information for the opener (i.e. AMA host) and the registered participants may be withheld from unregistered viewers (e.g. public Internet viewers of the dialog or other members of a community). In other embodiments, the AMA host's identify may be public, such that all dialog views include personal attribution of the AMA host's dialog contributions, but other participants' identities are only included in dialog views made available to the opener/AMA host and other registered participants.

In some embodiments, individuals not registered as event participants in step S3710 may view the event dialog, but not provide content contributions. In other embodiments, unregistered individuals may provide content contributions, although they may be filtered from some dialog views, such as is described above in connection with, e.g., FIGS. 15 and 16.

While the embodiment illustrated in FIGS. 37 and 38 contemplates a landing page through which individuals may elect to be event participants, in other embodiments, it may be desirable to enable the AMA host to invite a select group of event participants. In such an event, the AMA host controls the individuals amongst whom participant identities are disclosed, while still permitting broader dissemination of anonymized dialog content.

Integrating Variable Privacy Views with Third Party Distribution Platforms

Some variable privacy-enabling embodiments described above enable publication of public (non-redacted and non-anonymized) content views to third party content distribution platforms, such as in step S1710 in the embodiment of FIG. 17, or via the arrangement described in connection with FIG. 23. In such embodiments, responses to published content may be relayed back to the privacy enabling system and incorporated into an integrated dialog. However, in other embodiments, it may also be desirable to enable users of third party content distribution platforms (such as social media sites) to consume variable-privacy views of content directly from within the third-party platform, even when the third-party platform does not natively support variable privacy. For example, a variable privacy enabling system may publish content views to a third-party platform such as Facebook™, Instagram™ or SnapChat™, with content consumers on the third-party platform consuming variable privacy views of the content directly from within the third-party platform.

Figure 47A:
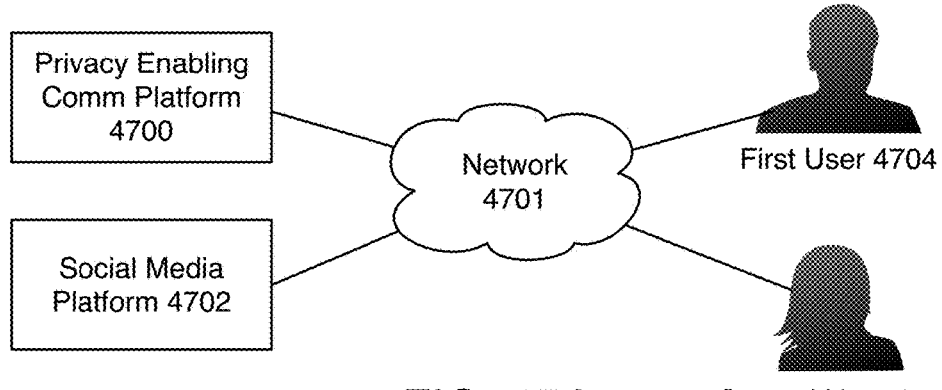
FIG. 47A is a schematic block diagram of a privacy enabling communication platform adapted for content publication via a separate social media platform.
Figure 47B:
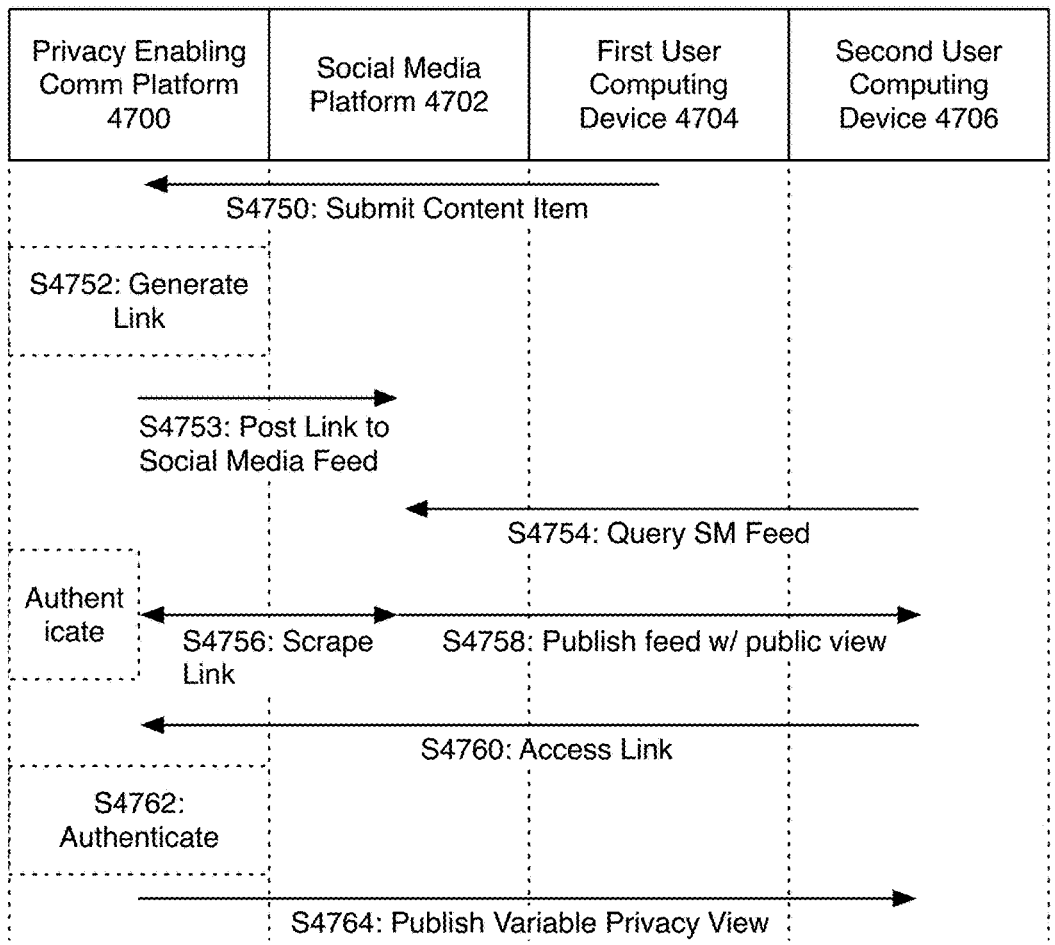
FIG. 47B is a process for distributing content contributions to a social media platform with variable privacy.

One such embodiment is illustrated in FIGS. 47A and 47B. The embodiment enables variable privacy views directly within a third party social media platform, with little or no third-party integration. FIG. 47A is a schematic representation of a communication network, implementing the process of FIG. 47B. The communication network includes a privacy enabling communication platform ("PECP") 4700, analogous to various embodiments described hereinabove. PECP 4700 is accessible via digital communication network 4701 (which may include the Internet) to a first user 4704 and a second user 4706. Users 4704 and 4706 may also access third party social media platform 4702. While platform 4702 may be described as a third party social media platform, it is contemplated and understood that in some embodiments, platforms 4700 and 4702 may be operated or controlled by a common entity or have some other affiliation. However, in other embodiments, the platforms may be operated independently, with little or no custom integration required to achieve functionality described herein.

In the process of FIG. 47B, in step S4750, first user 4704 submits a content item to PECP 4700. The content item submission in step S4750 may be accomplished via, e.g., various mechanisms described herein (such as a web application or mobile application) and may contain varying types of content. For example, first user 4704 may utilize a smartphone to submit an image, portions of which are identified as personal information pursuant to, e.g., techniques described elsewhere herein. In step S4752, PECP 4700 generates a URL uniquely associated with the content item submitted in step S4750. In step S4753, privacy enabling system 4700 posts the link generated in step S4752, into a social media feed on platform 4702 which is associated with first user 4704. In some embodiments, users may elect to post a content item link onto multiple social media accounts simultaneously.

The link posted in step S4753 may then be displayed to various users of social media platform 4702, pursuant to the inherent functionality of that platform. Social media platform 4702 (like many social media platforms) implements a feed rendering process that automatically scrapes URLs that are contained within a user's content feed, so that a "preview" of content accessible via the URL may be rendered to a viewer directly within the viewer's content feed. Thus, in step S4754, second user 4706 queries the user's content feed on social media platform 4702, which feed contains the URL-based content item that was posted to social media platform 4702 in step S4753.

In step S4756, social media platform 4702 scrapes the URL generated in step S4752. Links generated in step S4752 point to servers implemented or controlled by PECP 4700, which include a link authentication engine to authenticate a system querying each link. Based on the result of the authentication operation, PECP 4700 determines whether to return a public view of an associated content item, or a private or anonymized view of the content item, from which personal information has been removed or obscured. In step S4756, upon automated scraping of a link by social media platform 4702 automatically scrapes the URL posted in step S4753, and PECP 4700 returns a public view of the content item associated with the scraped URL. That scraped, public view of the content item is then published directly into the social media feed of second user 4706 in step S4758.

In step S4760, second user 4706 selects the published URL (rendered with a scraped preview) directly from their social media feed provided by social media platform 4702, such as by clicking on the scraped preview image obtained in step S4756. Selection of the URL results in a query of PECP 4700. PECP 4700 again authenticates the user or system accessing the URL to evaluate its trusted or untrusted status relative to content associated with the URL (step S4762), and returns a view of the associated content item (step S4764). If the system accessing the URL is authenticated as a trusted party relative to the content item associated with the queried URL (i.e. if second user device 4706 is determined to be associated with a member of a trusted group relative to the content item being queried), then a private view of the content item is returned in step S4764. If the system accessing the URL is not authenticated as a trusted party, then a public view of the content item is returned in step S4764, with personal information removed, obscured, or the like. Authentication of a querying system may be accomplished via any of a number of ways known in the art, such as via cookies stored on second user device 4706 indicative of the user's identity, querying second user 4706 for login credentials associated with privacy enabling platform 4700, or the like. As in other embodiments described herein, a querying user may be deemed trusted relative to the queried content based on, e.g., qualifying social networking relationship, membership within a dialog group, or the like.

The process of FIG. 47B may, for instance, enable first user 4704 to post an image to PECP 4700, with a request to also push that posting to that user's social media account on Facebook or the like. The user's social media posting may then be automatically disseminated on the third party social media platform as a scraped preview of the redacted, public version of the posted image. However, a trusted viewer can simply click the URL from within their social media feed to view the full, unredacted and unobscured version of the image, directly from social media platform 4702. Such a mechanism enables relatively seamless implementation of variable privacy functionality from third party communication platforms, without requiring substantial system integrations.

While the embodiment of FIG. 47B provides many benefits, some functional limitations may remain. For example, the version of content from PECP 4700 that is scraped by social media platform 4702 for automated display directly within the feeds of social media users, may inherently be the untrusted view of the content to preserve the content contributor's privacy, as the scraping operation would typically be implemented independently of rendering to a specific viewer. Thus, an extra step is required (e.g. clicking or selecting the URL from within a user's feed by a trusted user) in order to authenticate a viewer and access a viewer-specific view of the content item. Additionally, PECP 4700 may be required to perform viewer authentication to determine whether a trusted or untrusted view of the content item should be served, without the benefit of authenticating information that may be made available by social media platform 4702. For example, PECP 4700 may have to maintain its own social graph to determine qualifying relationships for serving of trusted views. Even if social media platform 4702 permits importation of a Friends list or other type of social graph by PECP 4700, regular updating may be cumbersome to users and/or prone to delay.

Figure 47C:
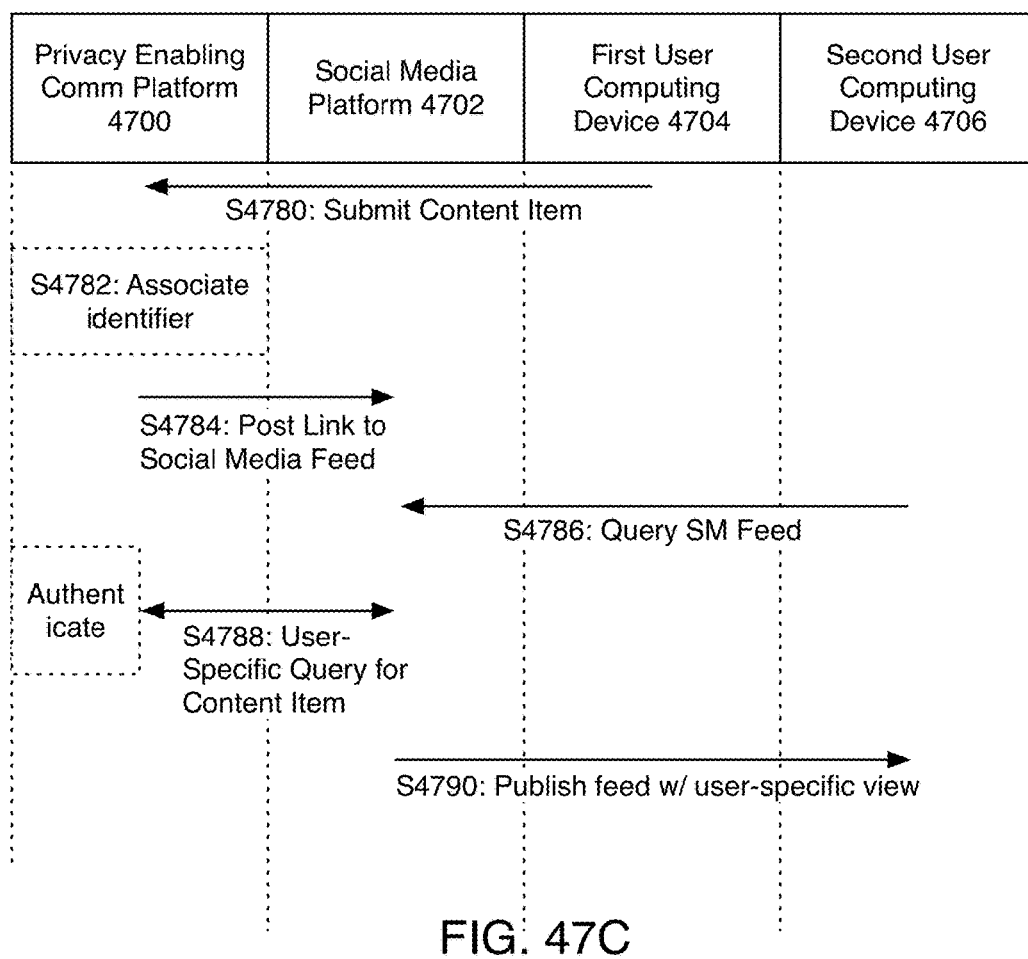
FIG. 47C is another process for distributing content contributions to a social media platform with variable privacy.

FIG. 47C illustrates another process that may be utilized to render content on social media platform 4702 with variable privacy, which may address some of the above issues. In the embodiment of FIG. 47C, PECP 4700 implements an API enabling direct communication between social media platform 4702 and PECP 4700. The platform 4700 API permits content item queries having a payload with multiple information items, such as: a unique content item ID, a querying user ID, and social graph data. The unique content item ID identifies the content item for which serving is requested, and may be provided to social media platform 4702 in step S4784 (described below). The querying user ID identifies the user for whom the content item is being queried. The social graph data may be used to provide additional information for use by PECP 4700 in determining which version of the content item will be served (e.g. a trusted or untrusted view). For example, in some embodiments, social media platform 4702 may directly convey social graph information (e.g. Friend status, follow status, or degrees of social graph separation) regarding the querying user and the user to whose social media account the content item was originally posted.

In operation, first user 4704 initially submits a content item to PECP 4700 in step S4780. In step S4782, PECP 4700 associates a content item identifier with the content item received in step S4780. In step S4784, the identifier associated with the content item is posted to an account of first user 4704 on social media platform 4702. In some embodiments, the identifier may be posted as a URL, analogous to step S4753.

In step S4786, second user 4706 accesses a social media feed on social media platform 4702. When the social media feed of second user 4706 contains the content item posted in step S4784, social media platform 4702 performs a user-specific query of PECP 4700 using the above-described API. As described above, the query may include the content item ID, querying user ID, and social graph data. The user-specific query of step S4788 is authenticated by PECP 4700 to determine which version of the queried content item should be returned (e.g. a trusted or untrusted view of the content item). In step S4790, social media platform 4702 publishes the user-specific content item view, directly within the content feed of second user 4706.

Because PECP 4700 receives a definitive user ID from social media platform 4702, and because it may also receive real-time social graph data from social media platform 4702, an accurate and timely determination may be made as to which content item view should be provided to the querying user. For example, a user of PECP 4700 may configure content item submissions to automatically push content item submissions to Facebook, and show a trusted view to Facebook Friends only. The embodiment of FIG. 47C thereby permits such content items to appear directly within Facebook content feeds, with the appropriate version being rendered for any viewer, based on Facebook's real-time social graph at the time the content item is served to a user (or cached by Facebook or a third party). The user-specific content item view may also be provided directly within a social media feed, without requiring additional click-through on the content item. These and other benefits may be provided by the embodiment of FIG. 47C.

While certain embodiments are shown herein in the context of a network-connected computing platform based on a centralized server communicating with client devices, it is contemplated and understood that methods, tools, processes and techniques described herein could also be effectively implemented via a network-connected computing platform that comprises or consists of peer-to-peer clients.

Key aspects of this system are enhanced by other aspects mentioned elsewhere. For instance, the likelihood someone may be willing and motivated to invite other qualified members into a dialog is increased when disclosure of the invited participant's identity can be controlled. Additionally, it is understood that specific aspects of the systems and embodiments described herein may be beneficially employed separately or in different combinations and contexts.

While certain embodiments of the invention have been described herein in detail for purposes of clarity and understanding, the foregoing description and Figures merely explain and illustrate the present invention and the present invention is not limited thereto. It will be appreciated that those skilled in the art, having the present disclosure before them, will be able to make modifications and variations to that disclosed herein without departing from the scope of any appended claims.

The invention claimed is:

1. A method for publication of user-contributed content by a network-connected computing system enabling user-to-user content sharing, the method comprising:

receiving, from a contributing user via a data communications network, a content contribution comprising user-contributed content;

identifying all personal information within the content contribution comprises identifying one or more portions of the content contribution as consisting of personal information;

publishing a private view of the content contribution via a data communications network only to a trusted group of users comprising at least one user other than the contributing user, the private view comprising the user-contributed content including the personal information; and publishing an anonymous view of the content contribution via the data communications network to users not within the trusted group of users, the anonymous view comprising the user-contributed content excluding the personal information identified therein and personal information associated therewith.

2. The method of claim 1, in which the content contribution comprises a social network posting; and the trusted group of users comprises the contributing user and users having a qualifying social networking relationship with the contributing user.

3. The method of claim 1, in which the trusted group of users consists of a subset of users of the system who are engaged in a dialog with the contributing user via the network-connected computing system.

4. The method of claim 1, in which the personal information comprises a name of the contributing user.

5. The method of claim 3, in which the personal information comprises all instances of the names of the contributing user and the users engaged in a dialog with the contributing user.

6. The method of claim 2, in which the personal information comprises names of the contributing user and one or more users having a qualifying social networking relationship with the contributing user.

7. The method of claim 1, in which the step of identifying one or more portions of the content contribution as consisting of personal information comprises identifying matches between content contribution text and privacy words associated with the contributing user by the network-connected computing system.

8. The method of claim 1, in which the anonymous view comprises the user-contributed content with personal information visually obscured.

9. The method of claim 1, in which the anonymous view comprises the user-contributed content with portions comprising personal information being replaced by one or more pseudonymous substitutions.

* * * * *